(12) United States Patent
Rodriguez

(10) Patent No.: US 8,555,170 B2
(45) Date of Patent: Oct. 8, 2013

(54) TOOL FOR PRESENTING AND EDITING A STORYBOARD REPRESENTATION OF A COMPOSITE PRESENTATION

(75) Inventor: Enrique Rodriguez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 12/853,967

(22) Filed: Aug. 10, 2010

(65) Prior Publication Data

US 2012/0042251 A1 Feb. 16, 2012

(51) Int. Cl.
*G06F 3/14* (2006.01)
(52) U.S. Cl.
USPC .................. 715/723; 715/501.1; 345/473
(58) Field of Classification Search
USPC 715/200–277, 700–867, 501.1; 345/30–111, 345/473; 700/701–866; 709/201–229
See application file for complete search history.

(56) References Cited

U.S. PATENT DOCUMENTS

| | | | |
|---|---|---|---|
| 5,404,316 | A | 4/1995 | Klingler et al. |
| 5,442,744 | A | 8/1995 | Piech et al. |
| 5,521,841 | A | 5/1996 | Arman et al. |
| 5,659,792 | A | 8/1997 | Walmsley |
| 5,664,216 | A | 9/1997 | Blumenau |
| 5,682,326 | A | 10/1997 | Klingler et al. |
| 5,999,173 | A | 12/1999 | Ubillos |
| 6,154,600 | A | 11/2000 | Newman et al. |
| 6,154,601 | A | 11/2000 | Yaegashi et al. |
| 6,204,840 | B1 | 3/2001 | Petelycky et al. |
| 6,324,335 | B1 | 11/2001 | Kanda |
| 6,400,378 | B1 | 6/2002 | Snook |
| 6,469,711 | B2 | 10/2002 | Foreman et al. |
| 6,546,188 | B1 | 4/2003 | Ishii et al. |
| 6,628,303 | B1 | 9/2003 | Foreman et al. |
| 6,650,826 | B1 | 11/2003 | Hatta |
| 6,928,613 | B1 | 8/2005 | Ishii et al. |
| 7,073,127 | B2 | 7/2006 | Zhao et al. |
| 7,225,405 | B1 | 5/2007 | Barrus et al. |

(Continued)

FOREIGN PATENT DOCUMENTS

| | | |
|---|---|---|
| WO | WO 2007/120694 | 10/2007 |
| WO | WO 2009/122213 | 10/2009 |
| WO | WO/2012/021312 | 2/2012 |

OTHER PUBLICATIONS

International Search Report and Written Opinion of PCT/US2011/046039, mailing date Nov. 18, 2011, Apple Inc.

(Continued)

*Primary Examiner* — Ruay Ho
(74) *Attorney, Agent, or Firm* — Adeli & Tollen LLP

(57) ABSTRACT

Some embodiments provide a storyboard tool for displaying and editing a storyboard representation of a set of clips that forms a composite presentation in a media-editing application. For the set of clips in a composite display area, the tool displays a set of thumbnails corresponding to the clips in a storyboard display area. Each thumbnail in the storyboard display area respectively represents a particular clip of the composite presentation and is respectively associated with the particular clip in the composite display area. The tool allows a user to visualize the entire context of the composite presentation as a storyboard representation of the clips in the composite display area. Some embodiments provide for non-destructive editing that modify the order of the thumbnails in the storyboard display area without affecting the clips in the composite display area. The storyboard tool can synchronize the edited order of clips to the composite display area.

21 Claims, 30 Drawing Sheets

(56) References Cited

U.S. PATENT DOCUMENTS

| | | | |
|---|---|---|---|
| 7,313,755 | B2 | 12/2007 | Rahman et al. |
| 7,325,199 | B1 | 1/2008 | Reid |
| 7,362,946 | B1 | 4/2008 | Kowald |
| 7,383,508 | B2 | 6/2008 | Toyama et al. |
| 7,444,593 | B1 | 10/2008 | Reid |
| 7,480,864 | B2 | 1/2009 | Brook et al. |
| 7,614,012 | B1 | 11/2009 | Dulaney |
| 7,623,755 | B2 | 11/2009 | Kuspa |
| 7,710,439 | B2 | 5/2010 | Reid et al. |
| 7,720,349 | B2 | 5/2010 | Ogikubo |
| 7,836,389 | B2 | 11/2010 | Howard et al. |
| 7,877,690 | B2 * | 1/2011 | Margulis ............ 715/723 |
| 7,890,867 | B1 | 2/2011 | Margulis |
| 8,020,100 | B2 | 9/2011 | Ubillos et al. |
| 2001/0020953 | A1 | 9/2001 | Moriwake et al. |
| 2001/0036356 | A1 | 11/2001 | Weaver et al. |
| 2001/0040592 | A1 | 11/2001 | Foreman et al. |
| 2002/0089540 | A1 | 7/2002 | Geier et al. |
| 2002/0140719 | A1 | 10/2002 | Amir et al. |
| 2002/0154140 | A1 | 10/2002 | Tazaki |
| 2002/0154156 | A1 | 10/2002 | Moriwake et al. |
| 2002/0175917 | A1 * | 11/2002 | Chakravarty et al. ...... 345/473 |
| 2003/0001880 | A1 | 1/2003 | Holtz et al. |
| 2003/0002851 | A1 | 1/2003 | Hsiao et al. |
| 2003/0090504 | A1 | 5/2003 | Brook et al. |
| 2003/0117431 | A1 | 6/2003 | Moriwake et al. |
| 2003/0146915 | A1 * | 8/2003 | Brook et al. ............ 345/473 |
| 2003/0234803 | A1 | 12/2003 | Toyama et al. |
| 2004/0001079 | A1 | 1/2004 | Zhao et al. |
| 2004/0071441 | A1 | 4/2004 | Foreman et al. |
| 2004/0090462 | A1 | 5/2004 | Graham |
| 2004/0201609 | A1 | 10/2004 | Obrador |
| 2004/0205515 | A1 * | 10/2004 | Socolow et al. ........ 715/501.1 |
| 2004/0268224 | A1 | 12/2004 | Balkus et al. |
| 2005/0055624 | A1 | 3/2005 | Seeman et al. |
| 2005/0257152 | A1 | 11/2005 | Shimizu et al. |
| 2006/0008247 | A1 | 1/2006 | Minami et al. |
| 2006/0059426 | A1 | 3/2006 | Ogikubo |
| 2007/0089152 | A1 | 4/2007 | Patten et al. |
| 2007/0189708 | A1 | 8/2007 | Lerman et al. |
| 2007/0262995 | A1 | 11/2007 | Tran |
| 2008/0044155 | A1 | 2/2008 | Kuspa |
| 2008/0120550 | A1 | 5/2008 | Oakley |
| 2008/0152297 | A1 | 6/2008 | Ubillos |
| 2008/0152298 | A1 | 6/2008 | Ubillos |
| 2008/0155420 | A1 | 6/2008 | Ubillos et al. |
| 2008/0155421 | A1 | 6/2008 | Ubillos et al. |
| 2009/0172543 | A1 | 7/2009 | Cronin et al. |
| 2010/0050080 | A1 | 2/2010 | Libert et al. |
| 2010/0077289 | A1 | 3/2010 | Das et al. |
| 2010/0281375 | A1 | 11/2010 | Pendergast et al. |
| 2010/0281376 | A1 | 11/2010 | Meaney et al. |

OTHER PUBLICATIONS

Author Unknown, "Apple Announces Final Cut Pro," NAB, Apr. 6, 2003, 3 pages, Apple Inc., Las Vegas, Nevada, USA.

Author Unknown, "Frame-specific editing with Snap", Adobe Premiere Pro CS4 Classroom in a Book, Dec. 17, 2008, 17 pages, Adobe Press, USA.

Author Unknown, "Using Adobe Premiere Elements 8 Editor," Month Unknown, 2009, 313 pages, Adobe Systems Incorporated, San Jose, California, USA.

Author Unknown, "Using Adobe Flash CS4 Professional," Month Unknown, 2008, 474 pages, Adobe Systems Incorporated, San Jose, California, USA.

Author Unknown, "Adobe Director 11: User Guide," Month Unknown, 2008, 498 pages, Adobe Systems Incorporated, San Jose, California, USA.

Author Unknown, "Adobe Premiere Pro CS3: User Guide," Month Unknown, 2007, 455 pages, Adobe Systems Incorporated, San Jose, California, USA.

Author Unknown, "iMovie '08 Getting Started," Month Unknown, 2008, pp. 1-50, Apple Inc., USA.

Brenneis, Lisa, "Final Cut Pro 3 for Macinotsh: Visual QuickPro Guide," Apr. 2002, 288 pages, Peachpit Press, Berkely, California, USA.

Wang, Yijin, et al. "MyVideos—A System for Home Video Management," Proceedings of the 10th ACM International Conference on Multimedia, Dec. 1-6, 2002, pp. 412-413, Juan-les-Pins, France.

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA, USA.

Chisan, James, et al., "Video Bench—Final Report: SEng 480a/CSc 586a," Apr. 11, 2003, University of Victoria.

Author Unknown, "Arranging clips in the Sceneline", Adobe Premiere Elements 7, 4 pages, retrieved from Internet on Sep. 11, 2009, http://help.adobe.com/en_US/PremiereElements/7.0/WSB04491A8-859D-41e7-975F-0E26B9AECB9B.html.

* cited by examiner

US 8,555,170 B2

TOOL FOR PRESENTING AND EDITING A STORYBOARD REPRESENTATION OF A COMPOSITE PRESENTATION

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple Inc. These applications give users the ability to edit, combine, transition, overlay, and piece together different media content in a variety of manners to create a resulting media project. The resulting media project specifies a particular sequenced composition of any number of text, audio clips, images, or video content that is used to create a media presentation.

Various media editing applications facilitate such composition through electronic means. Specifically, a computer or other electronic device with a processor and computer readable storage medium executes the media content editing application. In so doing, the computer generates a graphical interface that allows designers to digitally manipulate graphical representations of the media content to produce a desired result.

One difficulty in media editing is that a user cannot easily view clips that form a composite media presentation in a contextually meaningful way. Typically, the media editing application presents the clips as respective graphical objects (e.g., rectangular blocks) on a particular track spanning a timeline display area. However, this manner of clip presentation does not provide an overall visual context for the flow of the composite media presentation. Therefore, the user has difficulty in visually assessing contextually significant events in the composite media presentation when the clips are presented in the timeline.

BRIEF SUMMARY

For a media editing application that creates composite presentations, some embodiments provide a novel storyboard tool for displaying and editing a storyboard representation of a set of clips forming a composite presentation in the media editing application. The media editing application of some embodiments includes a composite display area for displaying different graphical representations of the set of clips on a particular track spanning a timeline. When grouped in chronological order, the set of clips in some embodiments can be referred to as a sequence of clips.

For the sequence of clips in the composite display area (also referred to below as the timeline display area), the storyboard tool of some embodiments displays a storyboard representation as a series of graphical representations (e.g., thumbnail images) that sequentially depict the sequence. In some embodiments, the storyboard tool can display the series of graphical representations as a set of thumbnail images ("thumbnail" or "thumbnails") corresponding to the clips in a storyboard display area separate from the composite display area. Each thumbnail in the storyboard display area in some embodiments is a thumbnail image of a frame of a particular clip in the composite presentation and is respectively associated with the particular clip in the timeline display area.

When the storyboard is opened, it displays the thumbnails in a sequential arrangement in the storyboard display area according to the chronological order of the sequence of media clips in the timeline display area. In this manner, a user can use the storyboard tool for visualizing the storyboard representation of the sequence of media clips.

Different embodiments can arrange the storyboard display area and its set of thumbnails in different ways. For instance, some embodiments allow the thumbnail images to scroll through the storyboard display area. Some embodiments provide zoom controls to adjust the size of the thumbnail images that are displayed in the storyboard display area. Some embodiments present the set of thumbnail images in a single row, multiple rows, single column, multiple columns, or multiple rows and columns.

The user can use the storyboard tool to perform operations for editing the set of thumbnail images in the storyboard display area without destructively affecting an existing timeline display area of clips. Some examples of these operations include (1) moving a set of thumbnails in the storyboard display area, (2) adding clips to the storyboard display area, and (3) removing a set of thumbnails in the storyboard display area. For instance, when the user moves the thumbnails to edit their order in the storyboard display area, the storyboard tool can display the thumbnails according to the edited order of thumbnails. When the user adds a new clip to the storyboard display area, the storyboard tool can include a thumbnail of the clip in the storyboard display area. When the user selects a particular thumbnail for removal, the storyboard tool can remove the selected thumbnail from the storyboard display area. The storyboard tool of some embodiments performs any of the preceding operations without affecting the order of the clips in the timeline display area. Therefore, the storyboard tool allows the user to manipulate the set of thumbnails in the storyboard display area in a non-destructive manner.

Some embodiments allow the user to navigate to a particular clip in the timeline display area. When the user selects a particular thumbnail in the storyboard display area, the storyboard tool in some embodiments moves a navigational element (e.g., playhead) in the composite display area to the position of an existing corresponding clip in the timeline display area. In this manner, the storyboard tool allows the user to navigate to clips in the timeline display area according to the selected thumbnail in the storyboard display area.

After performing edits on the order of thumbnails in the storyboard display area, some embodiments can synchronize the order of thumbnails in the storyboard display area to the timeline display area to reflect the order of the thumbnails in the storyboard display area. Specifically, in some embodiments, the storyboard tool can re-order the existing corresponding clips in the timeline display area to consistently reflect the order displayed in the storyboard display area. For a particular thumbnail that is displayed in the storyboard display area but not existing in the timeline display area, the storyboard tool of some embodiments transfers the corresponding media clip (e.g., from a media library) to a position in the timeline display area that reflects the thumbnail's position in the storyboard display area.

In addition to the above-described operations for editing the storyboard, the storyboard tool of some embodiments can perform a shuffle operation to randomize the order of thumbnails in the storyboard display area to provide the user with a different visualization of the thumbnails in the storyboard display area. In some embodiments, the user can exclude certain thumbnails from a subsequent shuffle operation so that only the non-excluded thumbnails are affected by the subsequent shuffle operation.

Some embodiments can display the thumbnails in the storyboard display area with metadata of each media clip associated with each thumbnail. For instance, the storyboard tool of some embodiments displays the metadata of a particular clip as a transparent overlay over the corresponding thumbnail in the storyboard display area. The metadata of some embodiments includes text data that describes the associated clip for the thumbnail. In some embodiments, the storyboard tool also provides for editing the metadata (e.g., text data) over the thumbnail.

The storyboard tool of some embodiments can create a new empty storyboard called a clip storyboard. In these embodiments, the user can add a set of clips (e.g., from a media library) to include in the clip storyboard. The clips added to the clip storyboard are displayed in the storyboard display area as thumbnails that form a storyboard representation. The storyboard tool can then perform any of the above described operations to modify the order of thumbnails in the clip storyboard displayed in the storyboard display area. In some embodiments, the storyboard tool commits the set of thumbnails in the clip storyboard to the timeline display area by transferring the associated clips of the thumbnails to the timeline display area of the media editing application. Instead of this approach, or in conjunction with this approach, the storyboard tool in some embodiments transfers clips from a clip storyboard to the timeline display area automatically when a user selects a UI item (e.g., by clicking, pressing a hot key, etc.) for committing the clips in the clip storyboard to the timeline display area.

Different embodiments provide different ways to output the storyboard representation shown as the set of the thumbnails in the storyboard display area. Some embodiments can output the storyboard representation by printing to a standard document format (such as a portable document format, XML, etc.). Moreover, some embodiments can share the storyboard representation as a shared sequence or clip storyboard over a network. Other users can then access the shared storyboard to view the storyboard representation.

One of ordinary skill in the art will understand that not all of the above-described features need to be performed by all embodiments of the invention. For instance, some embodiments might not display the composite presentation in the timeline display area. Also, one of ordinary skill will appreciate that the storyboard tool of some embodiments can be used in many other types of programs (e.g., operating systems, applications, etc.).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media editing application that creates composite presentations, some embodiments of the invention provide a novel storyboard tool for displaying and editing a storyboard representation of a set of media clips forming a composite presentation in the media editing application. A media clip is a graphical representation of a piece of media content that is stored on the computing device on which the media editing application executes, or on a computing device to which the media editing application has access. Examples of such content include picture data, audio data, video data, text data, and/or other media data. The media clips on which the storyboard tool is used include picture or video content.

Figure 1:
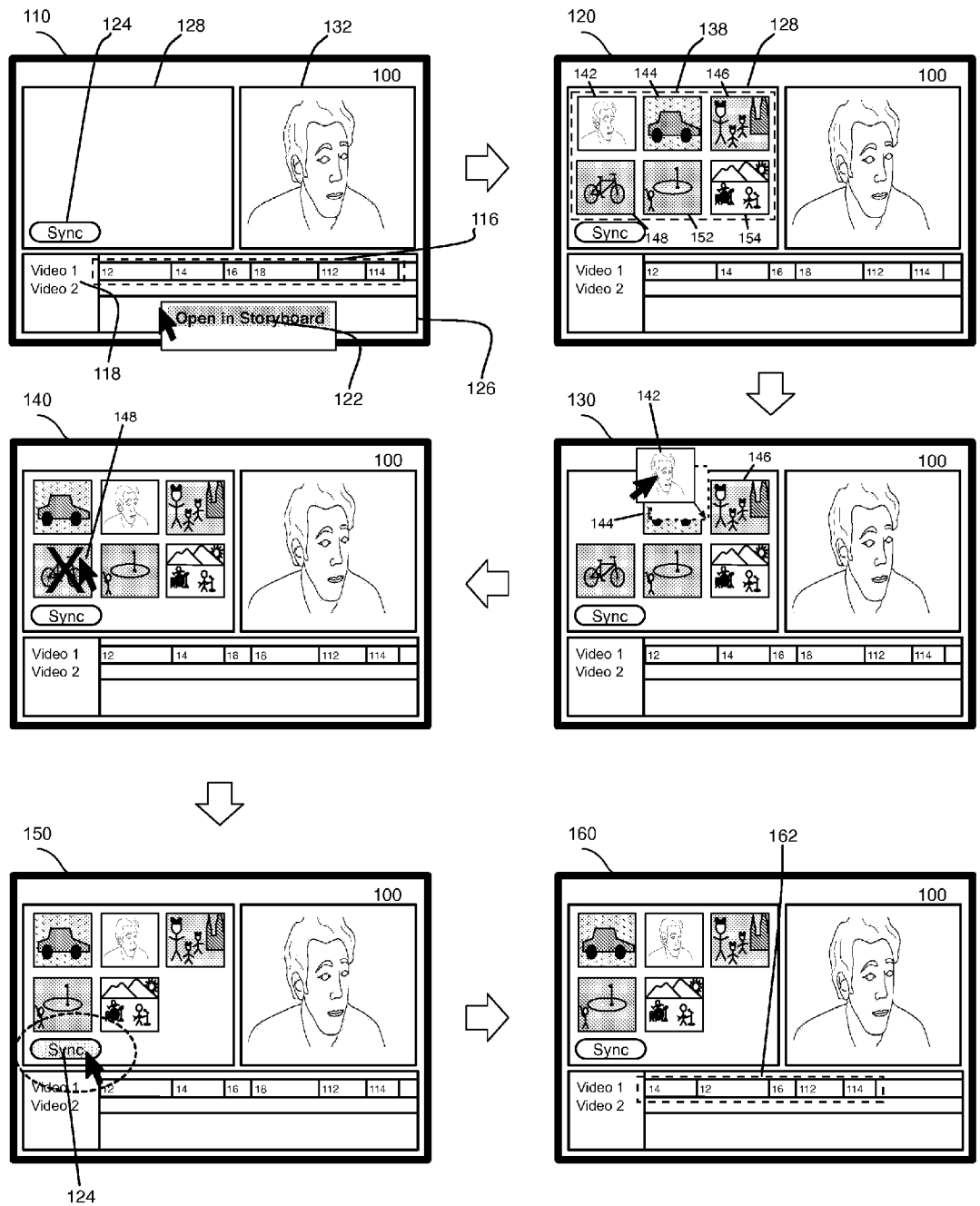
FIG. 1 illustrates a graphical user interface (GUI) of a media-editing application that includes a storyboard tool for displaying a storyboard representation of a set of clips in an existing timeline display area.

For some embodiments of the invention, FIG. 1 illustrates a graphical user interface ("GUI") 100 of a media editing application with such a storyboard tool. Specifically, this figure illustrates the GUI 100 at six different stages 110, 120, 130, 140, 150 and 160 that show how the storyboard tool can be used for displaying and editing a storyboard representation of a set of clips in an existing timeline display area of some embodiments. Each of these stages will be described in more detail below after an introduction of the elements of GUI 100.

As shown, the GUI 100 includes a preview display area 132, a composite display area 126, a storyboard display area 128, a sync GUI item 124, a storyboard activation GUI item 122, one or more tracks (e.g., track 118) in the composite display area 126 and a set of media clips 116 on track 118. The preview display area 132 displays a preview of a composite presentation that the application creates by compositing several media clips.

The composite display area 126 provides a visual representation of the composite presentation being created by the user. Specifically, it displays one or more geometric shapes that represent one or more media clips that are part of the composite presentation. The composite display area includes one or more audio and video tracks on which respectively one or more audio clips and video clips can be placed to form a composite presentation. On each track, the clips form a sequence that is part of the composite presentation being defined.

The storyboard display area displays a storyboard representation of the media clips that form the composite presentation. For each sequence of clips (e.g., video clips) on one track in the timeline display area, the storyboard tool of some embodiments can display a storyboard representation of the sequence as a series of graphical representations (e.g., thumbnail images) that sequentially depict different portions of the sequence. In some embodiments, the storyboard tool can display the series of graphical representations as a set of thumbnail images ("thumbnail" or "thumbnails") corresponding to the clips in the storyboard display area. In some embodiments, each thumbnail in the storyboard display area respectively represents a particular clip of the composite presentation and is respectively associated with the particular clip in the timeline display area.

When the storyboard tool is activated, the tool displays the thumbnails in a sequential arrangement in the storyboard display area according to the chronological order of the sequence of media clips in the timeline display area. In this manner, a user can use the storyboard tool for visualizing a sequence of media clips in the timeline.

The storyboard activation GUI item 122 of the GUI 100 is a conceptual illustration of one or more UI items that allow the media-editing application to activate its storyboard tool. Different embodiments of the invention implement this UI item differently. Some embodiments implement it as a UI button, others as a command that can be selected in a pull-down or drop-down menu, and still others as a command that can be invoked through one or more keystroke operations. Accordingly, the selection of the storyboard activation GUI item 122 can be received from a cursor controller (e.g., a mouse, touchpad, trackball, etc.), from a touchscreen (e.g., a user touching a UI item on a touchscreen), or from a keyboard input (e.g., a hotkey or a key sequence), etc. Yet other embodiments allow the user to activate the storyboard tool through two or more of such UI implementations or other UI implementations.

Once activated, the storyboard tool of some embodiments presents the storyboard display area 128 with a set of thumbnail images 138 that respectively correspond with media clips in the timeline display area. Different techniques can be used to generate the thumbnail images. For instance, when generating a thumbnail image for a particular video clip, some embodiments initially identify a representative video frame for the clip, and then generate a thumbnail image from the identified frame. Different embodiments identify the representative video frame for a clip or set of clips differently. For example, some embodiments identify the frame based on a location within the clip, based on an analysis of the clip, etc. Some embodiments allow for the user to manually select the representative video frame for the clip.

In the example illustrated in FIG. 1, the storyboard display area 128 and its set of thumbnail images 138 are positioned adjacent to the composite display area and preview display area and spans along a portion of the composite display area in a direction along which media clips are arranged in the timeline display area. Also, in this example, the storyboard display area 128 displays the thumbnail images in multiple rows. In these rows, the thumbnail images 138 are arranged according to the sequential order as their associated clips within the composite display area. As mentioned above, each thumbnail image of the storyboard display area 128 represents a respective clip within the composite representation in the composite display area, or represents a potential clip that may be placed in the composite presentation when the storyboard representation is synchronized with the timeline display area representation. For instance, a first thumbnail image that is to the left of a second thumbnail image in the same row in the storyboard display area corresponds to a clip in the composite display area that is earlier in time than another clip corresponding to the second thumbnail. Moreover, in the example of FIG. 1, any thumbnail image placed in a row above from another thumbnail image corresponds to a clip that is earlier in time than another clip corresponding to the thumbnail image in the below row.

When the size or number of the thumbnails in the storyboard display area exceeds a certain size or number, some of the thumbnails scroll off the storyboard display area in some embodiments. To address this scenario, some embodiments provide a slider or similar UI item (not shown) to allow the user to scroll through the thumbnails in the storyboard display area. Instead of this approach, or in conjunction with it, some embodiments provide zoom controls to adjust the size of the thumbnail images that are displayed in the storyboard display area.

As mentioned above, the media editing application also includes the sync GUI item 124. In some embodiments, this item allows the media-editing application to synchronize the storyboard representation to a particular sequence of clips on a particular track in the composite display area. This item is a conceptual representation of one or more UI items that enable this functionality. Like the UI item 122, the UI item 124 can be implemented as a UI button, a pull-down or drop-down menu, "hot key" operation, etc.

The operation of the storyboard tool will now be described by reference to the state of the GUI 100 during the first through sixth stages 110-160 as illustrated in FIG. 1. In the first stage 100 of the example, the user has opened a pop-up menu and selected the storyboard activation GUI item 122 to activate the storyboard tool for a clip sequence 116 in the timeline display area. The activation of the storyboard tool is indicated by the highlighted "Open in Storyboard" command.

The second stage 120 shows the GUI 100 after the storyboard tool is activated. At this stage, the GUI 100 shows a set of thumbnail images 138 displayed in the storyboard display area 128. In this example, the set of thumbnail images 138 are arranged in two rows in ascending sequential order from left to right and top to bottom. Each thumbnail image is respectively associated with a corresponding clip in the timeline display area. Specifically, thumbnail images 142, 144, 146, 148, 152 and 154 are respectively associated with clips 12, 14, 16, 18, 112 and 114 in the timeline display area, and the initial order sequence of these thumbnail images mirrors the order of their corresponding clips in the sequence 116. In this manner, the set of thumbnail images 138 form the storyboard representation of the clip sequence 116 in the composite display area.

The third stage 130 illustrates the GUI 100 after the user has selected the thumbnail image 142 and moved it to a position between the thumbnail images 144 and 146. The fourth stage 140 shows that in response to this user input, the storyboard tool rearranges the sets of thumbnails to reflect the edited order of thumbnails. In this example, the storyboard display area displays the thumbnail image 142 in between thumbnail images 144 and 146 in the same row.

The fourth stage also shows that the user has selected the thumbnail 148 for removal from the storyboard display area as indicated by the thumbnail 148 being crossed out. The fifth stage 150 illustrates the GUI 100 after the thumbnail 148 has been removed from the set of thumbnails in the storyboard display area. In response to this removal, the thumbnails 152 and 154 have moved to the left by one spot each.

The fifth stage 150 also shows a user's selection of the sync UI item 124 (as indicated by the highlight). This selection causes the storyboard tool to synchronize the associated clips in the timeline display area according to the order of the set of thumbnails in the storyboard display area. To perform the synchronize operation, the storyboard tool of some embodiments determines the thumbnails included in the storyboard area and modifies the clips in the timeline display area to reflect the sequential order of clips as represented by the storyboard.

The storyboard tool performs different operations to synchronize the media clips in the timeline display area with the storyboard representation. Some embodiments reorder the media clips in the timeline display area to form a different sequence as the composite representation. Some embodiments add a set of media clips to the timeline display area or remove a set of media clips from the timeline display area. In the fifth stage 150 of this example, the storyboard tool removes the media clip 18 from the composite display area and reorders the remaining media clips to form an edited sequence of media clips.

The sixth stage 160 shows the GUI 100 after the synchronizing operation that was initiated in the fifth stage 150. As shown in the sixth stage, the timeline display area at this stage includes a set of media clips 162 that form the edited sequence of media clips from the storyboard tool. As shown, the order of the clips in the set of media clips 162 is consistent with the thumbnail images in the storyboard display area. For instance, the storyboard tool has switched the positions of the media clips 14 and 12 to be respectively between the first and second clips in the edited sequence. The storyboard tool has also removed the media clip 18 from the timeline display area because its corresponding thumbnail in the storyboard display area was removed after the fourth stage 140.

Several more detailed embodiments of the invention are described below. Section I describes a storyboard tool of some embodiments. Section II then describes examples of creating and modifying sequence storyboards using such story tool. Next, Section III describes a number of examples of clip storyboards of some embodiments. Section IV describes examples of outputting and sharing storyboards of some embodiments. Section V describes the software architecture of a media-editing application of some embodiments. Lastly, Section VI describes a computer system, which implements some of the embodiments of the invention.

I. Storyboard Tool

As mentioned above, some embodiments provide a storyboard tool for visualizing, organizing and editing a storyboard representation of a sequence of media clips in a media editing application. The sequence of media clips represents the sequential order of a set of media clips that forms or can form a composite presentation or part of such a presentation. In some embodiments, the media editing application includes a storyboard display area for displaying the storyboard representation of the sequence of media clips.

Figure 2:
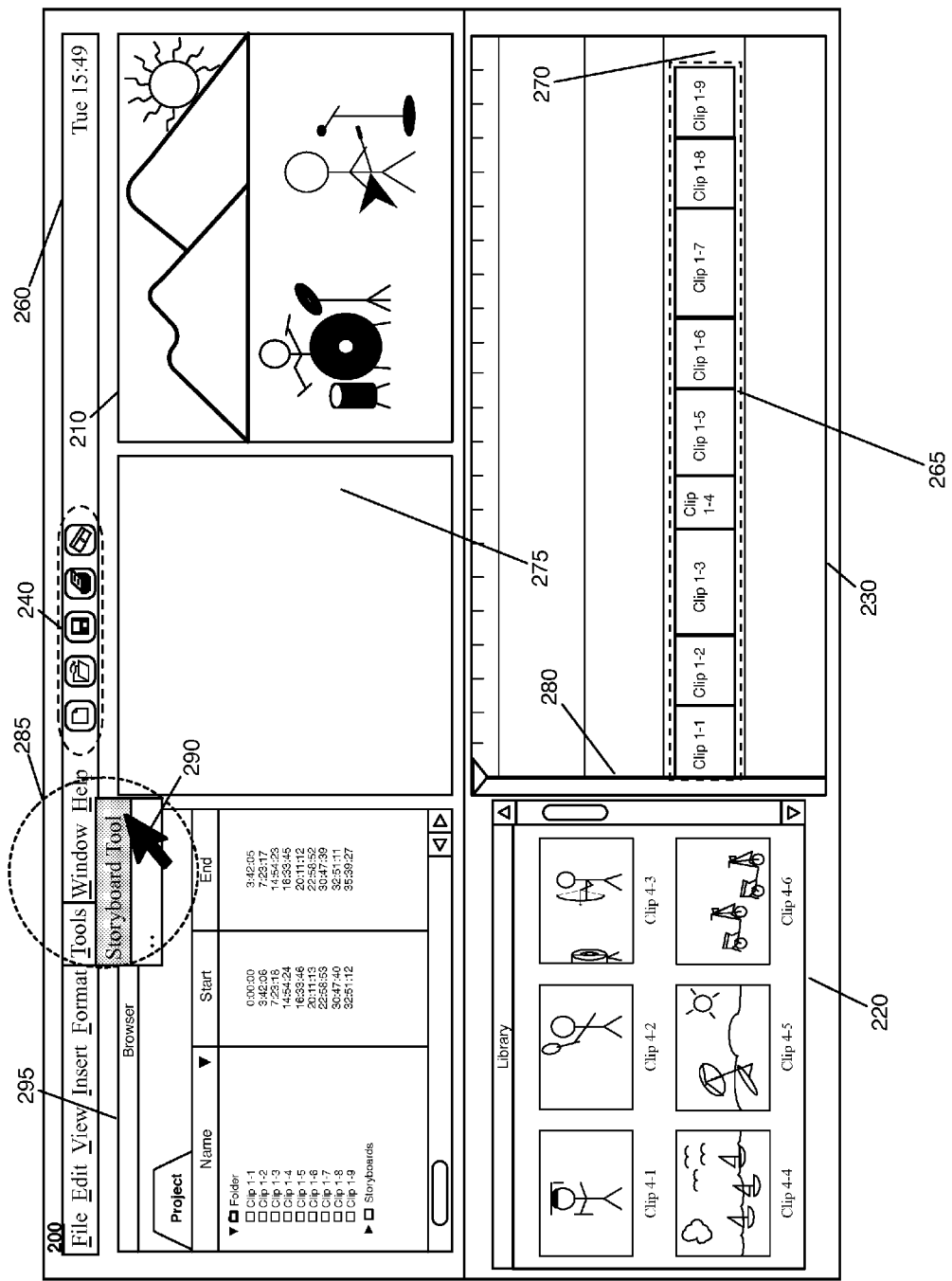
FIG. 2 illustrates a GUI of a media editing application with a storyboard tool of some embodiments.

For some embodiments, FIG. 2 illustrates a GUI 200 of a media editing application with such a storyboard tool. Specifically, this figure illustrates the layout of various components included in the user interface of one exemplary media editing application that includes the storyboard tool.

As shown in FIG. 2, the GUI 200 includes a preview display area 210, a media library 220, a composite display area 230, various buttons 240, a menu bar 260, a set of media clips 265, one or more audio or video tracks (e.g., track 270) in the composite display area, a playhead 280, a storyboard display area 275, a storyboard tool selection GUI item 285, and a browser 295.

The preview display area 210 displays a preview of a composite presentation that the media editing application creates by compositing several media clips. In some embodiments, the preview display area shows a representative frame of the composite presentation when the media editing application is not playing the composite presentation, as further described below.

The media library 220 is an area in the GUI 200 through which the application's user can select media clips to add to a presentation that the user is compositing with the application. In the example of FIG. 2, the clips in the media library are represented as thumbnail images that can be selected and added to the composite display area 230 (e.g., through a drag-and-drop operation or a menu selection operation). The clips in the media library can also be represented as a list, a set of icons, or some other representation that allows a user to view and select the various clips in the library. In some embodiments, the media library 220 can include audio clips, video clips, text overlays, pictures, and/or other media. The media library 220 can provide access to media that is stored locally on a device on which the application executes or remotely at a central location (e.g., a location accessed through a network). Also, in some embodiments, the media library can provide access to media content stored in the application's database or in the database of other applications executing locally or remotely. In other embodiments, the media library only provides access to media content stored in the database of other applications executing locally or remotely, as media content stored in the application's database are accessible through the browser 295, as further described below.

In some embodiments, media content can be selected from locations outside the media library 220 or the GUI 200. For instance, in some embodiments, a user selects media clips using other components of GUI 200 (e.g., by using menu commands provided by the menu bar 260, by copying a clip that is displayed in the composite display area 230, etc.). In addition, some embodiments allow a user to select media clips from a location outside the GUI 200 (e.g., the desktop, a folder that includes media content, a browser window, a GUI provided by another application, etc.) and place the content at a location within the GUI (e.g., in the media library 220, at a location in the composite display area 230, etc.).

The composite display area 230 displays one or more media clips that are part of the composite representation. In the example illustrated in FIG. 2, the composite display area 230 is an area that includes multiple tracks that span a timeline (e.g., track 270). A sequence of one or more media clips 265 can be placed on each track. In some embodiments, only one video track that can hold only one sequence of video clips is displayed on the timeline display area at a time.

The menu bar 260 provides several grouped sets of menu commands and options for the media editing application. As shown, the menu bar 260 includes the various buttons 240, which are conceptual representations of UI items that allow the user to control various aspects of the media editing application (e.g., by executing various commands, etc.). Although the buttons 240 are shown on the menu bar, one of ordinary skill in the art will appreciate that other embodiments can display the buttons differently. For instance, some embodiments can include the buttons 240 in a toolbar or floating palette, etc.

The cursor 290 provides feedback to a user and operates various selection items or other controls included in the GUI 200. In this example, the cursor 290 is shown selecting the storyboard tool selection GUI item 285 as indicated by the highlighted "Storyboard Tool" menu item in the dropdown menu for "Tools." In some embodiments, the cursor is controlled by a cursor controlling device, such as a mouse, a trackpad, etc. However, in some embodiments that are executed on devices with touch screen controls, the cursor can be controlled through touch screen controls. In these embodiments, touch control is implemented through an input device that can detect the presence and location of touch on a display of the device. An example of such a device is a touch screen device. In some embodiments, with touch control, a user can directly manipulate objects by interacting with the UI that is displayed on the display of the touch screen device. For instance, a user can select a particular object in the UI by simply touching that particular object on the display of the touch screen device. As such, when touch control is utilized, a cursor may not even be provided for enabling selection of an object of a UI in some embodiments. However, when a cursor is provided in a UI, touch control can be used to control the cursor in some embodiments.

The storyboard tool selection GUI item 285 is a conceptual representation of one or more UI items for activating a storyboard tool of some embodiments. Although the storyboard tool selection GUI item 285 is shown as a menu item in this figure, embodiments can present the storyboard tool selection GUI item 285 differently. For instance, embodiments can provide the storyboard tool selection GUI item 285 as a selectable button, a selectable item in a context menu or a drop-down list, a hot key control, etc.

The storyboard display area 275 can display a storyboard representation of the sequence of media clips (e.g., a sequence of video clips from the composite display area 230). The storyboard display area 275 of some embodiments is empty before the storyboard tool is activated. In this example, the storyboard display area 275 is a separate display area within GUI 200 from the composite display area 230. The storyboard display area 275 of some embodiments can be displayed differently, e.g., as a separate window from the GUI 200. In some embodiments, modifications to the arrangement of the clips in the story board display area 275 do not affect the arrangement of clips in the timeline display area 230, until the user synchronizes the arrangement of the clips in these two areas, as further described below. However, in other embodiments (e.g., in some of the embodiments that display the storyboard display area 275 separately from the GUI 200), the storyboard display area 275 and GUI 200 can conjunctively perform various operations (e.g., modifications to items in the storyboard display area 275 can affect the display of the GUI 200, the data included in a composite project that is active in the GUI 200, etc.).

The playhead 280 highlights an instance in time in the composite representation that is being shown in the composite display area. Highlighting this instance in time is useful for a variety of reasons. For example, when viewing a preview of the composite presentation in the preview display area 210, the playhead 280 scrolls across the timeline to identify the location in the composite representation in the composite display area 230 that is being currently displayed in the preview display area 210. In addition, the playhead 280 location also acts as an insertion point when adding clips, effects, or other media to the project.

The browser window 295 provides an alternative area for viewing and organizing clips in one or more sequences of a project. In the example illustrated in FIG. 2, the browser 295 includes a folder structure for organizing a list of video clips along with metadata (e.g., time code information for start and end times of respective clips) about the video clips. In some embodiments, the browser window and GUI can conjunctively perform various operations (e.g., modifications to items in the browser window can affect the display of the GUI 200, the data included in a composite project that is active in the GUI 200, etc.).

In the example illustrated in FIG. 2, the browser window 295 also includes a folder structure for organizing a list of storyboards. In some embodiments, the list of video clips is the list of video clips in a particular sequence of video clips, and the metadata specifies in and out points, durations, etc., for the video clips. The list of storyboards in some embodiments are a set of storyboards that include respective storyboard representations. The browser window 295 in some embodiments also provides access to media content imported into the media content database of the media editing application in some embodiments.

Figure 3:
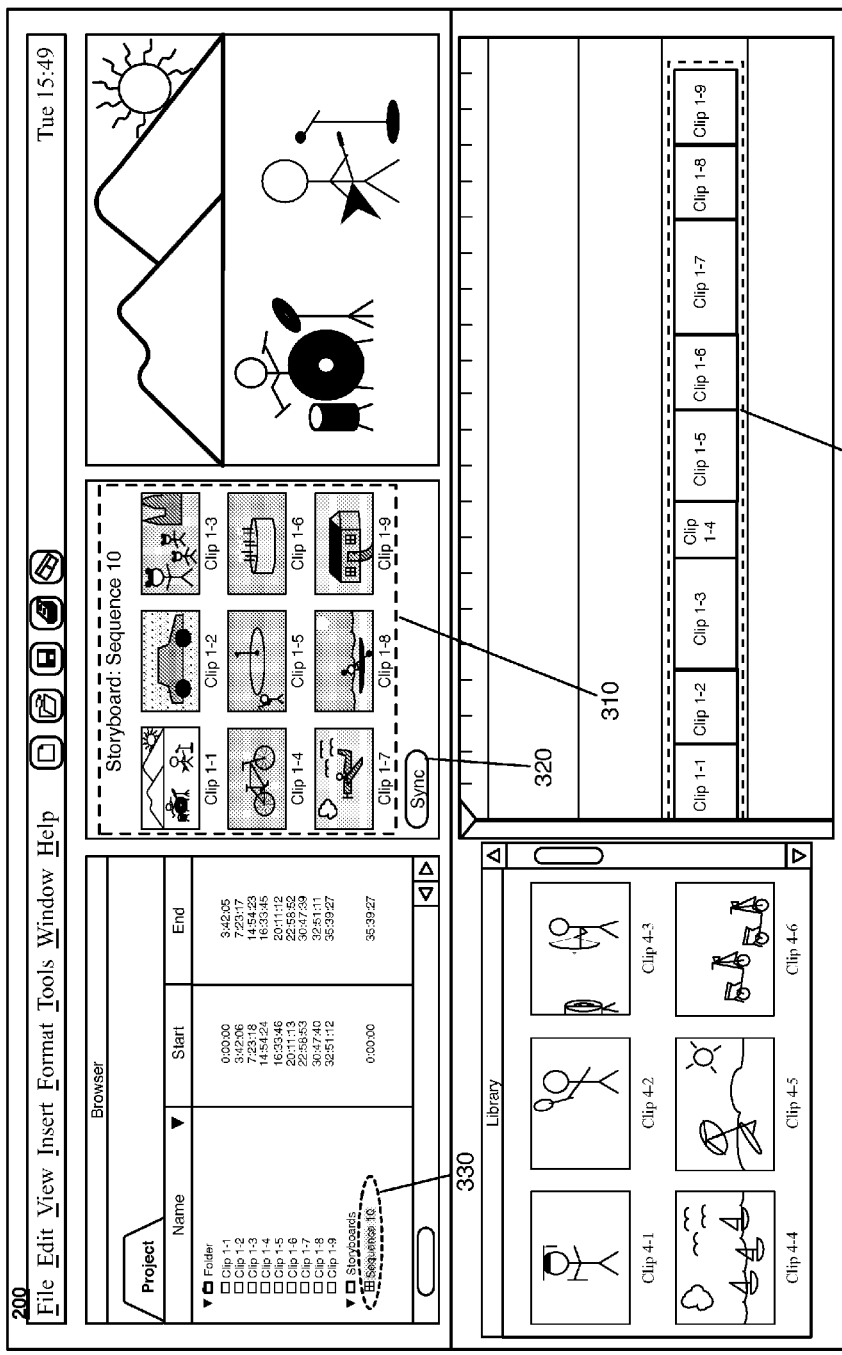
FIG. 3 illustrates another example GUI of a media editing application displaying a storyboard representation of a composite presentation of some embodiments.

FIG. 3 illustrates another example of the GUI 200 of the media editing application. In this example, the GUI is displaying a storyboard representation of a composite presentation of some embodiments. Specifically, this figure shows an example of the GUI 200 after the storyboard tool has been activated to display a storyboard representation of the sequence of media clips 265 in timeline display area of the composite display area. In some embodiments, the storyboard tool is activated after the user has selected a storyboard tool selection GUI item.

The GUI 200 in this figure is the same GUI described above in reference to FIG. 2. In addition to the elements described above in reference to FIG. 2, the GUI 200 of FIG. 3 includes a set of thumbnail images 310, a sync GUI item 320 and a sequence storyboard GUI item 330.

The set of thumbnail images 310 form a storyboard representation for a sequence of media clips in the timeline display area of the composite display area. In this example, the set of thumbnails 310 form the storyboard representation for the sequence of media clips 265 shown in the timeline display area.

In some embodiments, the set of thumbnail images 310 are displayed in the storyboard display area after the storyboard tool is activated to open the sequence of media clips currently displayed on the timeline display area. Each thumbnail image is respectively associated with a corresponding clip in the timeline display area. For instance, the thumbnail of Clip 1-1 shown in FIG. 3 is associated with the corresponding Clip 1-1 in the timeline display area of the composite display area.

The initial order sequence of these thumbnail images mirrors the order of their corresponding clips in the sequence. The thumbnail images 310 in this example are arranged in the storyboard display area in ascending sequential order from left to right and top to bottom in multiple sequentially arranged rows. Although FIG. 3 illustrates the thumbnail images in a particular arrangement, some embodiments arrange the storyboard display area and its set of thumbnail images differently. For instance, some embodiments present the set of thumbnail images in a single row, in a single column, multiple columns, or multiple rows and columns, etc. Some embodiments can present a different sequential order than the order described above. For example, embodiments can present the thumbnail images in descending sequential order from left to right and top to bottom.

When the size or number of the thumbnail images in the storyboard display area exceeds a certain size or number, some of the thumbnails scroll off the storyboard display area in some embodiments. To address this scenario, some embodiments provide a slider or similar UI item (not shown) to allow the user to scroll through the thumbnails in the storyboard display area. Instead of this approach, or in conjunction with it, some embodiments provide zoom controls to adjust the size of the thumbnail images that are displayed in the storyboard display area.

The sync GUI item 320 synchronizes the storyboard arrangement of a sequence of clips to the sequential arrangement of the sequence of clips in the composite display area. In some embodiments, the storyboard tool performs a synchronization operation when the sync GUI item 320 is selected in the manner further described below by reference to FIG. 18.

The sequence storyboard GUI item 330 represents a sequence storyboard ("Sequence 10") included in the current project of the media editing application. In this figure, the sequence storyboard GUI item 330 is displayed under a particular folder ("Storyboards") in the browser window. The sequence storyboard GUI item 330 is associated with the display of thumbnail images (i.e., the storyboard representation) shown in the storyboard display area of this example. In some embodiments, the user can select the sequence storyboard GUI item 330 to display the storyboard representation in the storyboard display area.

Figure 4:
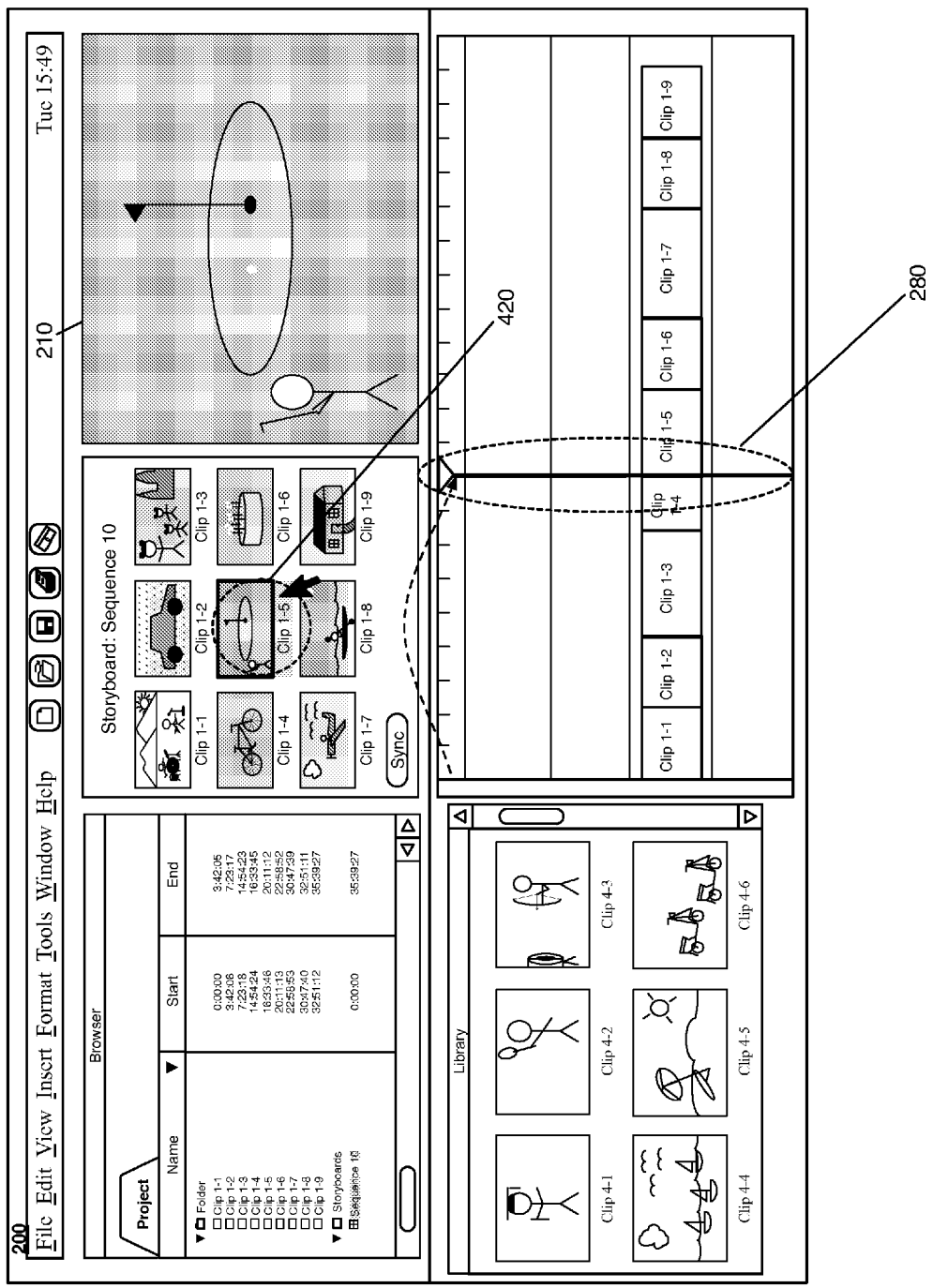
FIG. 4 illustrates another example GUI of a media editing application for navigating a storyboard representation of a composite presentation of some embodiments.

FIG. 4 illustrates another example the GUI 200 of the media editing application. This example illustrates using the storyboard representation to navigate the composite presentation that is displayed in the composite display area in some embodiments. Specifically, this figure shows an example of the GUI after a particular thumbnail in the storyboard display area is selected, which invokes in some embodiments a navigation function of the storyboard tool. The GUI 200 is the same GUI described above in reference to FIGS. 2 and 3. In this example, the GUI 200 of FIG. 4 shows a thumbnail image 420 selected, the playhead 280 at a different position in the timeline display area than illustrated in FIGS. 2 and 3, and the preview display area 210 displaying a different representative frame to reflect the new position of the playhead in the composite display area.

In the example illustrated in FIG. 4, the user has selected the thumbnail image 420 in the storyboard display area (e.g., through a left-click cursor operation, a keyboard cursor control operation, a touch-screen operation, or other UI selection operation) as indicated by the highlighted thumbnail image 420. Responsive to this selection, the storyboard tool of some embodiments moves the position of the playhead to a position on the timeline display area corresponding to the associated media clip of the selected thumbnail image. In this example, the selected thumbnail image 420 corresponds to Clip 1-5 in the timeline of the composite display area. Therefore, the storyboard tool in this example moves the position of the playhead 280 as shown in FIG. 3 to the position of Clip 1-5 in the timeline display area.

One of ordinary skill in the art will recognize that actual implementations of various media editing applications can differ from the conceptual representations shown in FIGS. 2-4. For instance, a particular implementation can include different and/or additional display areas, menus, controls, etc. than those shown in FIGS. 2-4. In addition, although various examples below show specific controls, selection options, etc., one of ordinary skill in the art will recognize that other specific controls, selection options, and/or other components can be implemented in various different ways. For instance, although shown as buttons 240 in GUI 200, the operations associated with such buttons 240 can be associated with various other controls and/or operations (e.g., an option of a pull-down menu, a series of keystrokes, a voice command, etc.).

II. Sequence Storyboards

Several different example operations for creating and modifying a storyboard representation of a sequence of media clips will now be described by reference to FIGS. 5-9, 12, 15, 17, 19 and 20. These figures illustrate the same GUI 200 as described above in reference to FIGS. 2-4 with the exception that the browser window 295 has been replaced by a sidebar display area 540, which will be further explained below.

Figure 5:
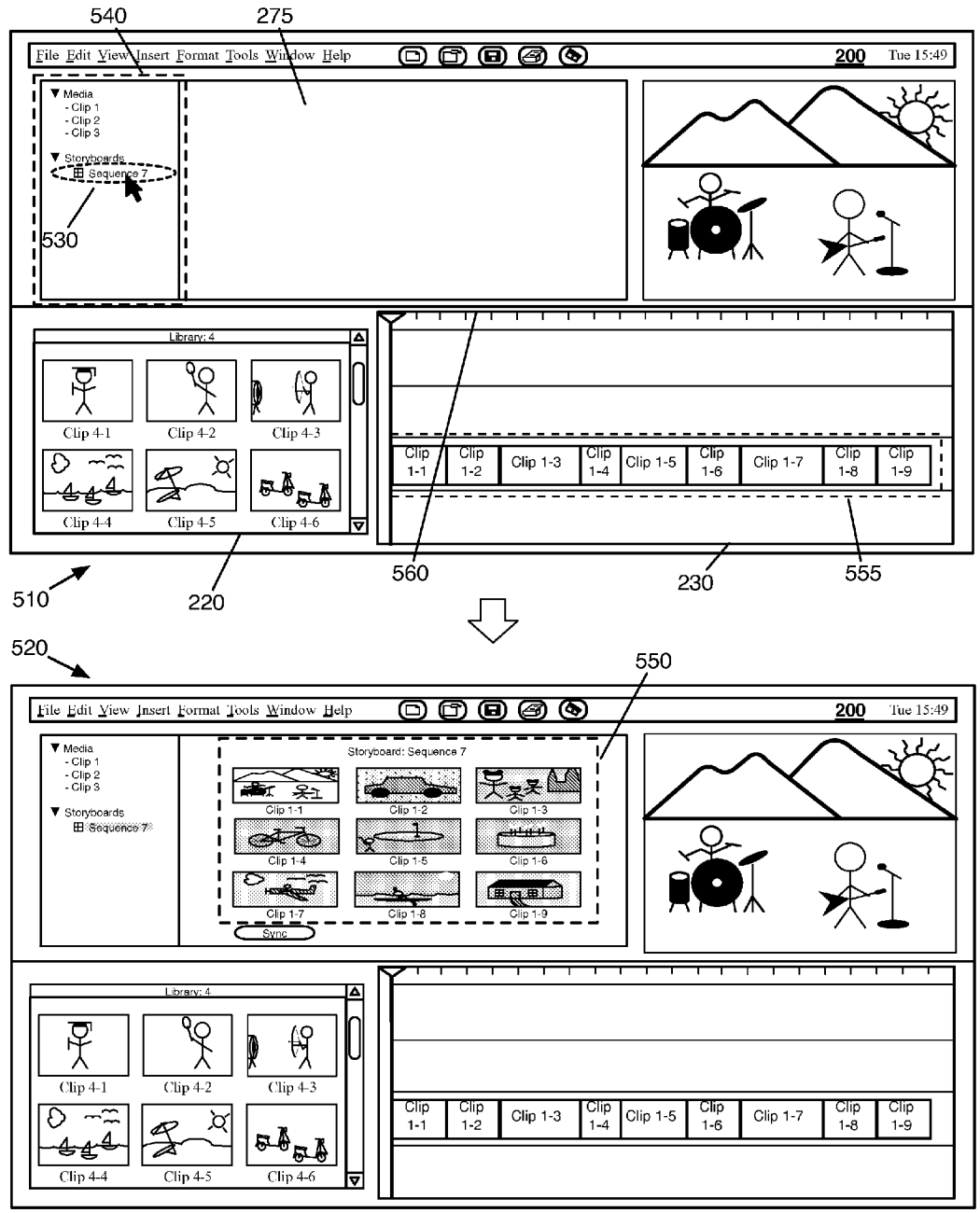
FIG. 5 illustrates a way for creating a sequence storyboard of some embodiments.

FIG. 5 illustrates a way for creating a sequence storyboard of some embodiments. Specifically, this figure shows an example of the creation of the sequence storyboard using various GUI elements of the GUI 200. In addition to the elements described above in reference to FIGS. 2-4, the GUI 200 of FIG. 5 includes a sidebar display area 540 that is adjacent to the storyboard display area 275. As shown, FIG. 5 illustrates the GUI 200 at two stages 510 and 520 for creating the sequence storyboard. Each of these stages will be described in more detail below after an introduction of the sidebar display area 540.

The sidebar display area 540 in some embodiments is an area of the GUI 200 that displays several selectable items representing different types of storyboards. These storyboard types may include a sequence storyboard and a clip storyboard. In some embodiments, a sequence storyboard is a storyboard that corresponds to a sequence that is displayed along a timeline (e.g., in the composite display area). For instance, in some embodiments, when a media editing application is designed to display only one sequence of clips along the timeline 560, one selectable item representing the sequence may be displayed in the sidebar display area 540. Also, when a media editing application displays no sequence of clips, the sidebar display area 540 may not list any item corresponding to a sequence storyboard.

Different from the sequence storyboard, a clip storyboard in some embodiments represents a storyboard that does not correspond to a sequence that is displayed along the timeline. That is, the clip storyboard represents a canvas of arranged clips that can be committed to modify or replace the sequence in the timeline. An application's user may define multiple different clip storyboards and associate them to any one sequence. As will be described in Section III below, once defined, the user can use the storyboard tool in some embodiments to commit a clip storyboard to a sequence displayed along the timeline. This in turn may cause a sequence storyboard corresponding to the sequence of clips in the timeline to be modified.

In some embodiments, the sidebar display area 540 displays a library of assets that are available to add to a storyboard (e.g., a sequence storyboard, clip storyboard) and/or a sequence of clips displayed along the timeline. In some embodiments, these assets represent a database of different media content added and/or imported with the media editing application. By contrast, the media library 330 in some embodiments represents a cross-application library that provides access to media content stored in the application's database and/or in the database of other applications that execute locally or remotely.

In the example illustrated in FIG. 5, the sidebar display area 540 displays a listing of media in an organized structure (e.g., in a categorical structure). Specifically, the sidebar display area 540 displays three media clips under a media category and displays a sequence storyboard under a storyboard category. However, the items in the sidebar display area may be represented differently. For instance, the sidebar display area 540 may display different category of items (e.g., a library, audio clips, video clips, picture, events, etc.), display a different organization structure (e.g., a hierarchical structure such as a folder), etc. In some embodiments, a selection of an item such as a library item causes a display area of the GUI 200 (e.g., the storyboard display area 275) to display each asset associated with the selected item. In some embodiments, the storyboard section of the sidebar display area is associated with a particular project an application's user is creating or editing, and the items in the media section represent the library of assets that are available to user for the project.

In many of examples described below, the sidebar display area 540 is displayed instead of the browser window 295. However, the media editing application may provide only the browser window 295, or both the browser window and the sidebar display area 540. For instance, in some embodiments, the GUI 200 may include different selectable items (e.g., menu items, toolbar item) for displaying the browser window and/or the sidebar display area. Also, in the examples described below, a storyboard is displayed in the storyboard display area 275 when a selectable item corresponding to the storyboard is selected from the sidebar display area 540. In some embodiments, the media editing application provides a similar selectable items (e.g., a folder structure corresponding to a sequence storyboard) in the browser window 295 for displaying a storyboard.

Having described the sidebar display area 540, the operations will now be described by reference to the state of this GUI 200 during the two stages 510 and 520 that are illustrated in FIG. 5. In the first stage 510, the sidebar display area 540 includes a sequence item 530 representing a sequence storyboard. Specifically, the sequence item 530 is a user selectable item that when selected causes a sequence storyboard to be displayed in the storyboard display area 275. The sequence storyboard represents the sequence of media clips 555 that is currently displayed in the composite display area. In this example illustrated in FIG. 5, the sequence item includes a title (i.e., "Sequence 7") that corresponds to the title of the sequence of media clips 555. Alternatively, or conjunctively, the sequence item may be displayed with other textual or graphical indications.

As shown, in the first stage 510, the sidebar display area 540 only displays one selectable item for a storyboard that corresponds to the sequence displayed in the composite display area. However, the sidebar display area 540 may display other selectable items. For instance, the sidebar display area may display several different selectable items that represent different clip storyboards, as will be described in detail below by reference to FIGS. 21-25.

In the first stage 510, a cursor is placed over the sequence item 530. Through a cursor click operation, the user can select the sequence item to open the sequence storyboard. One of ordinary skill in the art will recognize that other operations can be used to select a particular storyboard from the sidebar display area. For instance, a user can perform a combination of keystrokes, use a hotkey to select a particular sequence storyboard, etc. Some embodiments activate the storyboard tool upon selection of a particular sequence storyboard in the sidebar display area 540. When activated, the media editing application in some embodiments presents a particular storyboard representation in the storyboard display area 275.

The second stage 520 illustrates the GUI 200 after the user's selection of the sequence item 530. The selection of the sequence item 530 causes the sequence storyboard representation 550 to be displayed in the storyboard display area 275. As shown, the storyboard representation 550 includes a set of thumbnail images representing the media clips that make up the sequence in the composite display area 230. Specifically, in this example, the set of thumbnail images are arranged in three rows in ascending sequential order from left to right and top to bottom. Each thumbnail image is respectively associated with a corresponding clip in the sequence of media clips 555. For instance, the set of thumbnail images of the sequence storyboard representation 550 are sequentially arranged in the storyboard display area 275 to reflect the sequential order of the clips corresponding to clips 1-1 to 1-9 in the composite display area 230.

In the example described above, the storyboard display area 540 displays only one sequence item for opening the sequence storyboard 550 corresponding to the sequence of media clips in the composite display area. In some embodiments, when a clip storyboard is committed to a timeline (e.g., associated with a folder structure in the browser window), some embodiments display the committed clip storyboard as a sequence storyboard in the sidebar display area.

Figure 6:
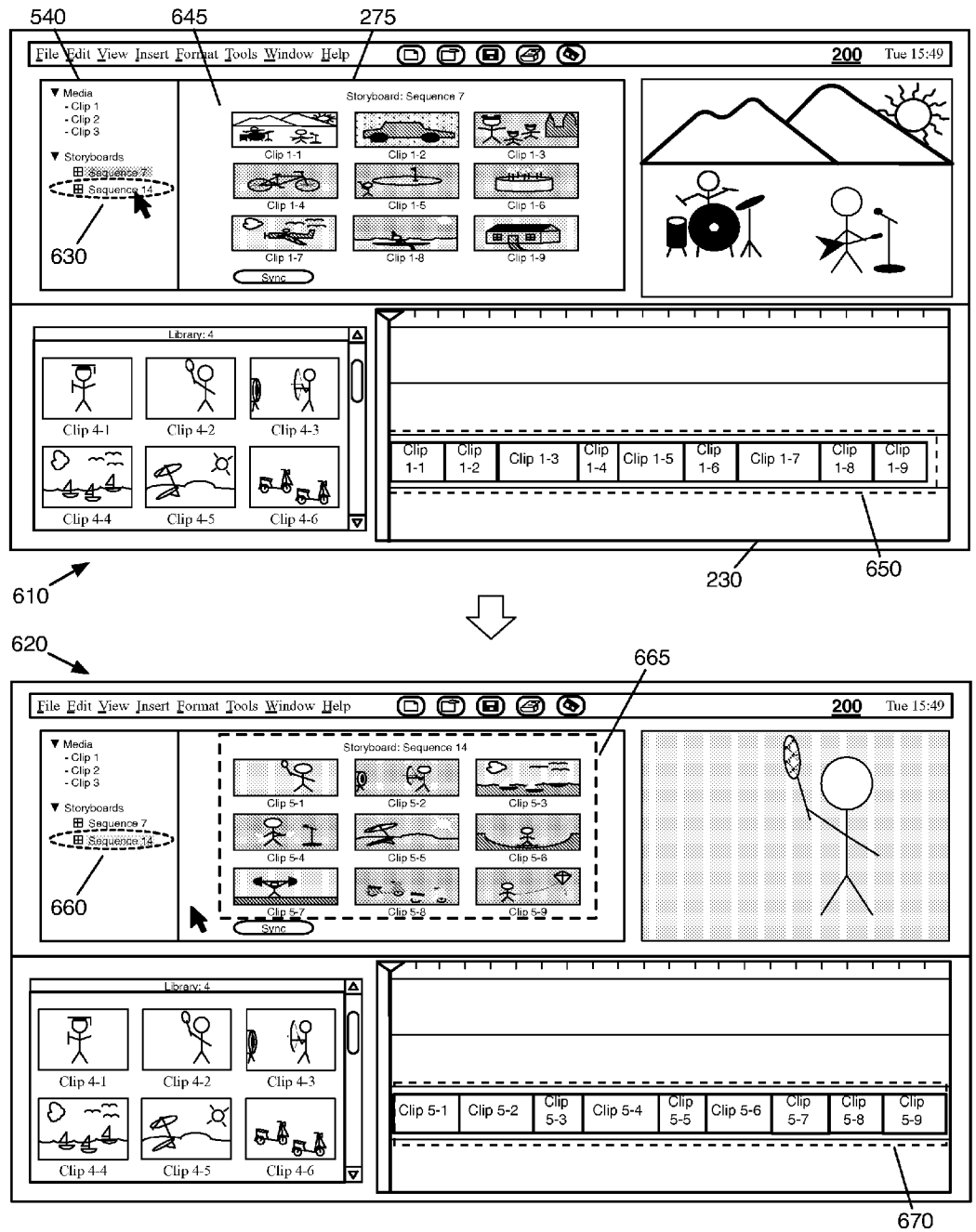
FIG. 6 illustrates a way for toggling between different sequence storyboards of some embodiments.

FIG. 6 illustrates an example of selecting a sequence item from a list of different items. Specifically, this figure illustrates switching from a first sequence storyboard 645 to a second sequence storyboard 665 by selecting a sequence item 630. Two operational stages 610 and 620 of the GUI 200 are shown in FIG. 6. The GUI 200 is the same as the one described above by reference to FIG. 5.

The first stage 610 illustrates the GUI 200 displaying the sequence storyboard 645 corresponding to "Sequence 7" in the storyboard display area 275. In this example, the sequence storyboard 645 displayed in the storyboard display area 275 is the same as the one illustrated in stage two 520 of FIG. 5. Specifically, to display the sequence storyboard 645, the user has selected the sequence item 530 (e.g., through a cursor click operation, touch operation). The sidebar display area also includes the sequence item 630.

In the first stage 610, the cursor is placed over the sequence item 630 to open the sequence storyboard 630. The storyboard 630 represents a different sequence storyboard that is not currently displayed in the storyboard display area 275. In the example illustrated in FIG. 6, the user opens up the different sequence storyboard through a cursor click operation after positioning the cursor over the sequence item 630 in the sidebar display area. However, the selection of the sequence item 630 can be received through a touchscreen (e.g., a user touching a UI item on a touchscreen), through a keyboard input (e.g., a hotkey or a key sequence), etc.

The second stage 620 illustrates the GUI 200 after the user's selection of the sequence item 630. The selection of the sequence item 630 causes the sequence storyboard representation 665 to be displayed in the storyboard display area 275. In some embodiments, the selection also causes a sequence of clips associated with the sequence storyboard 665 to be displayed in the composite display area 230. This is illustrated in second stage as the composite display area 230 displays a sequence of media clips 670 for clips 5-1 to 5-9. This sequence of media clips 670 corresponds to the storyboard representation 665 displayed in the storyboard display area 272. The sequence of media clips 670 are in a sequential order that reflects the sequential order of the thumbnail images shown in the storyboard display area 275.

In the example illustrated in FIG. 6, two different sequence items are displayed in the sidebar display area 540. However, one of ordinary skill in the art will realize that any number of different sequence items may be represented in the sidebar display area. The user can then select any one of these different storyboard sequences to display a particular storyboard sequence in the storyboard display area along with the corresponding sequence of media clips in the composite display area of the GUI 200.

In some embodiments, the media editing application allows a user to edit a composite presentation by rearranging thumbnail images in the storyboard display area 275. For instance, when the user moves the thumbnails to edit their order in the storyboard display area 275, the media editing application displays the thumbnails according to the edited order of thumbnails.

Figure 7:
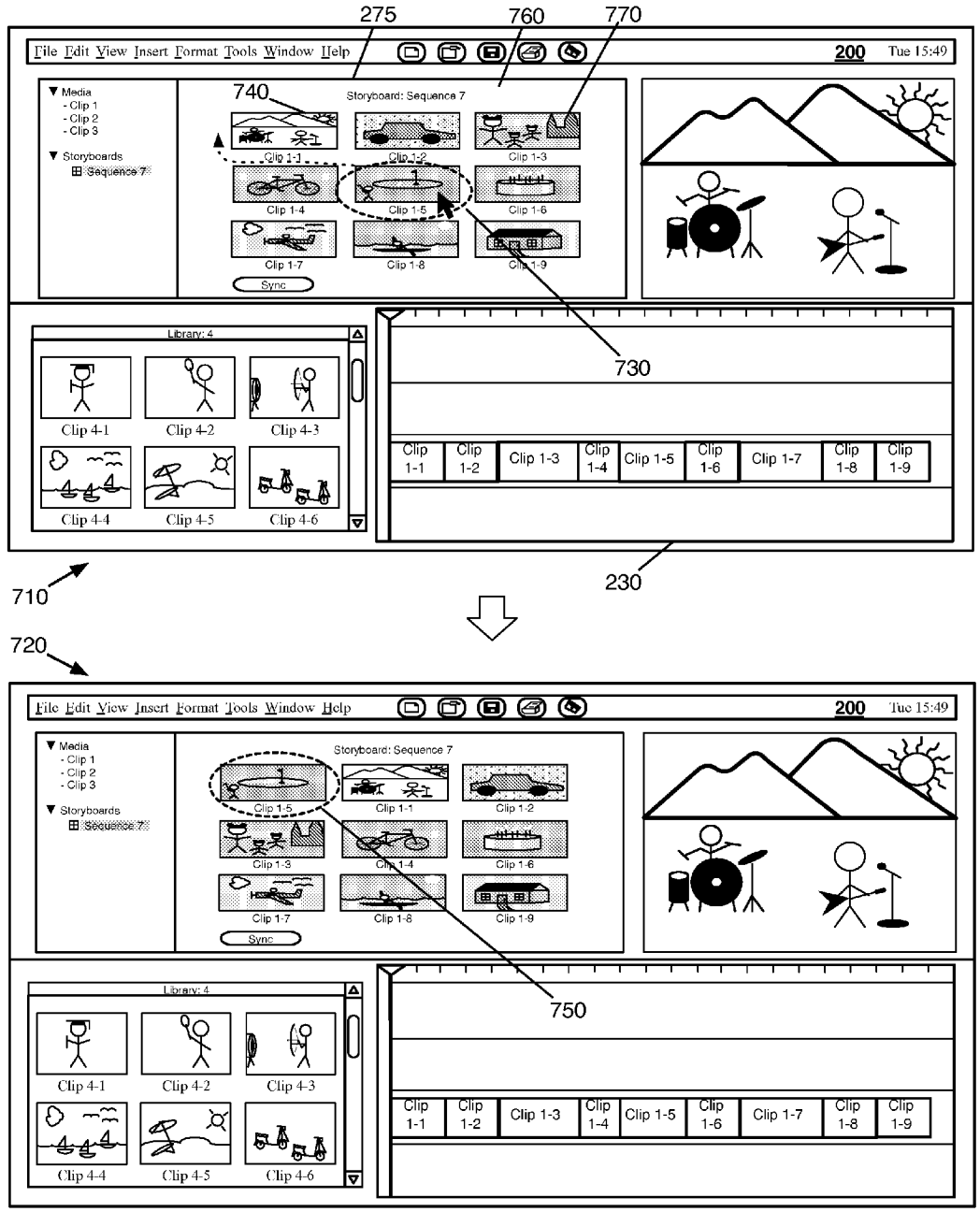
FIG. 7 illustrates a way for moving a selected thumbnail image of a sequence storyboard of some embodiments.

FIG. 7 illustrates an example of rearranging thumbnail images of a sequence storyboard 760. Specifically, this figure shows moving a thumbnail image 730 of the sequence storyboard from a fifth position to a first position. Two operational stages 710 and 720 of the GUI 200 are shown in FIG. 7. The GUI 200 is the same as the one described above by reference to FIGS. 5 and 6.

The first stage 710 shows an example selection and movement of the thumbnail image 730. Specifically, the user has selected the thumbnail image 730 using the cursor (e.g., through a cursor click operation, touch operation). The user has also moved the thumbnail image 730 (e.g., through a drag and drop operation) from the fifth position to the first position that is the adjacent left of a thumbnail image 740. To conceptually illustrate the movement of the thumbnail image 730, a dashed line that connects the fifth position to the first position is shown in the first stage 710.

The second stage 720 shows the GUI 200 after the media editing application has updated the storyboard display area 275 in response to the movement of thumbnail image 730. As shown, instead of the fifth position within the storyboard sequence 760, the thumbnail image 730 is displayed at the first position. The position of the thumbnail image 730 indicates that this thumbnail image is now sequentially earlier than the adjacent thumbnail image corresponding to Clip 1-1. However, the movement of the thumbnail image did not affect the arrangement or order of the associated media clips in the timeline display area of the composite display area as shown in the second stage. In this manner, the storyboard tool of some embodiments allows the user to re-order the thumbnails in the storyboard display area 275 in a non-destructive way with respect to the composite representation in the composite display area 230.

In the example illustrated in FIG. 7, one thumbnail image 730 is selected and moved to rearrange the storyboard sequence 760. Some embodiments allow multiple thumbnail images to be selected at the same time and moved to a different position to rearrange the storyboard sequence. For instance, a third thumbnail image 770 and the fifth thumbnail image 730 may be repositioned as the first and second thumbnails by selecting both the first and fifth thumbnail images and moving them together to the first position.

Figure 8:
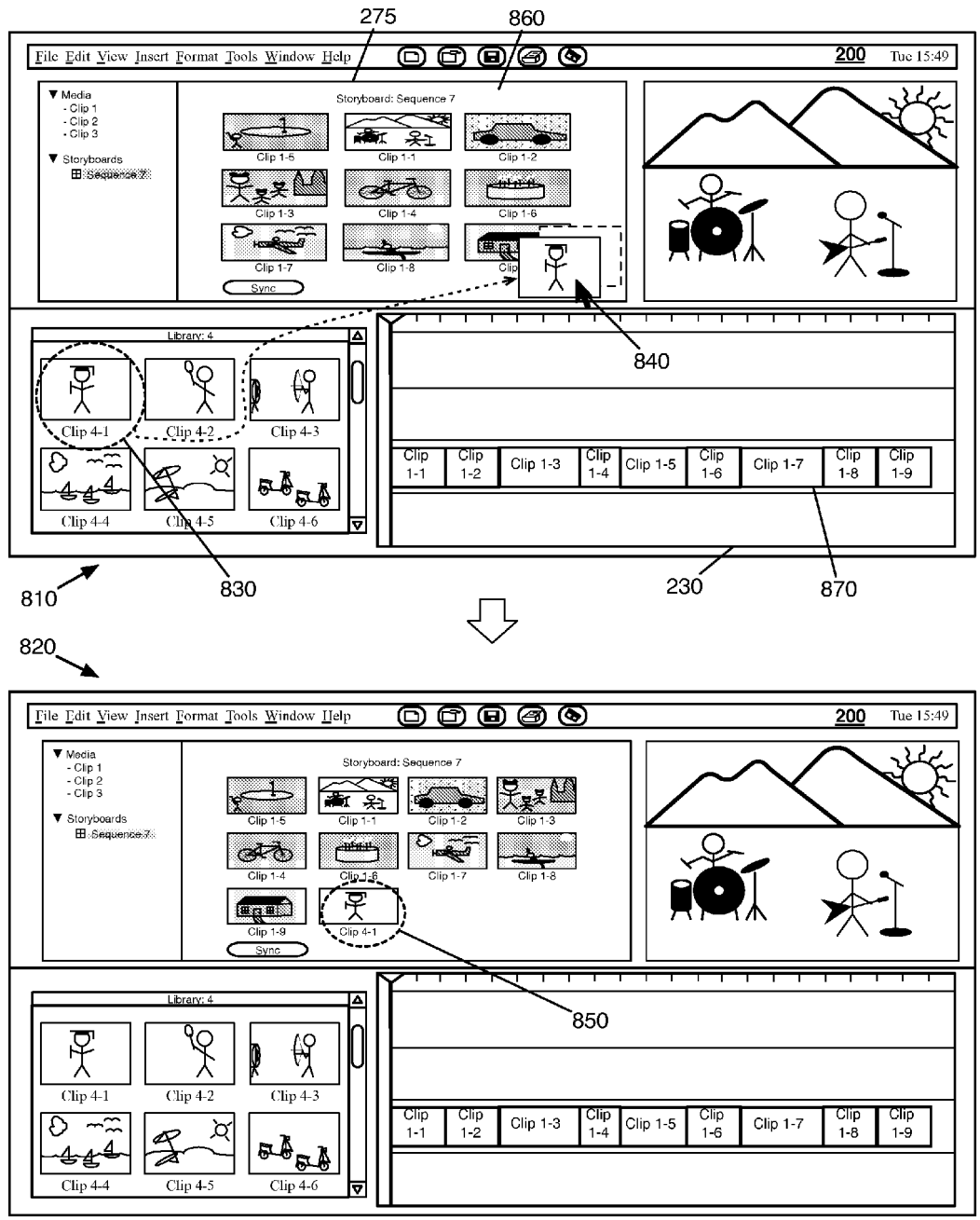
FIG. 8 illustrates a way for adding a new media clip to a sequence storyboard of some embodiments.

FIG. 8 illustrates a way for adding a new media clip to a sequence storyboard of some embodiments. Specifically, this figure shows an example of adding a new media clip to the sequence storyboard displayed in the storyboard display area of the GUI 200. As shown, FIG. 8 illustrates the GUI 200 at two stages 810 and 820 for adding the new media clip in the storyboard display area.

In the first stage 810, the media library displays several thumbnail images that correspond to different media clips. However, the clips in the media library may also be represented as a list, a set of icons, or some other representation that allows a user to view and select the various clips in the library. As mentioned above, in some embodiments, a clip in the media library can be selected and added to the composite display area (e.g., through a drag-and-drop operation or a menu selection operation). This selection and movement causes the media clip to be added to the composite presentation. Some embodiments allow one or more clips to be added to a storyboard sequence in a similar manner.

As shown in the first stage 810, the thumbnail image 840 is added to the sequence storyboard by a user selection and movement of the clip thumbnail 830. Specifically, to add the clip associated with the clip thumbnail 830, the user selects and moves the clip thumbnail 840 to a last position within the sequence storyboard 860. One of ordinary skill in the art would understand that embodiments can use different operations to select the media clip in the media library. For instance, a user can perform a combination of keystrokes (e.g., copy and paste), use a hotkey to select a particular media clip from the media library and move it to the storyboard display area, etc. Although this example shows that a single clip from the media library is moved into the storyboard, some embodiments allow multiple clips to be moved at the same time in order to add the selected clips to the storyboard sequence.

The second stage 820 illustrates the GUI 200 after the storyboard tool has updated the storyboard display area to include the thumbnail image 840. The example shows that a thumbnail image 850 corresponding to the thumbnail image 840 from the first stage has been included in the third row of thumbnail images in the storyboard display area of GUI 200.

In some embodiments, the media editing application automatically arranges the thumbnail images to display all thumbnail images in the storyboard display area 275 at a same time. For instance, the thumbnail images may be arranged by resizing the thumbnail images, displaying more thumbnail images in a particular row, etc. This is illustrated in the second stage 820 as the thumbnail images in the sequence storyboard 860 are resized. In addition, the number of thumbnail images in a particular row has increased from three per row to four per row. Specifically, the thumbnail images are sequentially arranged such that the sequence storyboard 860 includes three rows and four columns with the thumbnail image 850 in the third row occupying the last sequential position of the storyboard representation in the storyboard display area. Instead of displaying all thumbnail images, the media editing application may provide selectable user-interface controls to scroll through any images that are not displayed in the storyboard display area 275. Alternatively, or conjunctively, some embodiments provide an adjustable zooming UI controls (e.g., a slider) to granularly adjust the number of thumbnail images displayed in the storyboard display area.

In the example illustrated in FIG. 8, the addition of the selected clip to the sequence storyboard does not affect the number of clips in the composite presentation. In other words, as shown by the media clip sequence 870 in the composite display area 230, the number of clips remains the same. As will be described in detail below by reference to FIG. 17, some embodiments allow the sequence storyboard to be synchronized with the media clip sequence in the composite display area.

Figure 9A:
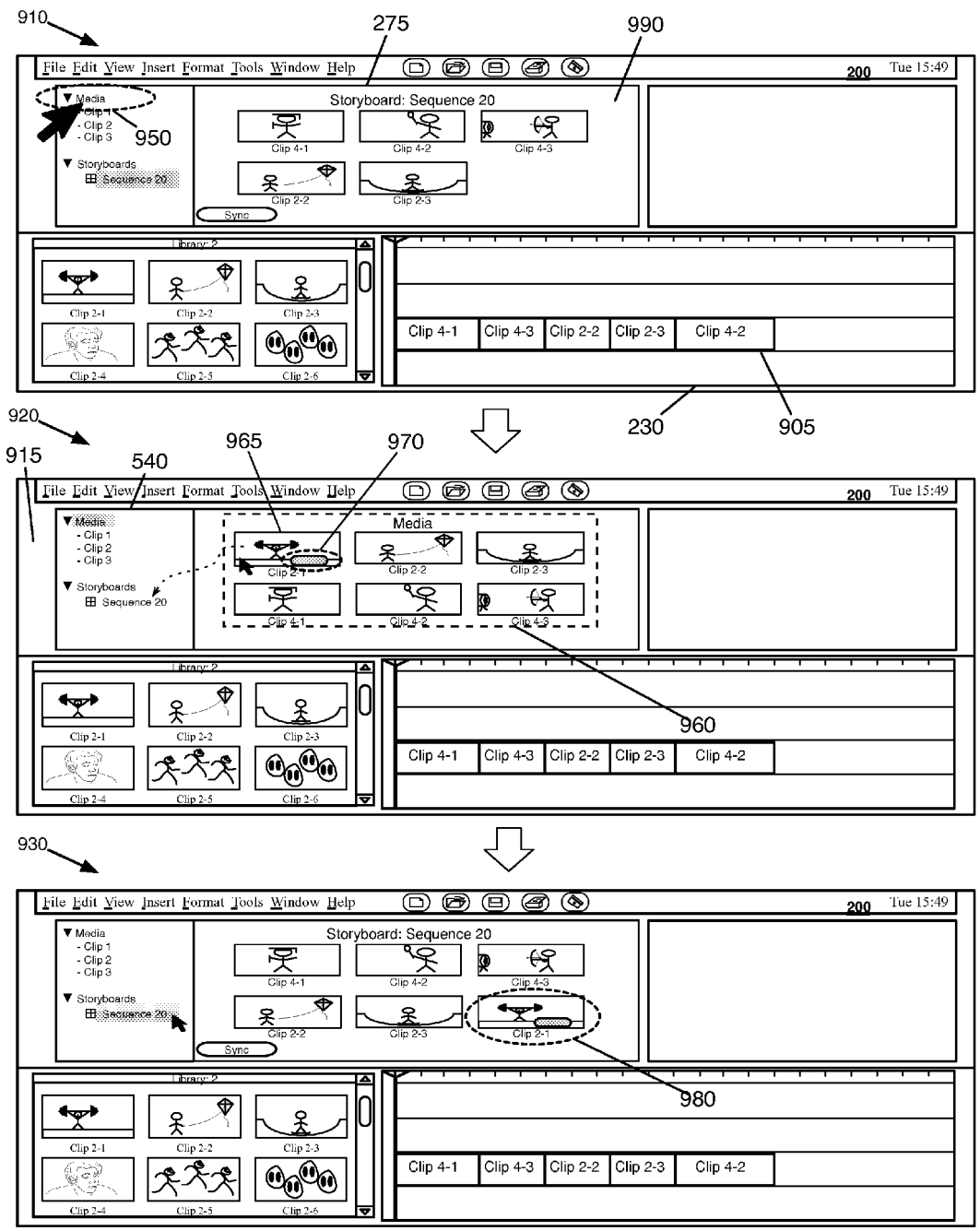
FIG. 9A illustrates a way for adding a new media clip with a region of interest to a sequence storyboard of some embodiments.
Figure 9B:
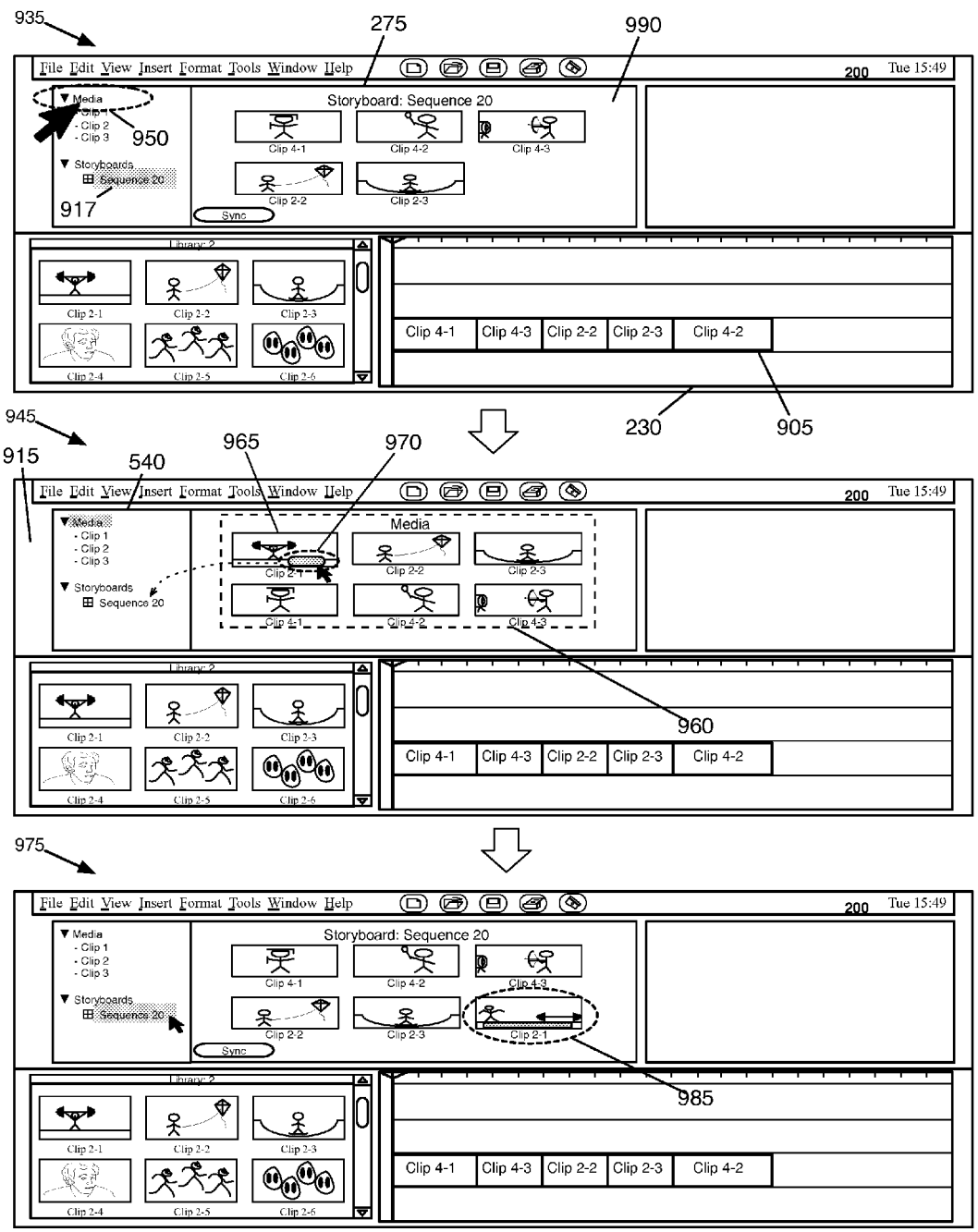
FIG. 9B illustrates an example of adding only a region of interest of the media clip to a sequence storyboard.

In the example of FIG. 8, an entire temporal length of the selected media clip from the media library is added to the sequence storyboard. However, in some cases, the user may desire to select a portion of the temporal length of the selected media clip to add to the sequence storyboard. Some embodiments, therefore, enable a user to mark a region of interest of a media clip to only add this region of interest to the sequence storyboard. A marked region of interest is a temporal portion of a media clip that is selected by the user. Marking the region of interest can be provided in a number of different ways. For example, the media editing application may allow the user to specify respective start and end points for the selected media clip. This can be accomplished by providing an editing or trimming tool to define the region of interest for the selected clip. After marking the region of interest, the user can then add the marked region of the selected media clip to the storyboard. Several examples are described below by reference to FIGS. 9A and 9B. Specifically, FIG. 9A illustrates adding an entire clip having a marked region of interest to a storyboard, while FIG. 9B illustrates adding only a region of interest of the media clip to a sequence storyboard. These figures are followed by FIGS. 10 and 11 that describe two example techniques for marking a region of interest for a media clip.

FIG. 9A illustrates an example of adding an entire media clip with a predefined region of interest to a sequence storyboard. Three operational stages 910, 920, and 930 of the GUI 200 are shown in FIG. 9A. The GUI 200 is the same as the one described above by reference to FIGS. 5-8. The first stage 910 shows a sequence storyboard 990 in the storyboard display area 275. The sequence storyboard 990 is associated with the media clip sequence 905 in the composite display area 230. Also, the cursor is placed over the media item 950 to displays several clips. In some embodiments, the activation of the media item 950 causes the storyboard display area to display several media clips. In some embodiments, these media clips represent an internal library of media clips that can be selected and added to the sequence storyboard and/or the composite display area of the media editing application. For instance, the media clips may include a set of predefined media clips, with each of these predefined clips having a user-specified region of interest.

The second stage 920 shows the GUI 200 after the activation of the media item. Specifically, the selection of the media item 950 causes the storyboard display area to display several thumbnail images that represent several media clips. Also, in the second stage 920, the thumbnail images 960 include a thumbnail image 965 that represents a media clip 2-1 with a marked region of interest 970. The second stage 920 of FIG. 9A also shows the user selecting the thumbnail image 965 with a region of interest 970 and moving the thumbnail image 965 (e.g., via a drag and drop operation) to the sequence item is displayed in the sidebar display area 540. In this manner, the user can add the entire media clip with the region of interest to the sequence storyboard.

The third stage 930 shows the GUI 200 after adding the media clip with the region of interest from the second stage to the sequence storyboard 990. In the example, the user has selected the sequence item 917 in the sidebar display area 540. After selecting the sequence item 917, the media editing application displays the sequence storyboard representation 990 with a thumbnail image 980 corresponding to the added clip. As shown, the thumbnail image 980 is positioned to the adjacent right of the thumbnail image for clip 2-3 as the last sequential clip in the sequence storyboard. Also, in this example, the thumbnail image 980 is displayed with a visual indication that indicates that the corresponding clip has a marked region of interest. In some embodiments, when an entire clip is added to a storyboard, the media editing application might not display such visual indication, and/or only display it when only a portion of the media clip corresponding to the marked region of interest is added to the storyboard.

In the previous example an entire media clip having a marked region of interest was added to the sequence storyboard 990. FIG. 9B illustrates adding only a portion of the duration of the clip corresponding to the marked region of interest to the sequence storyboard 990. Three operational stages 935, 945, and 975 of the GUI 200 are shown in FIG. 9B. These operational stages are similar to the example described above in FIG. 9A. However, in the second stage 945, instead of selecting the thumbnail image 965, the marked region of interest 970 is selected and moved to the sequence storyboard in the sidebar display area 540. In the third stage 975, as only a temporal portion corresponding to the marked region of interest was added to the sequence storyboard 990, a thumbnail image 985 that represents a frame within the temporal portion is displayed in the storyboard display area. In the third stage 975, the thumbnail image 985 is displayed with a horizontal bar that indicates that the thumbnail represents a portion of the corresponding clip. However, the media editing application might display other graphical or textual indications (e.g., a time duration that identifies start and end points of the temporal portion).

In the example illustrated in FIGS. 9A and 9B, the thumbnail images 960 that represent several available clips are displayed in the storyboard display area. However, instead of the storyboard display area, these clip representations may be displayed in a separate display area (e.g., a pop-up window). In such embodiments, the user can add the media clip to the sequence storyboard by either (1) moving the selected media clip from the separate display area to the sequence storyboard displayed in the sidebar display area or (2) moving the selected media clip from the separate display area to the storyboard display area that displays the sequence storyboard representation.

Figure 10:
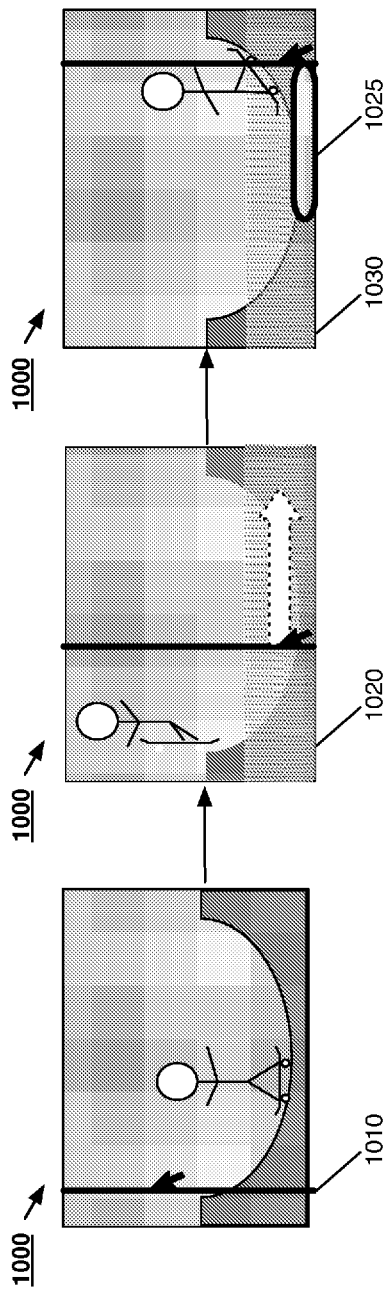
FIG. 10 illustrates an example media clip at several stages that show marking a region of interest in a media clip in some embodiments.
Figure 11:
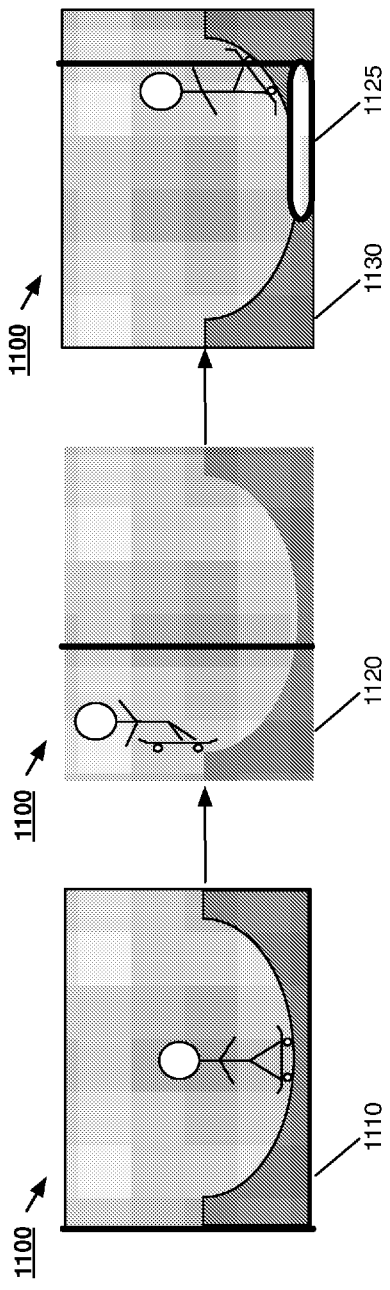
FIG. 11 illustrates an example media clip at several stages that show marking a region of interest in a media clip in some embodiments.

Marking a region of interested in a media clip can be accomplished in a number of different ways. As described above, a region of interest is a temporal portion of a media clip that is selected by the user. FIGS. 10 and 11 illustrate different ways to mark a region of interest in a media clip. Each of these figures illustrates a media clip (1000 or 1100) over three stages. Specifically, in FIG. 10, the user selects a region of interest while moving through the media clip 1000 (e.g., with the aid of the playhead) over stages 1010-1030. Also, in FIG. 11, the user selects a region of interest while playing back the media clip 1100 over three stages 1110-1130. Stage 1010 illustrates that a user is moving through the media clip by dragging the playhead with a cursor. Stage 1110 illustrates that the user has begun playback of the media clip.

The user initially sets a beginning point in a media clip for a region of interest. The beginning point may be anywhere in the temporal length of the media clip. Stage 1020 illustrates that the playhead has been moved to a first location in the media clip (approximately two fifths of the way through). At this juncture, the user performs input to indicate the marking of the media clip. In some embodiments, the user holds a mouse button down along with a hotkey and drags the playhead across the media clip.

Stage 1120 illustrates that the playhead is approximately two fifths of the way through the media clip in its playback. At this point, the user performs input to indicate the marking of the media clip. In some embodiments, the user holds down a hotkey during playback or performs other input in order to select the region of interest.

Next, the user sets an end point in the media clip for the region of interest. The end point may be anywhere in the temporal length of the media clip after the beginning point. Stage 1030 illustrates that the playhead has been moved to a second location in the media clip that is approximately five-sixths of the way through the clip. At this point, the user has released the hotkey and/or mouse button in order to mark the endpoint. Similarly, at stage 1130 illustrates that the user has performed input (e.g., releasing the hotkey) to mark the end of the region of interest during the playback of the media clip.

In some embodiments, a selectable marker over the representation of the media clip is displayed with the media clip. As shown in stage 1030 (and at stage 1130), a marker 1025 (or 1125) is displayed that spans the selected region of interest. The illustrated marker spans a portion of the thumbnail representing the media clip that corresponds to the temporal position of the region of interest. While the markers are shown as a bar, one of ordinary skill will recognize that the media editing application may display one or more other visual indications. For instance, instead of the bar, two markers that correspond to in and out points may be displayed to represent the specified region of interest.

In some embodiments, when the media clip 1000 is selected and added to the sequence storyboard, the storyboard tool processes the information about the region of interest (i.e., the beginning and end points in the timecode of the source file) and only selects the marked temporal portion of the media clip to add to the storyboard. For instance, when selecting a thumbnail image to be displayed in the storyboard display area, the storyboard tool might select a thumbnail image corresponding to a frame that is within the region of interest.

Figure 12:
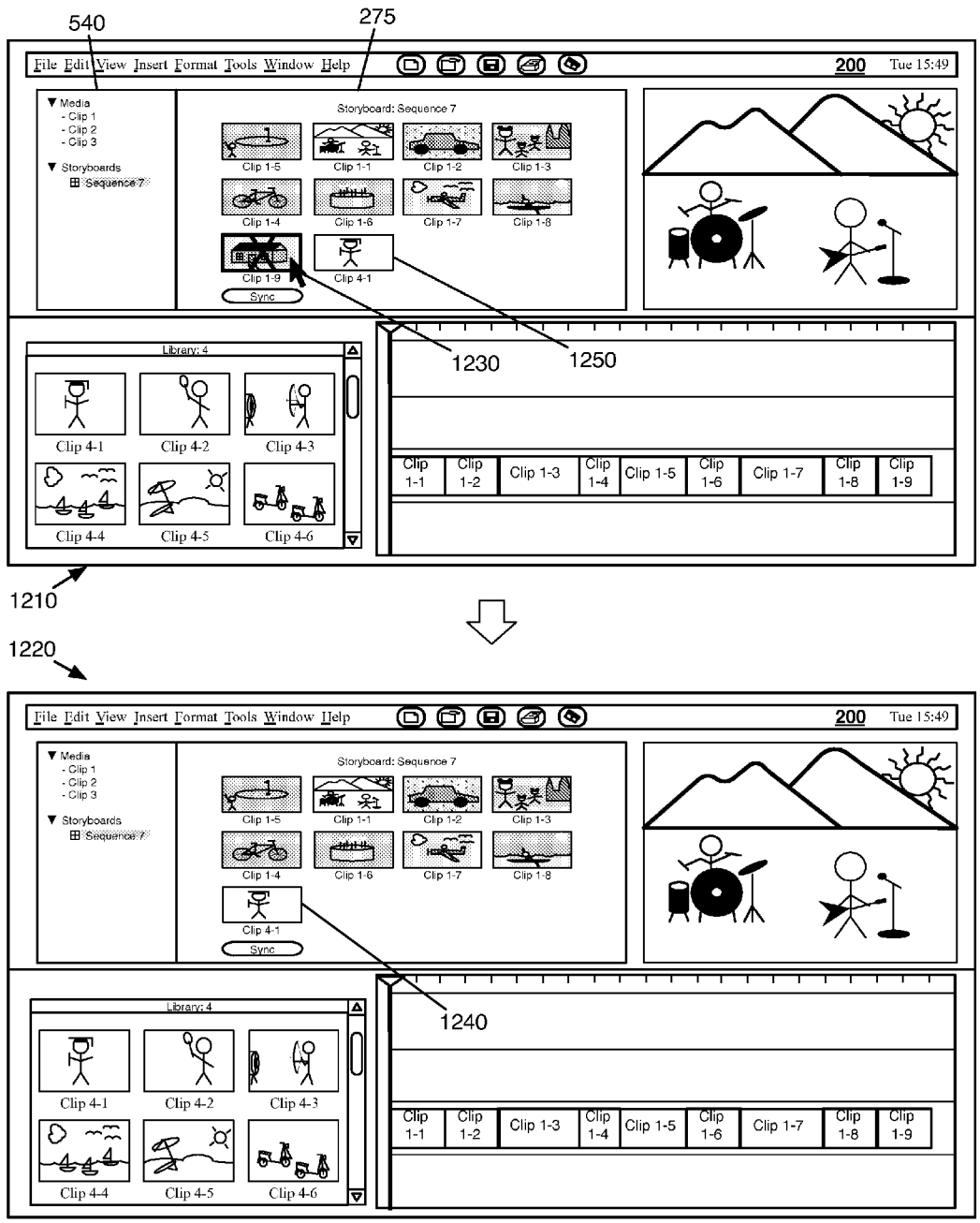
FIG. 12 illustrates a way for removing a selected thumbnail image from a sequence storyboard of some embodiments.

In the previous examples, several different clips were added to sequence storyboards. FIG. 12 illustrates an example of removing a selected thumbnail image corresponding to a media clip from a sequence storyboard according to some embodiments. Specifically, this figure shows removing a selected thumbnail image from the sequence storyboard in the GUI 200. Two operational stages 1210-1220 of the GUI 200 are shown in FIG. 12. The GUI 200 is the same as the one described above by reference to FIGS. 5-9.

The first stage 1210 of this example shows the selection of a thumbnail image 1230 for removal from the storyboard display area 275. In some embodiments, the user selects a particular thumbnail for removal using a cursor click operation after positioning the cursor over the desired thumbnail and then performing a keystroke command. One of ordinary skill in the art will recognize that other operations can be used to select a particular clip for removal. For instance, a user can perform a combination of keystrokes, a combination of cursor operations (e.g., left click and then right click), etc. Moreover, although this example illustrates the selection of one thumbnail image for removal, some embodiments allow more than one thumbnail image to be selected for removal.

In some embodiments, a selection of a thumbnail image for removal from a sequence storyboard causes the thumbnail image to be displayed differently in the storyboard display area 275. This is illustrated in the first stage 1210 as the selection of the thumbnail image causes an 'X' to be overlaid on the thumbnail image. Although the example illustrates the 'X' to indicate the selected thumbnail for removal, some embodiments use one or more other visual indicators. For instance, the media editing application might highlight the selected thumbnail image using a particular color (e.g., red), use a different symbol (e.g., a checkmark), etc.

The second stage 1220 shows the GUI 200 displaying the storyboard display area 275 after the storyboard tool has removed the selected thumbnail image from the first stage. As shown, the GUI 200 displays the storyboard display area without the thumbnail image 1230 of Clip 1-9 from the first stage 1210. In this example, the media editing application has moved the thumbnail image 1250 for Clip 4-1 to occupy the former position of the removed thumbnail image.

Figure 13:
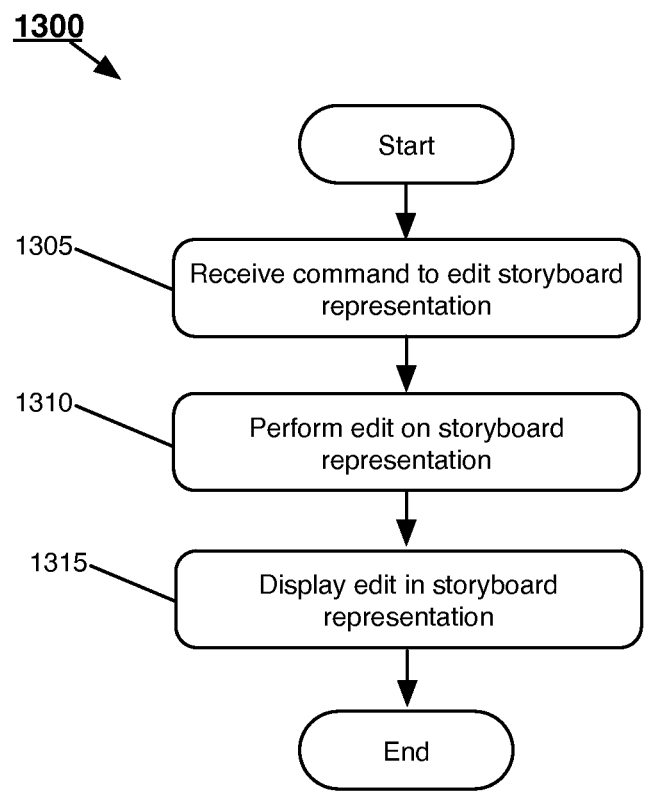
FIG. 13 conceptually illustrates a process for performing editing operations for a storyboard representation of some embodiments.

FIG. 13 conceptually illustrates a process 1300 for performing an editing operation for a storyboard representation according to some embodiments. In some embodiments, the process 1300 is performed by a media editing application. Also, the editing operation may be any one of the different editing operations described above. For instance, the editing operation may be moving a selected thumbnail image, adding a new media clip, deleting a selected thumbnail, etc. The process 1300 in some embodiments starts after the storyboard tool has been activated. In some embodiments, the storyboard tool is automatically activated when the user opens a sequence storyboard from the browser window or selects the sequence storyboard from the sidebar display area of the media editing application. Some embodiments can activate the storyboard tool through an activation item in the GUI of the media editing application.

As shown, the process 1300 starts when it receives a command (at 1305) to perform a particular edit operation on a storyboard representation. For instance, the media editing application may receive user input to rearrange thumbnail images in the storyboard display area, remove a selected thumbnail image from the storyboard display area, or add a new clip to the storyboard representation in the storyboard display area.

The process 1300 then performs the edit operation (at 1310) on the storyboard representation according to the user input. Examples of editing a storyboard by rearranging media clips in a storyboard display area are described above by reference to FIGS. 1 and 7. Also, several examples of adding media clips to different storyboards are described above by reference to FIGS. 8 and 9. Further, some examples of removing a clip from the storyboard representation is described above by reference to FIGS. 1 and 12.

Next, the process 1300 displays the storyboard representation (at 1315) after performing the particular edit operation. As mentioned above, in some embodiments, the media editing application may rearrange and/or resize thumbnail images in the storyboard representation. The process 1300 then ends.

Figure 14:
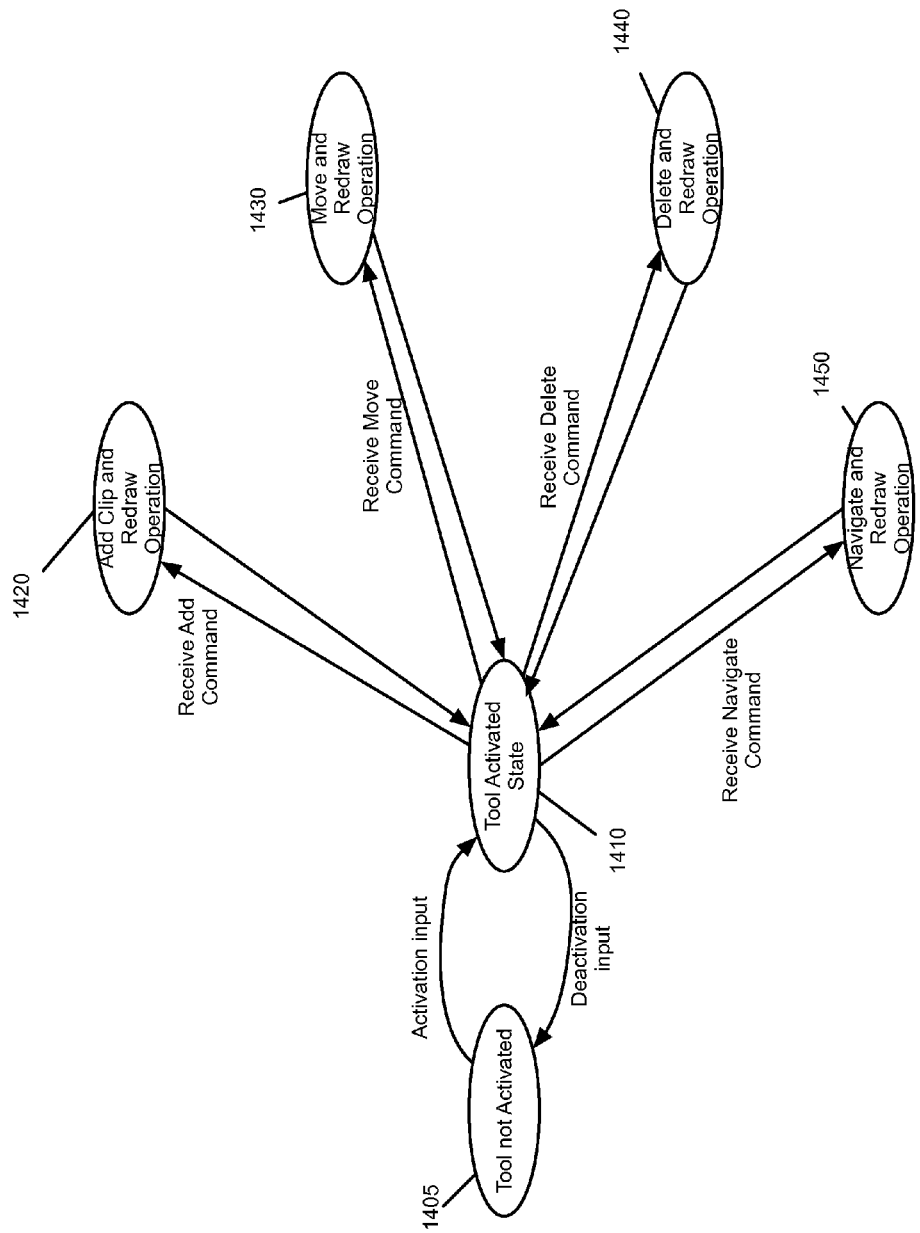
FIG. 14 illustrates a state diagram that reflects the various states and transitions between those states for a storyboard tool performing operations on a storyboard representation as described above in the previous figures of some embodiments.

FIG. 14 illustrates a state diagram that reflects various states and transitions between those states for a storyboard tool performing operations on a storyboard representation as described above in the previous figures of some embodiments. The storyboard tool can be a tool as described by reference to FIGS. 1-12 that displays and modifies a storyboard representation of a set of media clips that form a composite presentation. The state diagram of FIG. 14 is applicable to a cursor controller input (e.g., a mouse cursor) or to other types of input (such as a touchscreen input, keyboard input, etc.).

As shown, the storyboard tool is initially not activated (at state 1405). In some embodiments, when the tool is not activated, a user can be performing a myriad of other user interface operations. For instance, in the case of a media-editing application, the user could be performing edits to a composite media presentation. When activation input is received (e.g., a user pressing a hotkey or set of keystrokes, a particular touchscreen input, movement of the cursor to a particular location in the GUI, etc.), the storyboard tool transitions to state 1410 and activates. So long as none of the multiple operations performed by the storyboard tool are activated, the storyboard tool stays at state 1410—activated but not performing an operation. In response to different user input after activation, the storyboard tool can perform any of a set of operations for modifying the storyboard as described above in references to FIGS. 4, 7, 8 and 12.

After the storyboard tool is activated, the storyboard tool can receive user input for an add command to activate an add clip and redraw operation at state 1420. The add clip and redraw operation at state 1420 of some embodiments is activated when a user selects a particular media clip and moves the selected media clip over the storyboard display area. So long as the user has not placed the selected media clip into the storyboard display area, the storyboard tool remains at state 1420. After the selected media clip is placed in the storyboard display area, the storyboard tool completes the add and redraw operation by adding the clip to the storyboard display area and redrawing the storyboard display area to include the newly added clip. After performing the add and redraw operation, the storyboard tool transitions back to the state 1410 where the tool is activated and not performing an operation.

In some embodiments, the storyboard tool can receive user input for a move command to activate a move and redraw operation at state 1430. The move clip and redraw operation at state 1430 of some embodiments is activated when a user selects a particular thumbnail image within the storyboard display area and moves the selected thumbnail image in a particular direction within the storyboard display area. So long as the user has not placed the selected thumbnail image at a different position within the storyboard display area and is moving the selected thumbnail image within the storyboard display area, the storyboard tool remains at state 1430. After the selected thumbnail image is placed within the storyboard display area, the storyboard tool completes the move and redraw operation by redrawing the storyboard display area with the updated position of the thumbnail image. After performing the move and redraw operation, the storyboard tool transitions back to the state 1410 where the tool is activated and not performing an operation.

The storyboard tool can receive user input for a delete command to activate a delete and redraw operation at state 1440. The delete and redraw operation is activated when a user selects a thumbnail image within the storyboard display area for deletion. Once the thumbnail image is selected, the user can input a keystroke command corresponding to a delete command to delete the selected thumbnail image. After the selected thumbnail image is deleted, the storyboard tool completes the delete and redraw operation by removing the deleted thumbnail image from the storyboard display area and redrawing the storyboard display area without the deleted thumbnail image. After performing the move and redraw operation, the storyboard tool transitions back to the state 1410 where the tool is activated and not performing an operation.

In some embodiments, the storyboard tool can receive user input for a navigate command to activate a navigate and redraw operation at state 1450. The navigate and redraw operation is activated when a user selects a thumbnail image within the storyboard display area for moving the position of the playhead to the position of the associated clip of the thumbnail image in the composite display area. After the thumbnail image is selected, the storyboard tool completes the navigate and redraw operation by moving the position of the playhead in the composite display area to the position of the associated clip of the thumbnail image in the composite display area and redrawing the composite display area. In some embodiments, the movement of the cursor in turn causes a preview display area of the media editing application to display a frame of the associated clip. After performing the navigate and redraw operation, the storyboard tool transitions back to the state 1410 where the tool is activated and not performing an operation.

When a tool deactivation input is received while the storyboard tool is at state 1410, the storyboard tool returns to not activated state 1405. The deactivation input can include selection of another GUI item or command not related to the storyboard tool. At this point, the activation input must be received again for any of the operations to be performed.

In the examples described above, a storyboard representation is modified by rearranging several thumbnail images, adding a thumbnail image, or removing a thumbnail image. In some embodiments, the storyboard tool provides a selectable item for shuffling (e.g., randomly reordering) the thumbnail images displayed in the storyboard display area 275. This allows a user to dynamically generate a storyboard preview of a composite presentation using the clips associated with a sequence storyboard.

Figure 15:
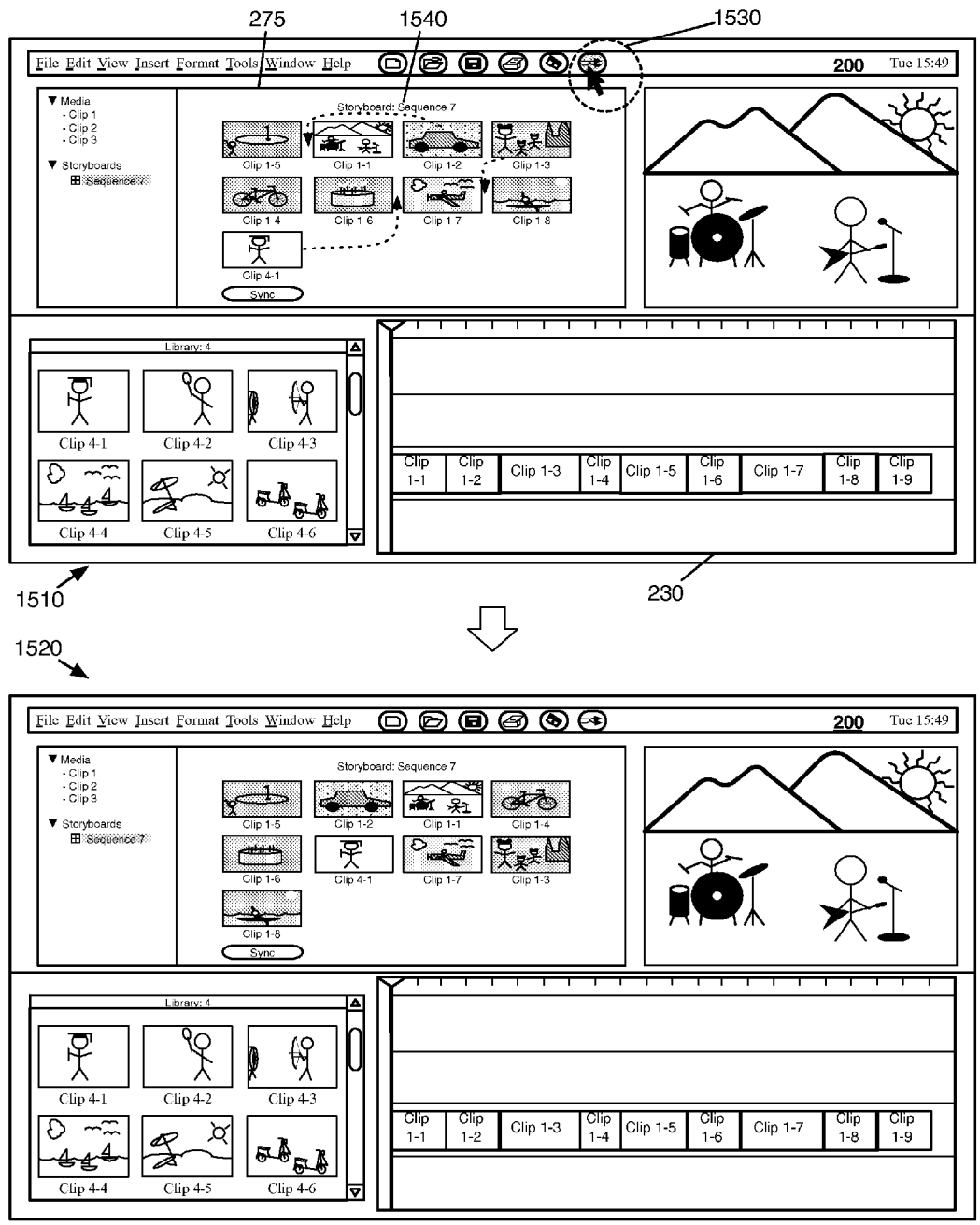
FIG. 15 illustrates a way for shuffling an order of thumbnail images in a sequence storyboard of some embodiments.

FIG. 15 illustrates an example of shuffling an order of thumbnail images in a sequence storyboard 1540. Specifically, this figure shows an example of shuffling a set of thumbnail images in the storyboard display area 275 of the GUI 200. Two operational stages 1510-1520 of the GUI 200 are shown in FIG. 15. The GUI 200 is the same as the one described above by reference to FIGS. 5-9 and 12. However, in this example, a selectable item 1530 for initiating the shuffle operation is displayed in the GUI 200.

As shown, in the first stage 1510, the storyboard display area display a storyboard sequence that includes nine thumbnail images that corresponds to the sequence of clips in the composite display area 230. Although this example shows that the shuffle operation is activated through a cursor click operation, one of ordinary skill in the art will recognize that other operations can be used to activate the shuffle feature of the storyboard tool. For instance, a user can activate the shuffle operation through a hotkey or combination of keystrokes, a combination of cursor operations (e.g., left click and then right click), a particular touchscreen input, etc.

The second stage 1520 illustrates the storyboard display area 275 after rearranging the thumbnail images in the storyboard display area. As shown, the shuffle operation reordered the set of thumbnail images in the storyboard display area. Specifically, the media editing application has shuffled the thumbnails by (1) moving the third thumbnail image (clip 1-2) to a position between the first and second thumbnail images (clips 1-5 and 1-1), (2) moving the fourth thumbnail image (clip 1-3) from the first row to a position between the seventh and eighth thumbnail images (clips 1-7 and 1-8) in the second row and (3) the ninth thumbnail image (clip 4-1) from the third row to a position between the sixth and seventh thumbnail images (clips 1-6 and 1-7) in the second row. One of ordinary skill in the art will appreciate that the set of thumbnail images can be shuffled in any sort of order.

After shuffling the set of thumbnail images, the second stage 1520 of this example illustrates the GUI 200 displaying the storyboard display area with the set of thumbnails in the randomized order different than the sequential order from the first stage. For instance, the storyboard display area shows the thumbnails for clips 1-5, 1-2, 1-1 and 1-4 in the first row, the clips 1-6, 4-1, 1-7 and 1-3 in the second row, and the clip 1-8 in the third row. In this manner, the storyboard tool can provide a different visualization of the thumbnail images in the storyboard display area 275.

Figure 16:
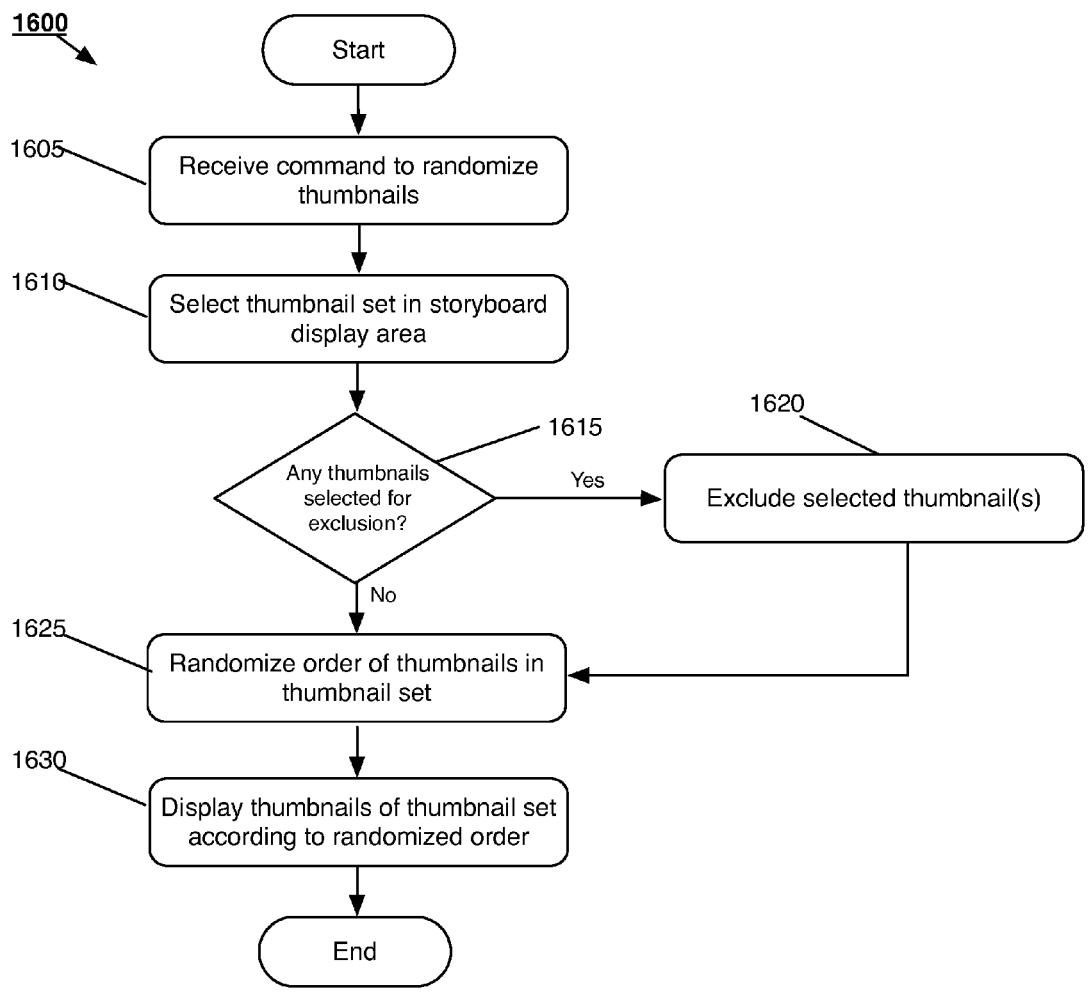
FIG. 16 conceptually illustrates a process for performing a shuffle operation on a storyboard representation of some embodiments.

FIG. 16 conceptually illustrates a process 1600 for performing a shuffle operation on a storyboard representation according to some embodiments. In some embodiments, the process 1300 is performed by a media editing application that includes the storyboard tool.

As shown, the process 1600 begins by receiving (at 1605) a command to randomize a set of thumbnails (i.e., via the user activating the shuffle operation of the storyboard tool). In the example illustrated in FIG. 15, the shuffle operation is activated through a user selection of the selectable item 1530. However, the shuffle operation may be activated in a number of different ways (e.g., through a selection of a hotkey, combination of keys, a menu item, etc.).

The process then selects (at 1610) the set of thumbnail images in the storyboard display area. These are the thumbnail images (representing media clips) that will be randomized by the media editing application. Some embodiments randomize an entire storyboard, even if all of the thumbnail images are not displayed (i.e., because not all of the thumbnail images fit in the display area), while other embodiments only randomize the images presently displayed or a user-selected set of images.

The process next determines (at 1615) whether any of the selected thumbnails have been selected for exclusion from the randomization process. A user may determine that certain thumbnail images have a desired grouping. The user may select any of the thumbnail images to be excluded from a shuffle operation. For instance, a user might shuffle the thumbnail images once, identify a pair (or larger grouping) of thumbnails that the user wishes to keep together, and then activate the shuffle operation again. The process excludes (at 1620) any such selected thumbnails from the thumbnail set for randomization.

Next, the process 1600 randomizes (at 1625) the order of the set of thumbnail images. In some embodiments, the storyboard tool can randomize the order of the thumbnail images by using a predetermined shuffling technique that re-orders the position of each thumbnail of the thumbnail set. For instance, for a particular thumbnail that appears at an ith position in the storyboard representation, the shuffling technique can swap its position to be at an nth position where n≤ the position of the last thumbnail in the storyboard. In some embodiments, the process 1600 shuffles several clips in the middle of the sequence while leaving other clips unaltered. For instance, in a sequence of four clips, the process 1600 might rearrange the middle two clips and not rearrange the first and last clips.

After shuffling the set of thumbnail images, the process 1600 then displays (at 1630) the thumbnail images of the thumbnail set in the randomized order. An example of displaying the thumbnail set in a randomized order is described above by reference to stage two 1520 of FIG. 15.

In the examples described above, a storyboard representation is modified by rearranging several thumbnail images (e.g., by shuffling thumbnail images), adding a thumbnail image, and removing a thumbnail image. However, in each of these examples, the modification does not affect a corresponding sequence of media clips in a composite presentation. In some embodiments, the storyboard tool allows a user to sync the sequence storyboard to the sequence of media clips in the composite presentation.

Figure 17:
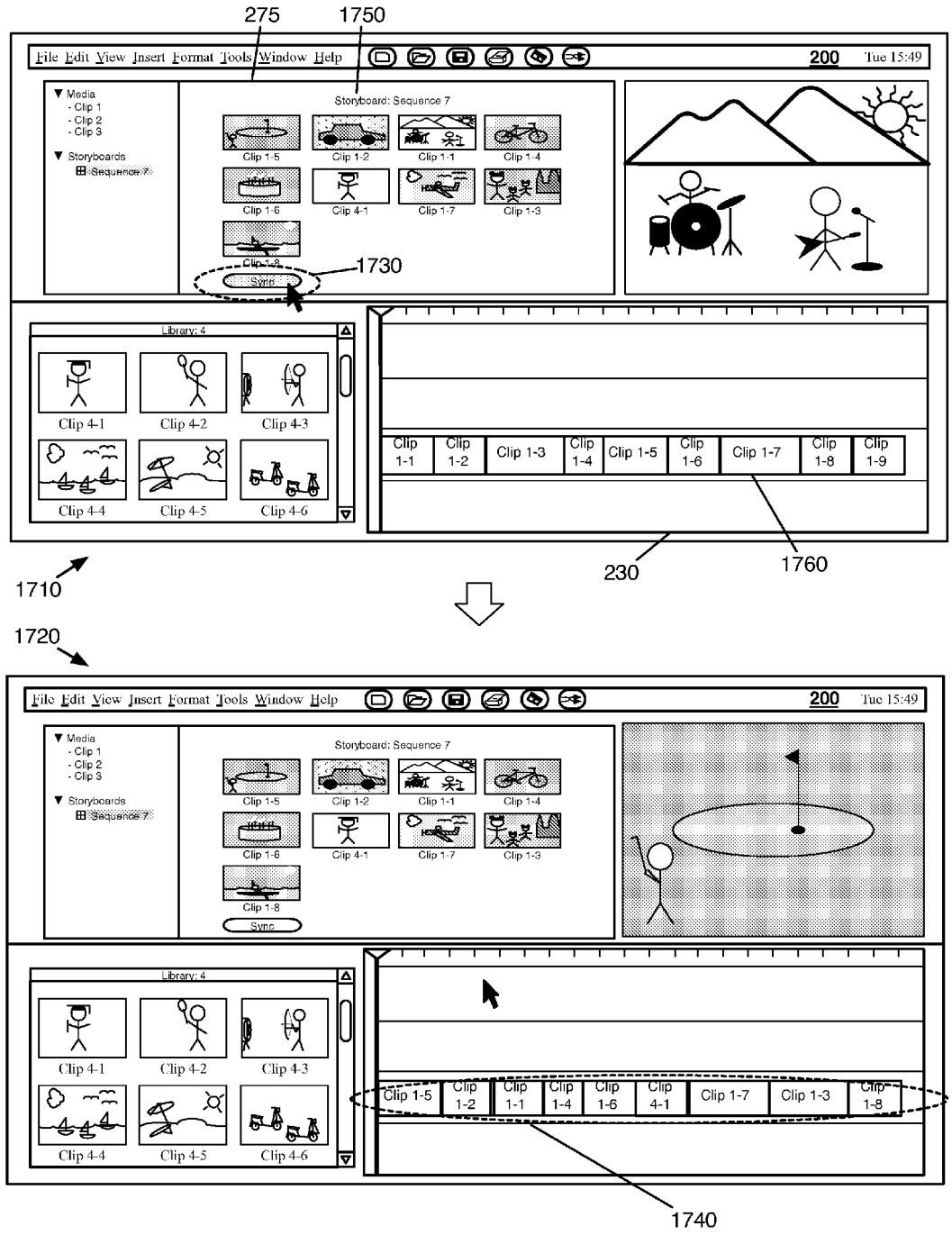
FIG. 17 illustrates a way for syncing an edited order of a sequence storyboard of some embodiments.

FIG. 17 illustrates an example of syncing a sequence storyboard 1750 with a sequence of media clips 1760 in the composite display area 230. Specifically, this figure shows syncing a set of rearranged thumbnail images in the storyboard display area 275 to appear as a sequence of associated media clips in the composite display area 230 in the GUI 200. Two operational stages 1710-1720 of the GUI 200 are shown in FIG. 17. The GUI 200 is the same as the one described above by reference to FIGS. 5-9, 12 and 15. However, in this example, a selectable item 1730 for initiating the sync operation is displayed in the storyboard display area 275.

The first stage 1710 shows the GUI 200 displaying that the user has selected a sync GUI item 1730 with the cursor to activate the synchronization operation as indicated by the highlighted sync GUI item. Upon activation of the synchronization operation, media editing application performs the synchronization operation to modify the sequence of media clips 1760 in the composite display area 230 to reflect the order of the thumbnail images as displayed in the storyboard display area 275. Although this example shows that the synchronization operation is activated using the cursor, one of ordinary skill in the art will appreciate that some embodiments provide different ways to activate this operation.

The second stage 1720 shows the GUI 200 displaying a set of media clips 1740 in the composite display area 230 after the storyboard tool has synchronized the set of thumbnail images from the storyboard display area 275 to the composite display area. The sequential order of the set of media clips 1740 now corresponds with the order of the thumbnail images in the sequence storyboard 1750 as displayed in the storyboard display area 275. For instance, the sequential order of the sequence of clips 1-5, 1-2, 1-1, 1-4, 1-6, 4-1, 1-7, 1-3, and 1-8 shown in the composite display 230 area now corresponds with the order of thumbnail images in the storyboard display area 275.

In the above example, the media editing application has performed a set of operations to reorder the sequence of media clips 1760 in the composite display area 230 from the first stage 1710. These operations will be further described in detail with reference to FIG. 18 described below. Alternatively, the media editing application in some embodiments create a new sequence storyboard instead of performing the above described synchronization operation. In these embodiments, the media editing application duplicates the storyboard representation shown in the storyboard display area to a newly created sequence storyboard. This new sequence storyboard can appear in the sidebar display area 540 (e.g., under the storyboards category) or in the browser window described above.

Figure 18:
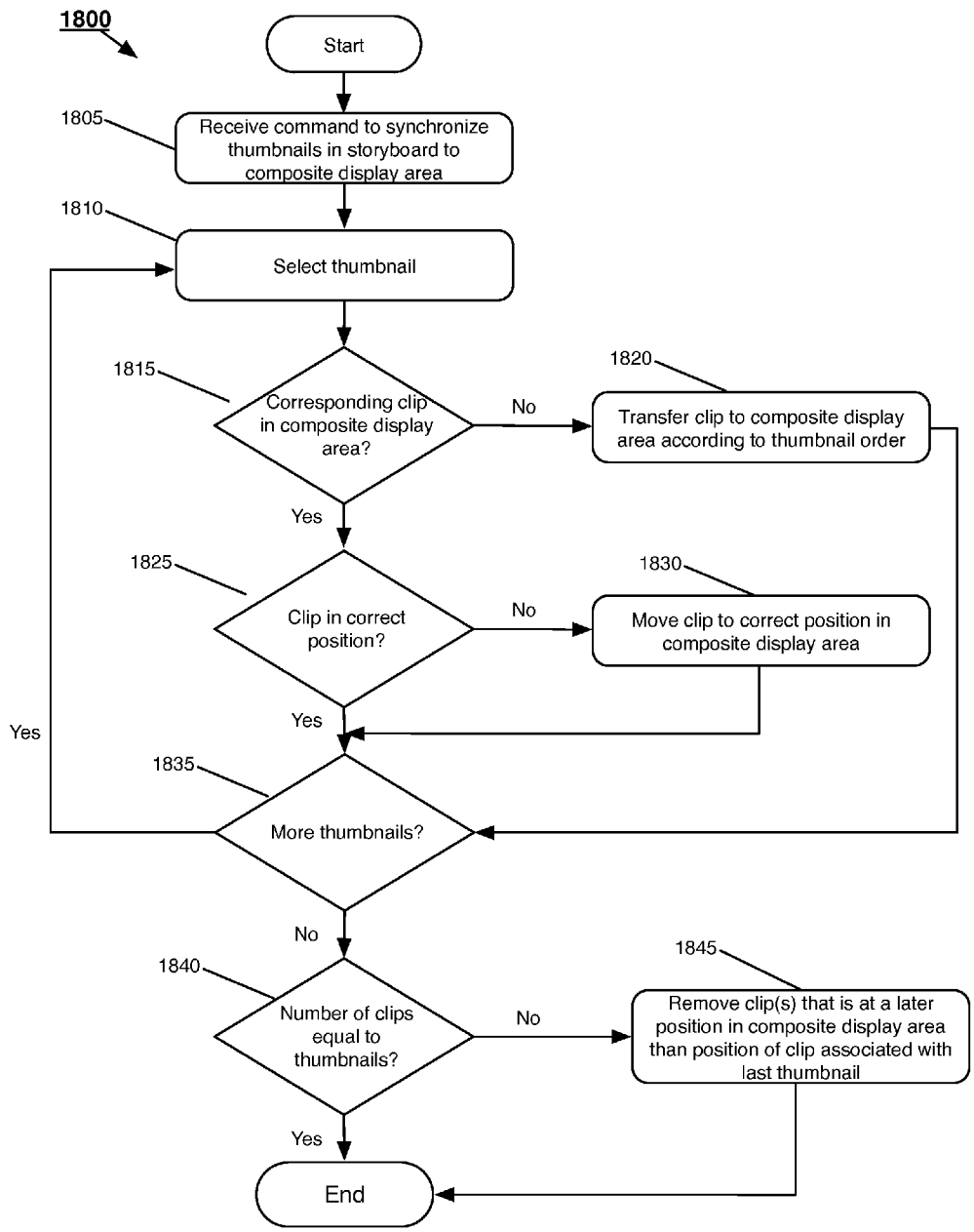
FIG. 18 conceptually illustrates a process for performing a synchronization operation on a storyboard representation of some embodiments.

FIG. 18 conceptually illustrates a process 1800 for performing a synchronization operation on a storyboard representation of some embodiments. In some embodiments, the process 1300 is performed by a media editing application. The process 1800 of some embodiments starts when a command is received (at 1805) to synchronize the set of thumbnails in the storyboard display area to the composite display area. In some embodiments, this synchronization command is received when the user selects a selectable item such as the sync GUI item 1730 of the GUI 200 of FIG. 17.

The process 1800 selects a thumbnail image (at 1810) from the thumbnail set in the storyboard display area. In some embodiments, the thumbnail image corresponding with the first sequential position of the storyboard display area is initially selected. The process 1800 then determines (at 1815) whether the media clip associated with the selected thumbnail is included in the composite display area. In some cases, the composite display area may not have the media clip associated with the thumbnail image because the user has added a new media clip to the storyboard display area. In these cases, the process 1800 transfers the media clip (e.g., from the media library) at 1820 to the composite display area according to the order of the thumbnail image in the storyboard. The process 1800 then continues to 1835 to determine whether more thumbnail images are included in the storyboard for processing.

Alternatively, in the cases where the process 1800 determines that the media clip associated with the selected thumbnail image is present in the composite display area at 1815, the process determines whether the media clip is in the correct position in the composite display area at 1825. If the media clip is not in the correct position, the process 1800 then moves the clip to the correct position in the composite display area at 1830. For instance, in an example where the position of the selected thumbnail image in the storyboard represents the ith position where i>1 of the storyboard representation and the associated media clip is at the nth position, the process moves the media clip in the composite display area so that the media clip is at a position adjacent to the nth-1 position of the sequence of media clips. In other words, the process 1800 moves the clip so that it occurs immediately sequentially after any clip at a nth-1 position of the sequence of media clips.

At 1835, the process 1800 then determines whether more thumbnail images are present in the storyboard for processing. If so, the process 1800 continues to 1810 to select the next thumbnail image from the storyboard display area and repeats the subsequent operations until every thumbnail image is processed and synchronized to the composite display area according to the respective thumbnail image position in the storyboard display area. In some embodiments, the next selected thumbnail image is the subsequent thumbnail image in the order of the storyboard representation shown in the storyboard display area.

After all thumbnail images are processed, the process 1800 determines (at 1840) whether the number of clips in the composite display area are equal to the number of thumbnail images in the storyboard display area. If the number of clips in the composite display area are equal to the number of thumbnail images, then the process 1800 ends.

However, if the number of clips in the composite display area are not equal to the number of thumbnail images at 1840, the process 1800 removes any extraneous clip representations from the composite display area. In instances where a set of thumbnail images has been previously removed from the storyboard display area, corresponding clips of these removed thumbnails can still be present in the composite display area. In such cases, the process 1800 in some embodiments identifies each of these clips and removes its corresponding representation from the media clip sequence in the composite display area. The process 1800 then removes (at 1845) any clip(s) that is at a later position in the timeline display area of the composite display area than the clip associated with the last thumbnail image in the storyboard display area. After removing the clip(s), the process 1800 ends.

Figure 19:
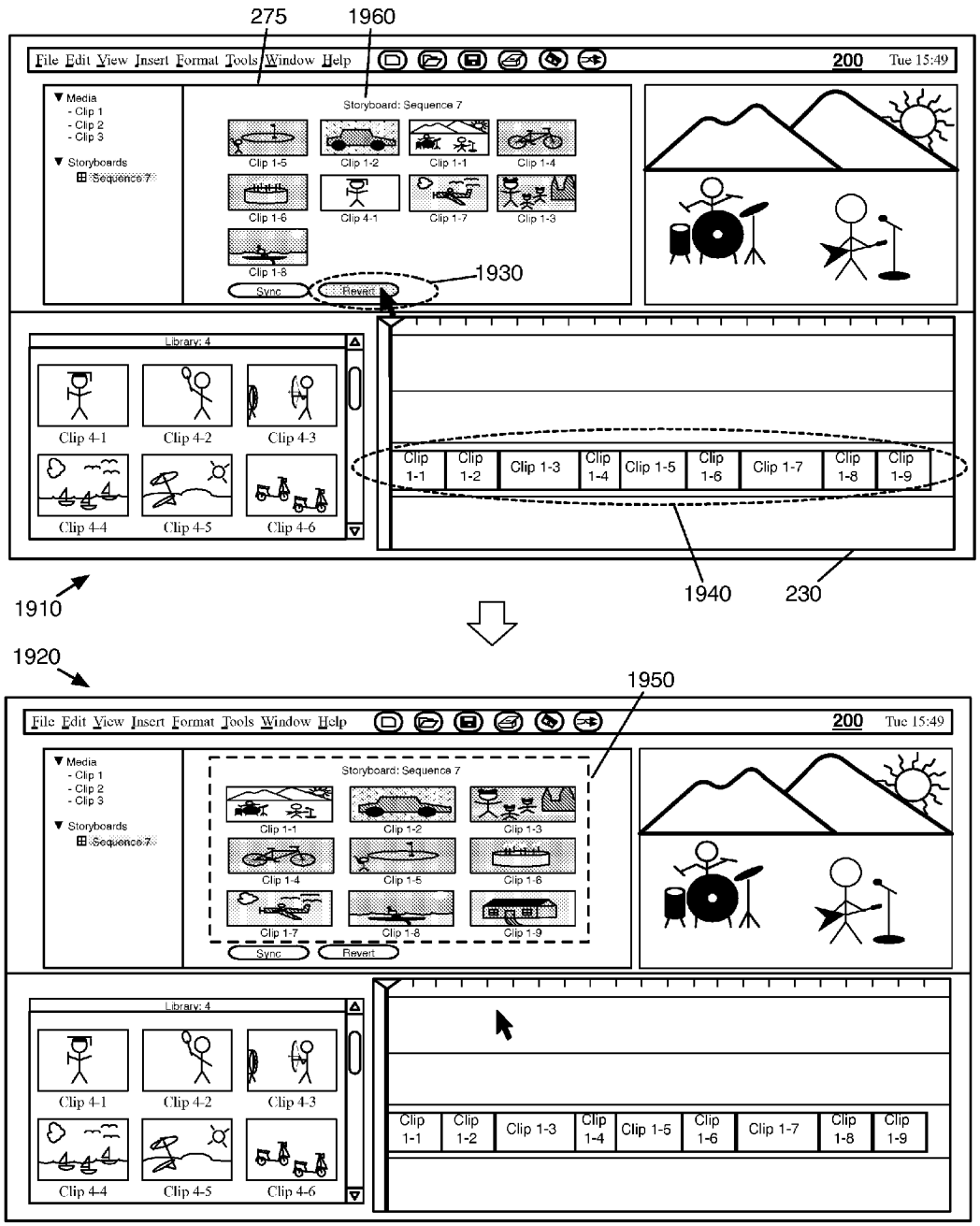
FIG. 19 illustrates a way for reverting a sequence storyboard to match the sequential order of a sequence of clips in the timeline display area.

In addition to the synchronization operation described above, some embodiments provide other operations that link the storyboard display area to the composite display area. For instance, some embodiments perform a revert operation for resetting the storyboard display area to reflect the order of clips as they appear in a sequence of media clips in the composite display area. FIG. 19 illustrates a way for reverting a sequence storyboard 1960 to match the sequential order of a sequence of clips 1940 in the composite display area 230. This figure is similar to FIG. 17 described above with the addition of a revert GUI item button 1930 for activating the revert operation and performing the revert operation for the set of thumbnails in the storyboard display area 275 instead of the synchronization operation. As shown, FIG. 19 illustrates the GUI 200 at two stages 1910 and 1920 for performing a revert operation on the storyboard representation as displayed in the storyboard display area.

The first stage 1910 of this example shows the GUI 200 displaying the user selecting the revert GUI item button 1930 to activate the revert operation of the storyboard tool. Upon activation, the media editing application in some embodiments modifies the thumbnails in the storyboard display area 275 to reflect the order of a sequence of clips 1940 in the composite display area 230. In this example, media editing application modifies the order of the thumbnail images in the storyboard display area to match the sequential order of the set of media clip 1940 shown in this stage.

The second stage 1920 shows the GUI 200 after the storyboard tool has performed the revert operation on the set of thumbnail images in the storyboard display area 275. The storyboard display area 275 now displays a set of thumbnails 1950 that are arranged in a sequential order to reflect the sequential order of the media clip sequence 1940 in the composite display area 230. For instance, the set of thumbnail images are sequentially ordered as clips 1-1 to 1-3 in the first row, clips 1-4 to 1-6 in the second row, and clips 1-7 to 1-9 in the third row to reflect the order of clips shown along the timeline of the composite display area 230.

Figure 20:
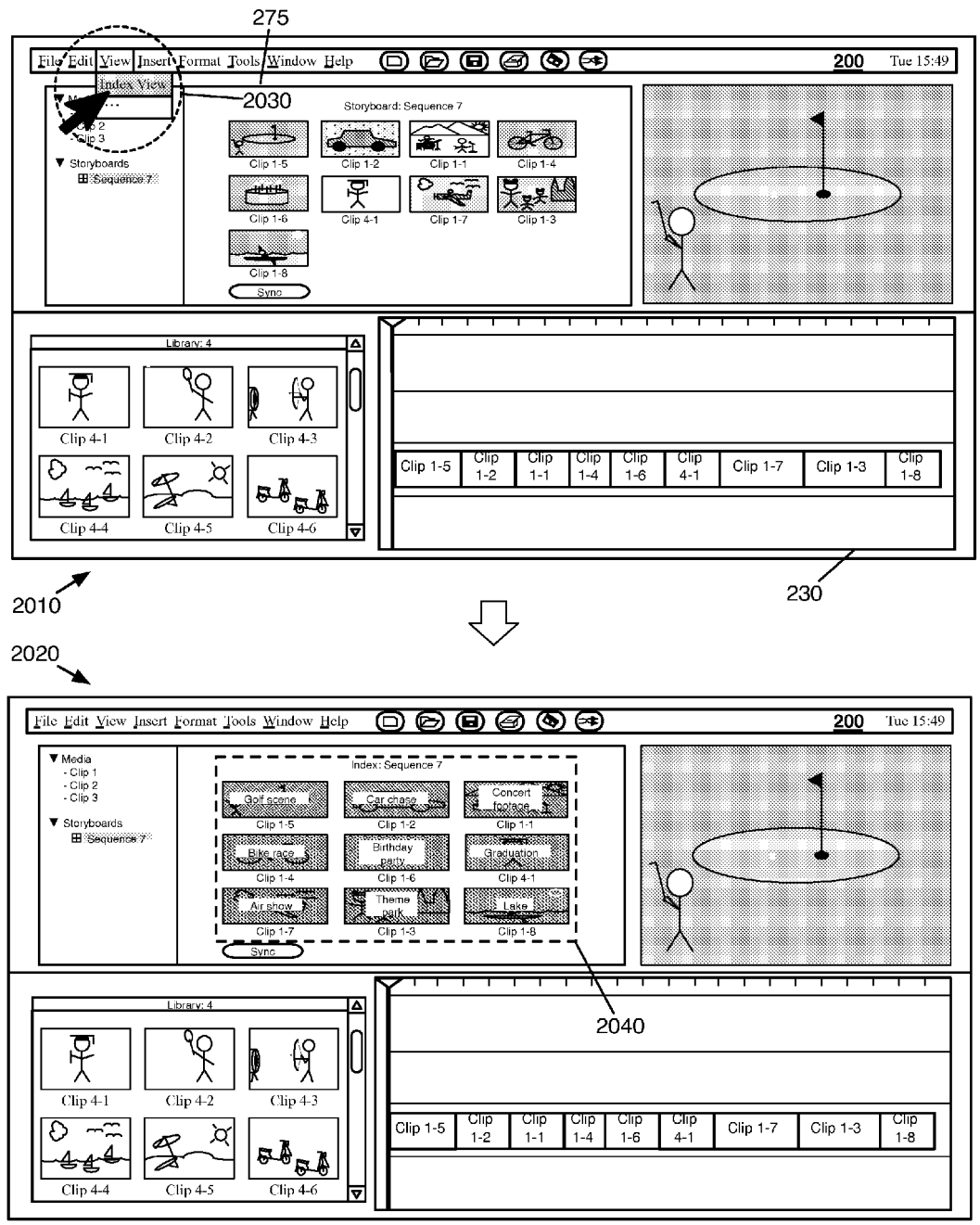
FIG. 20 illustrates a way for presenting an index view of a set of thumbnail images of a storyboard representation of some embodiments.

In addition to presenting the storyboard representation for a sequence of media clips in the storyboard display area, the storyboard tool of some embodiments can provide an index view that presents metadata associated with a particular media clip in the storyboard display area. FIG. 20 illustrates a way for presenting an index view of a set of thumbnail images of a storyboard representation of some embodiments. Specifically, this figure shows an example of the index view of the thumbnail images of the storyboard representation shown in the storyboard display area of the GUI 200. The GUI 200 is the same as the one described above by reference to FIGS. 5-9. As shown, FIG. 20 illustrates the GUI 200 at two stages 2010 and 2020 for displaying the index view of the storyboard representation in the storyboard display area.

The first stage 2010 of the example shows the selection of an index view selection GUI item 2030 with the cursor. In this example, the user has selected the index view selection GUI item 2030 by accessing the menu UI item under the "View" tab of the menu bar. After selecting the GUI item 2030, some embodiments of the storyboard tool then perform an operation to present the index view for the set of thumbnails shown in the storyboard display area 275. Although this example illustrates that the index view is accessed using the menu UI item, one of ordinary skill in the art can appreciate that the index view can be accessed in different ways. For instance, a user can access the index view through a hotkey or combination of keystrokes, a combination of cursor operations, a voice command, or a particular touchscreen input, etc.

The second stage 2020 shows the GUI 200 displaying a storyboard representation 2040 presented in the index view in the storyboard display area 275. As shown, the index view of some embodiments overlays associated metadata for each thumbnail image of the storyboard representation. The metadata can be associated with each media clip corresponding to a respective thumbnail in the storyboard display area 275. Thus, the storyboard tool allows the user to view associated metadata of the media clips in tandem with the set of thumbnail images of the storyboard representation. In this example, the index view shows metadata for each thumbnail image associated with clips in the composite display area. For instance, the index view shows that Clip 1-5 includes metadata describing the clip as "Golf scene" and Clip 1-2 includes metadata describing this clip as "Car chase."

While in the index view, in some embodiments, the user can edit the associated metadata over each thumbnail image in the storyboard display area 275. For example, the user can select a particular thumbnail image in the index view to open an edit mode for the overlayed metadata text and then edit the metadata text (e.g., via keystroke) for the selected thumbnail image. The storyboard tool then updates the index view to show the edited metadata over the thumbnail image in the storyboard display area. In the example described above, metadata is display over each of the thumbnail images in the storyboard display area 275. However, the metadata may be displayed elsewhere in the GUI 200. For instance, the metadata may be displayed below or near each thumbnail image in the storybook display area 275. The metadata may also be displayed in the composite display area (e.g., on or near a sequence of clips in the composite display area 230).

III. Clip Storyboards

The preceding section described several example operation performed with a sequence storyboard that corresponds to a sequence of clips that is displayed along a timeline. Different from the sequence storyboard, a clip storyboard in some embodiments represents a storyboard that does not correspond to a sequence that is displayed along the timeline. That is, the clip storyboard represents a canvas of arranged clips that can be committed to modify or replace the sequence in the timeline.

In some embodiments, the storyboard tool allows a user to create and modify a new empty storyboard. The clip storyboard in some embodiments is conceptually similar to a playlist that allows the user to group a set of clips according to a specified playback order. The set of clips included in the clip storyboard can form a storyboard representation of a new composite presentation. FIGS. 21-25 describe several examples operation performed on a clip storyboard. FIGS. 21-25 also illustrate the same GUI 200 as described above in the previous section.

Figure 21:
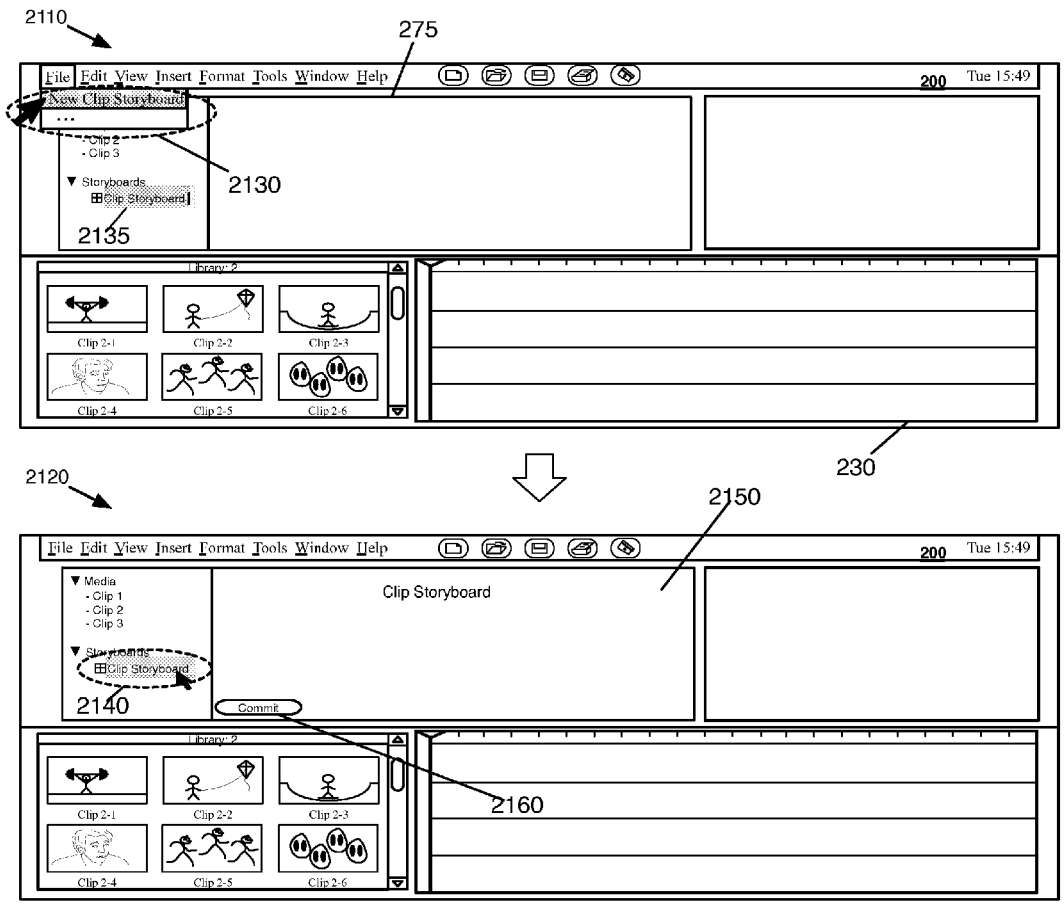
FIG. 21 illustrates a way for creating a clip storyboard of some embodiments.

FIG. 21 illustrates an example of creating a clip storyboard according to some embodiments. Specifically, this figure shows the creation of the clip storyboard using various GUI elements of the GUI 200. As shown, the GUI 200 of FIG. 21 includes a clip storyboard selection GUI item 2130. The clip storyboard selection GUI item 2130 of some embodiments activates the storyboard tool to perform an operation to create a new clip storyboard. FIG. 21 illustrates the GUI 200 at two stages 2110 and 2120 for creating the clip storyboard.

The first stage 2110 shows the selection of the clip storyboard selection GUI item 2130 with the cursor to create a new clip storyboard. After selecting the clip storyboard selection GUI item 2130, the storyboard tool of some embodiments performs an operation to create the new clip storyboard. When initially created, the clip storyboard does not include any thumbnail images representing respective media clips. In this example, the clip storyboard selection GUI item 2130 is presented as a menu item in the menu bar. However, one of ordinary skill in the art will recognize that other operations can be used to create a new clip storyboard. For instance, a user can perform a combination of keystrokes, use a hotkey to create a new clip storyboard, etc.

In some embodiments, the created clip storyboard is listed as a clip storyboard GUI item 2135 in the sidebar display area after selecting the clip storyboard GUI item 2130 as shown in this stage. One of ordinary skill in the art will appreciate that the clip storyboard GUI item 2135 can be displayed in different ways (e.g., text only, icon only, etc.).

Some embodiments allow the user to edit the text of the clip storyboard GUI item 2135 (e.g., by displaying a key cursor). For instance, the user can hover the cursor over the clip storyboard GUI item 2135 and perform a cursor operation to activate a key cursor that enables the user to keystroke edit the text of the clip storyboard GUI item 2135. After editing, the GUI 200 can show the updated text of the clip storyboard GUI item 2135 to reflect any user edits.

The second stage 2120 shows the selection of the clip storyboard GUI item 2140 in the sidebar display area of GUI 200. In some embodiments, when the clip storyboard GUI item 2140 is selected, the GUI 200 shows the storyboard display area 275 as an empty storyboard representation 2150 and displays a sync GUI item 2160 for committing a set of potential clips of the clip storyboard to the timeline display area of the composite display area 230.

Figure 22:
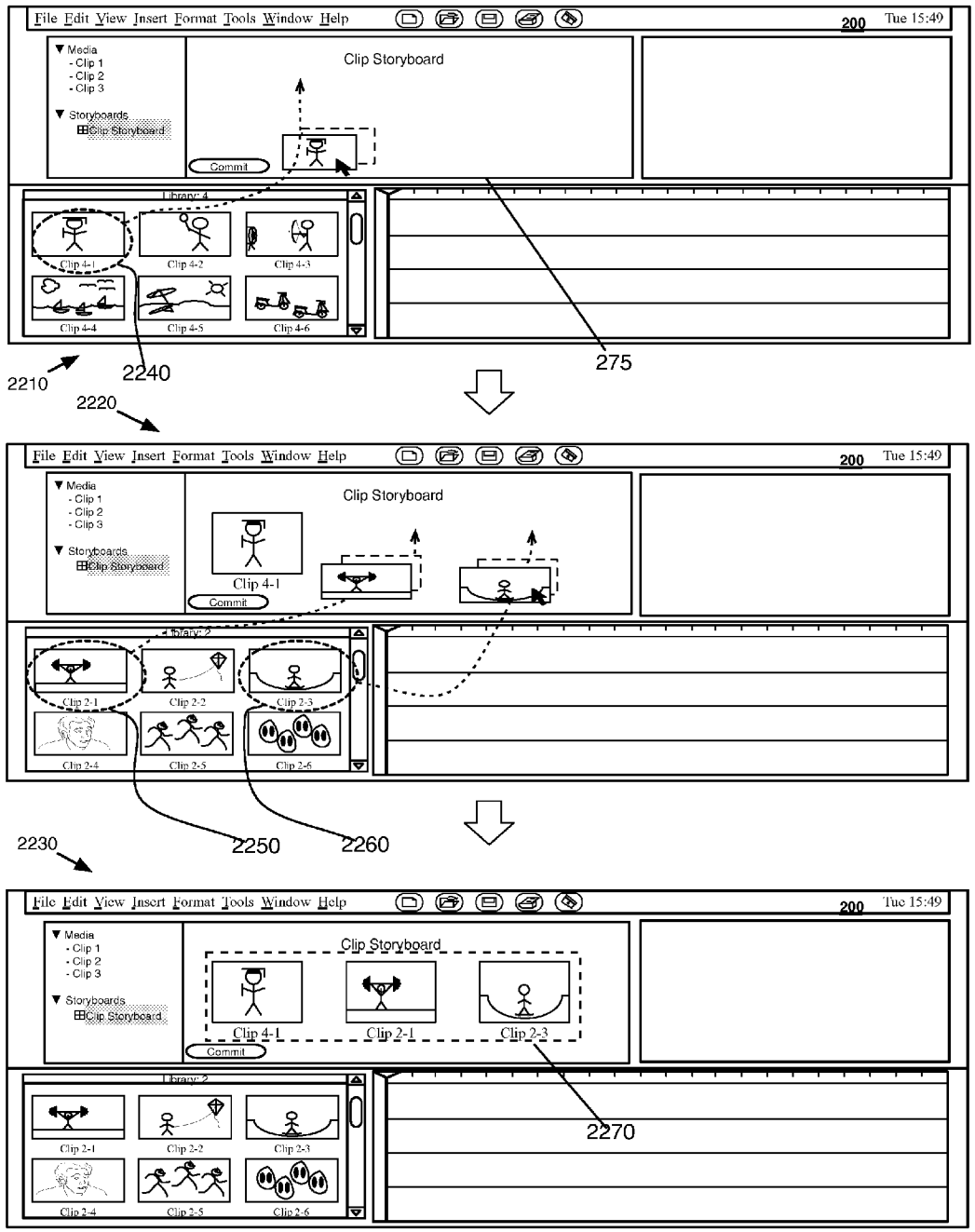
FIG. 22 illustrates a way for adding a set of clips to a clip storyboard of some embodiments.

For a new clip storyboard without any associated media clips, some embodiments allow the user to add a set of media clips to the clip storyboard. FIG. 22 illustrates a way for adding a set of clips to a clip storyboard of some embodiments. Specifically, this figure shows an example of adding of the set of media clips to an empty clip storyboard in the GUI 200. As shown, FIG. 22 illustrates the GUI 200 at three stages 2210-2230 for adding the set of media clips to the storyboard display area for the empty clip storyboard.

The first stage 2210 shows the user selecting a media clip 2210 from a particular media library of GUI 200 with the cursor and dragging the media clip to a position within the storyboard display area 275 as indicated by a thumbnail image of the media clip and the path of the dashed arrow. In this example, the user has added the Clip 4-1 as the first clip to the empty storyboard display area. Although, this example illustrates the selection of the media clip with the cursor to add the clip to the storyboard display area 275, one of ordinary skill in the art can appreciate that different operations can be used to select the media clip in the media library. For instance, a user can perform a combination of keystrokes (e.g., copy and paste), use a hotkey to select a particular media clip from the media library and move it to the storyboard display area, use touchscreen input, etc. This example also shows that a single clip from the media library is selected and added to the storyboard display area 275. However, more than one media clip from a media library can be selected and added to the storyboard display area at a time.

The second stage 2220 shows the user selecting media clips 2250 and 2260 from a different media library of GUI 200 with the cursor and dragging the selected media clips to different positions within the storyboard display area 275 (as indicated by the respective thumbnail images of the media clips and the paths of the two dashed arrows). The media clips 2250 and 2260 will then be added to the storyboard display area 275 that displays the clip storyboard. The second state 2220 further shows the media clip (Clip 4-1) that was added to the storyboard display area in the first stage 2210 is displayed as the sequentially earliest media clip in the storyboard representation.

The third stage 2230 illustrates the GUI 200 displaying the storyboard display area 275 with the media clips added to the clip storyboard in the first and second stages. As shown in this example, the storyboard display area displays a set of thumbnail images 2270 in a particular arrangement that indicates the sequential order for each of the added media clips from the first and second stages. For instance, the thumbnail image for Clip 4-1 represents the first sequential position and the thumbnail image for Clip 2-3 is the last sequential position of the storyboard representation shown in the storyboard display area 275.

Although this example illustrates the thumbnail images in the storyboard display area 275 arranged in ascending sequential order in a single row, some embodiments arrange the thumbnail images differently. For instance, the set of thumbnail images may be presented in a single column, multiple columns, multiple rows and columns, etc. Also, the thumbnail images may be presented in a different sequential order than the order described above. For example, the thumbnail images may be presented in descending sequential order from left to right.

When the size or number of the thumbnail images in the storyboard display area 275 exceeds a certain size or number, one or more thumbnail images may scroll off the storyboard display area. To address this scenario, some embodiments provide an adjustable slider or similar UI item (not shown) to allow the user to scroll through the thumbnail images in the storyboard display area. Instead of this approach, or in conjunction with it, some embodiments provide zoom controls to adjust the size of the thumbnail images that are displayed in the storyboard display area.

Figure 23:
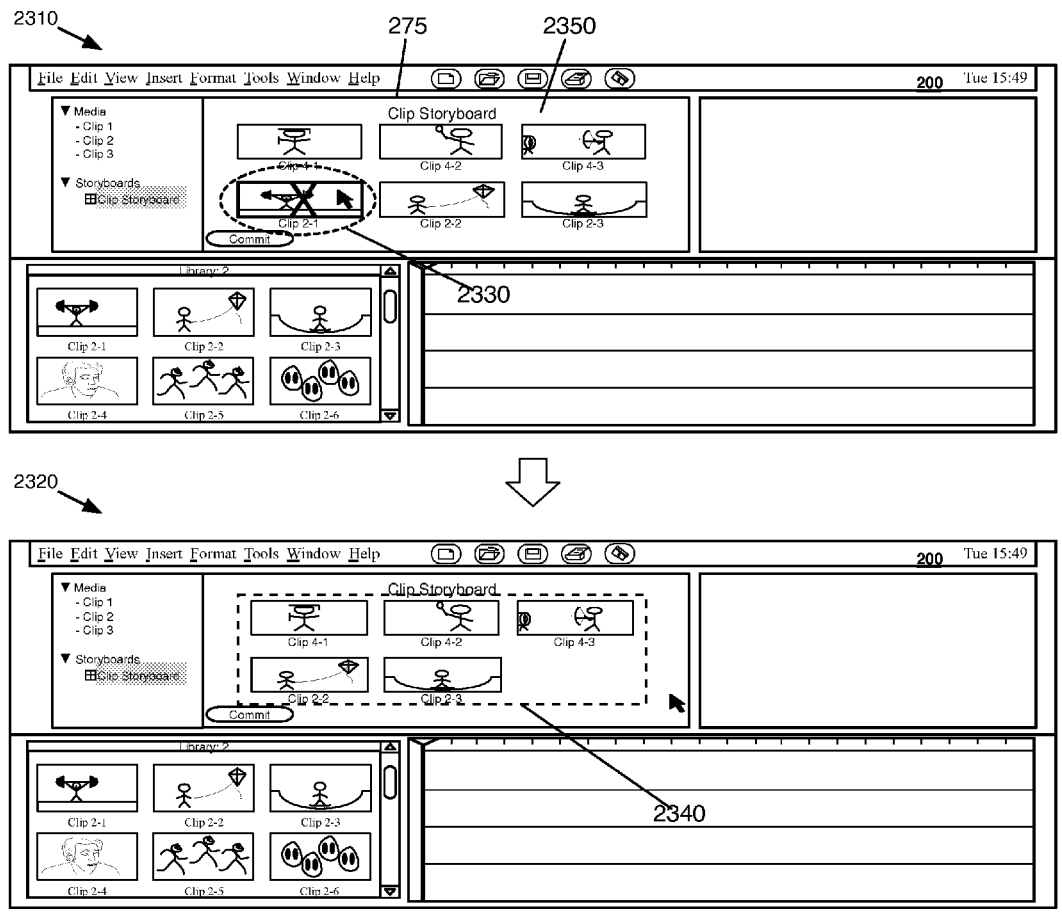
FIG. 23 illustrates a way for removing a selected thumbnail image from a clip storyboard of some embodiments.

In the previous example, several different clips were added to a clip storyboard. FIG. 23 illustrates a way for removing a selected thumbnail image from a clip storyboard of some embodiments. Specifically, this figure shows an example of removing a selected thumbnail image 2330 from the clip storyboard 2350 shown in the storyboard display area 275 of the GUI 200. As shown, FIG. 23 illustrates the GUI 200 at two stages 2310 and 2320 for removing a selected thumbnail image from the storyboard display area 275.

The first stage 2310 of this example shows the selection of the thumbnail image 2330 for removal from the storyboard display area 275. In some embodiments, the user selects a particular thumbnail image for removal using a cursor click operation after positioning the cursor over the desired thumbnail. One of ordinary skill in the art will understand that other operations can be used to select a particular thumbnail image for removal. For instance, a user can perform a combination of keystrokes, a combination of cursor operations (e.g., left click and then right click), etc.

In some embodiments, a selection of a thumbnail image for removal from a clip storyboard causes the thumbnail image to be displayed differently in the storyboard display area 275. This is illustrated in the first stage 2310 as the selection of the thumbnail image causes an 'X' to be overlaid on the thumbnail image 2330. Although the example illustrates the 'X' to indicate the selected thumbnail for removal, some embodiments use one or more different visual indicators. For instance, the media editing application might highlight the selected thumbnail image using a particular color (e.g., red), use a different symbol (e.g., a checkmark), etc.

The second stage 2320 shows the GUI 200 displaying the storyboard display area 275 with a set of thumbnail images 2340 after the storyboard tool has removed the selected thumbnail image 2330 from the first stage. As shown in this stage, the storyboard display area 275 is now displayed without the thumbnail image 2330 of clip 2-1 from the first stage. In this example, Clip 2-2 and Clip 2-3 have been shifted over to positions to their left. In particular, clip 2-2 now occupies the former position of the removed thumbnail image. Further, clip 2-3 now occupies the previous position of clip 2-2.

In some embodiments, the storyboard tool allows a user to edit a clip storyboard representation by rearranging thumbnail images in the storyboard display area 275. For instance, when the user moves the thumbnails to edit their order in the storyboard display area, the storyboard tool can display the thumbnails according to the edited order of thumbnails.

Figure 24:
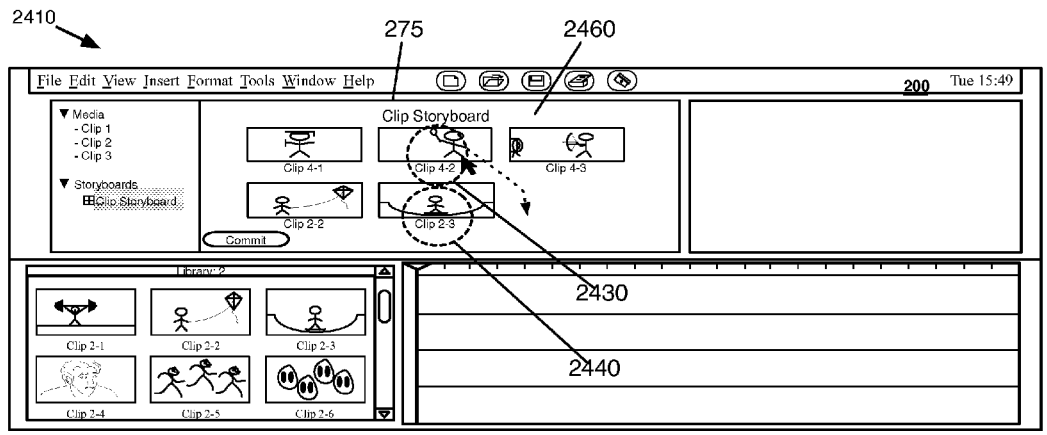
FIG. 24 illustrates a way for moving a selected thumbnail image of a clip storyboard of some embodiments.
Figure 24:
Figure 24:
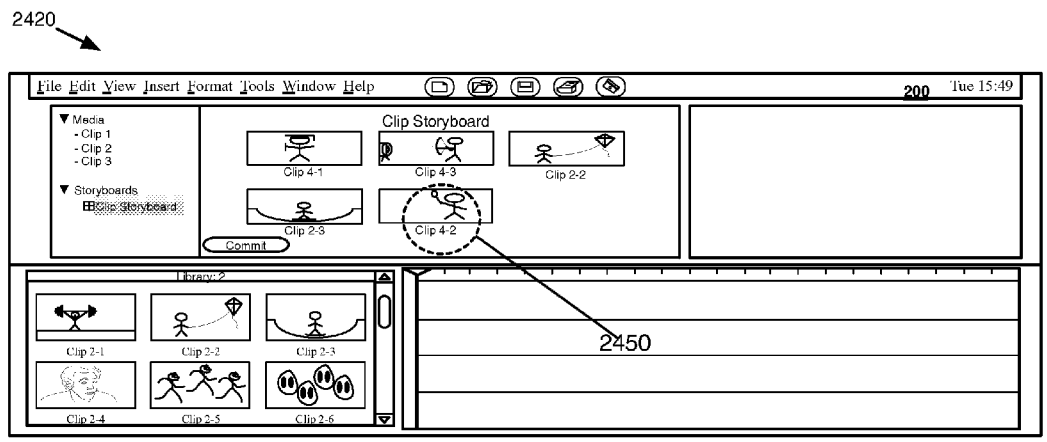

FIG. 24 illustrates a way for moving a selected thumbnail image of a clip storyboard of some embodiments. Specifically, this figure shows an example of moving of the selected thumbnail image 2430 (clip 4-2) of a clip storyboard 2460 shown in the storyboard display area 275 of the GUI 200. As shown, FIG. 24 illustrates the GUI 200 at two stages 2410 and 2420 for moving the selected thumbnail image 2430 in the storyboard display area.

The first stage 2410 shows that the user has selected the thumbnail image 2430 using the cursor and moved it (e.g., via a drag-and-drag operation) from a second position to a last position in the storyboard display area 275. In particular, the user has moved the thumbnail 2430 to the position to the adjacent right of a thumbnail image 2440 as indicated by the dashed arrow. Although this example shows selection and movement of one thumbnail image 2430, the media editing application in some embodiments allow several thumbnail images to be selected and moved as group in the storyboard display area 275.

The second stage 2420 shows the GUI 200 after the media editing application updates the storyboard display area 275 in response to the movement of the thumbnail image 2430 from the second position to the last position. In this example, a thumbnail 2450 represents the thumbnail image 2430 after being moved. The position of the thumbnail image 2450 for Clip 4-2 indicates that this thumbnail image is at the last position in the clip storyboard 2460 and is sequentially later than the left adjacent thumbnail corresponding to Clip 2-3.

In the examples described above, a clip storyboard representation is modified by moving a thumbnail image, adding a thumbnail image, and removing a thumbnail image. However, in each of these examples, no sequence of media clips that form a composite presentation is yet present in the composite display area 230. In some embodiments, the storyboard tool allows a user to commit the associated media clips of the clip storyboard to appear as a corresponding sequence of clips in the composite display area.

Figure 25:
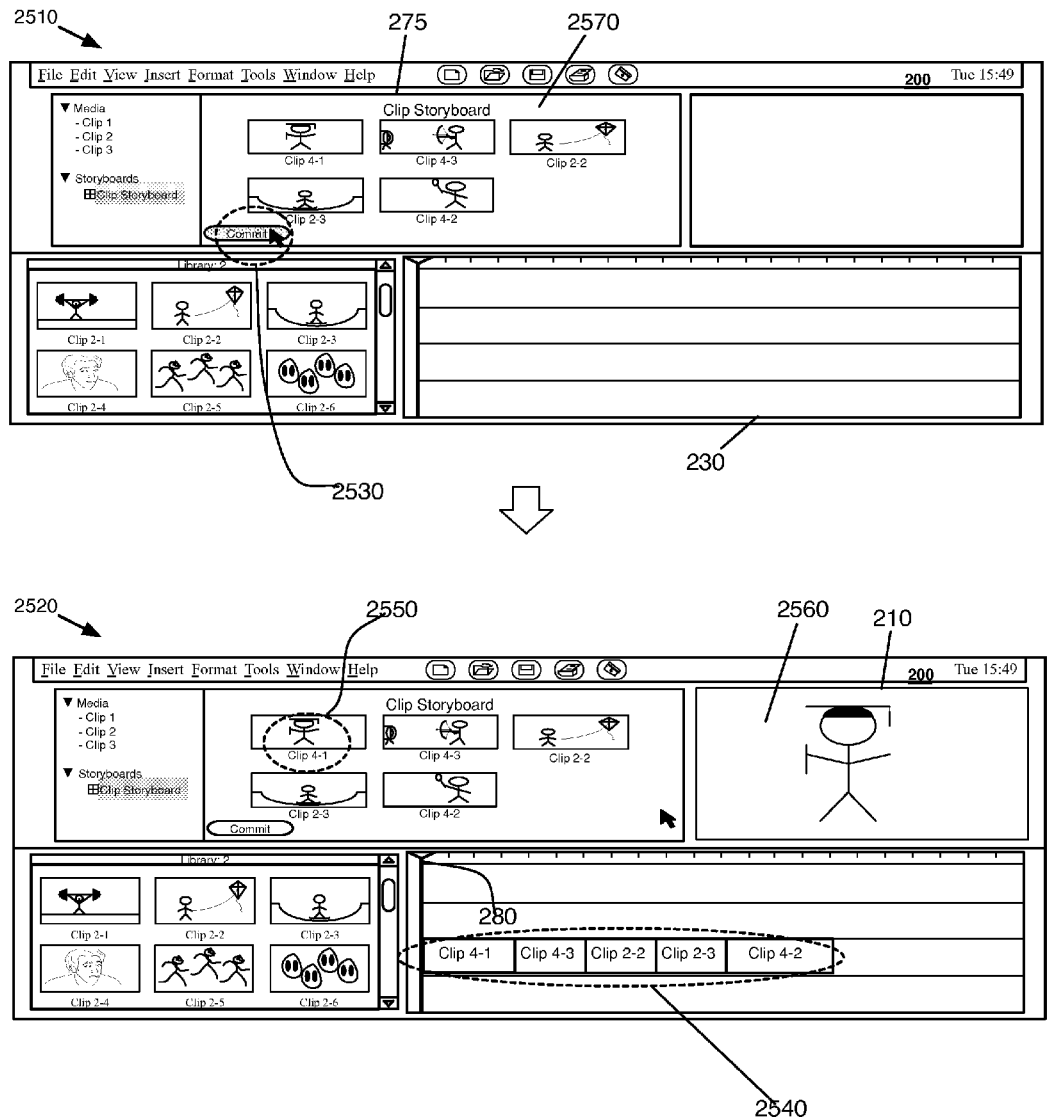
FIG. 25 illustrates a way for committing a clip storyboard to a timeline display area of composite display area of some embodiments.

FIG. 25 illustrates a way for committing a clip storyboard to a composite display area. Specifically, this figure shows an example of synchronizing the set of thumbnail images of a clip storyboard 2570 in the storyboard display area 275 such that it appears as a sequence of media clips 2540 in the composite display area 230 of the GUI 200. As shown, FIG. 25 illustrates the GUI 200 at two stages 2510 and 2520 for performing a synchronization operation on the storyboard representation of the clip storyboard 2570 shown in the storyboard display area 275.

The first stage 2510 illustrates the selection of a sync GUI item 2530 with the cursor to activate the synchronization operation as indicated by the highlighted sync GUI item. Upon activation, the storyboard tool performs the synchronization operation on the set of thumbnails in the storyboard display area 275 to commit the associated set of media clips to the composite display area as a sequence of media clips. At this stage 2510, the composite display area does not include any media clips. Although this example shows that the synchronization operation is activated using a cursor selection, one of ordinary skill in the art will appreciate that some embodiments provide different ways to activate this operation. For example, the synchronization operation can be selected using a set of key commands, a voice command, touchscreen input, etc., or any other type of user input instead of the cursor.

The second stage 2520 shows that the GUI 200 displays a set of media clips 2540 in the composite display area 230 after the storyboard tool has synchronized the set of thumbnail images in the storyboard display area 275 to the timeline display area of the composite display area 230. The set of media clips 2540 are sequentially ordered in the composite display area 230 according to the sequential order of thumbnail images shown in the storyboard display area. In this example, Clip 4-1 is the first clip in the storyboard display area 275 and is the first media clip in the sequence of media clips in composite display area 230. Clip 4-2 is the last clip in the storyboard display area 275 and is the last media clip in the sequence of media clips in the composite display area 230. In some embodiments, the storyboard tool performs a set of operations as described by reference to FIG. 18 above to commit associated media clips of the clip storyboard to the timeline display area of the composite display area 230.

When the clip storyboard 2570 displayed in the storyboard display area 275 is committed to the composite display area, the media editing application in some embodiments displays a frame of the media clip where the playhead is currently positioned in the preview display area. This is illustrated in the second stage 2520 as a frame 2560 of the media clip 2550 (Clip 4-1) that corresponds to the position of the playhead 280 is displayed in the preview display area 210 of the GUI 200.

Alternatively, the storyboard tool can create a new clip storyboard instead of performing the above described synchronization operation. In these embodiments, the storyboard tool performs an operation to duplicate the clip storyboard to a newly created clip storyboard instead of committing the media clips to the composite display area. This new clip storyboard can appear in the sidebar display area (e.g., in a list of the storyboards). In the examples described above in FIGS. 21-25, the storyboard tool of some embodiments can perform different operations on the clip storyboard. In some embodiments, these operations are performed in a manner as described above by reference to FIGS. 13 and 14.

IV. Output of Storyboard

Figure 26:
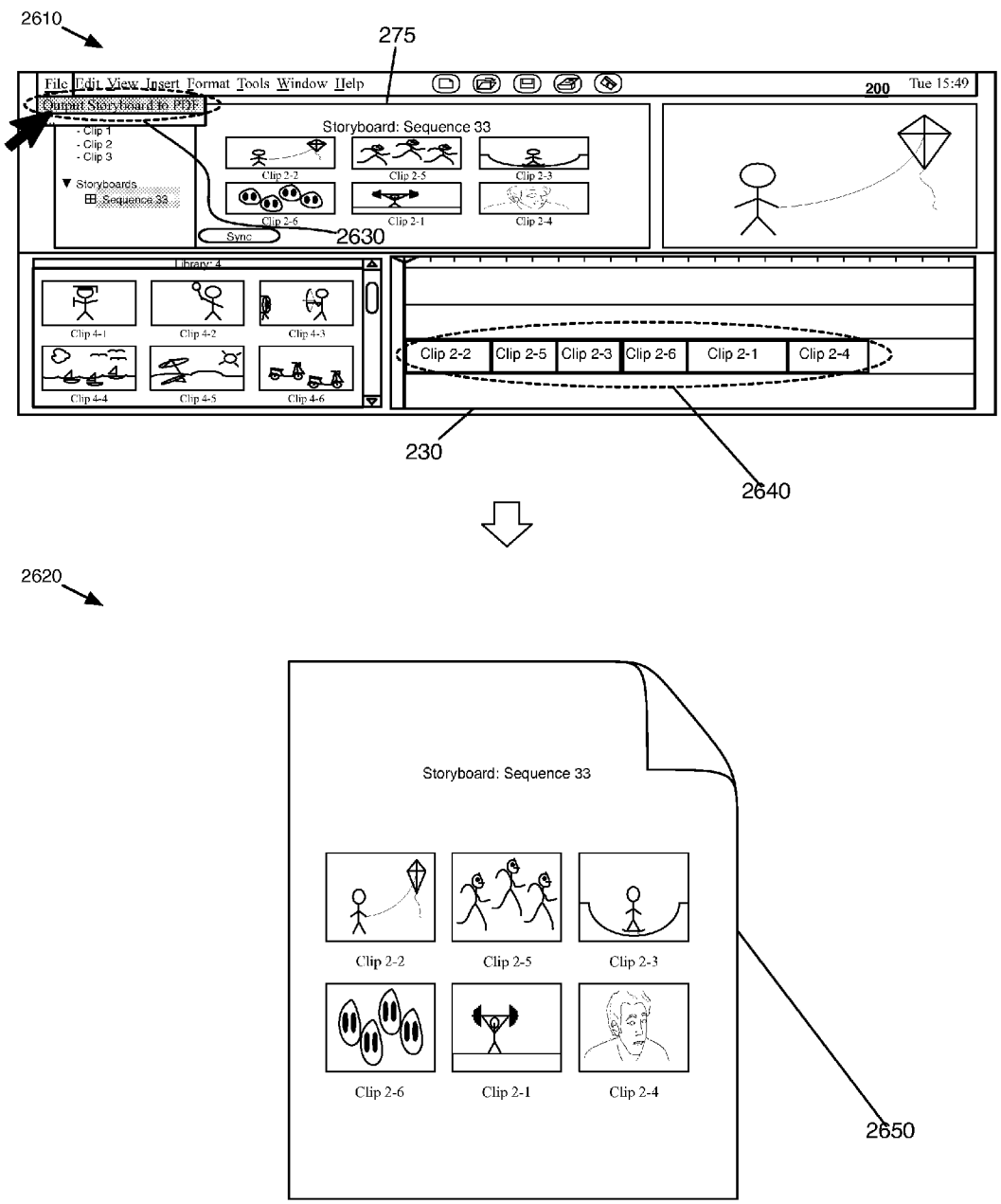
FIG. 26 illustrates a way for outputting a storyboard representation as a document.
Figure 27:
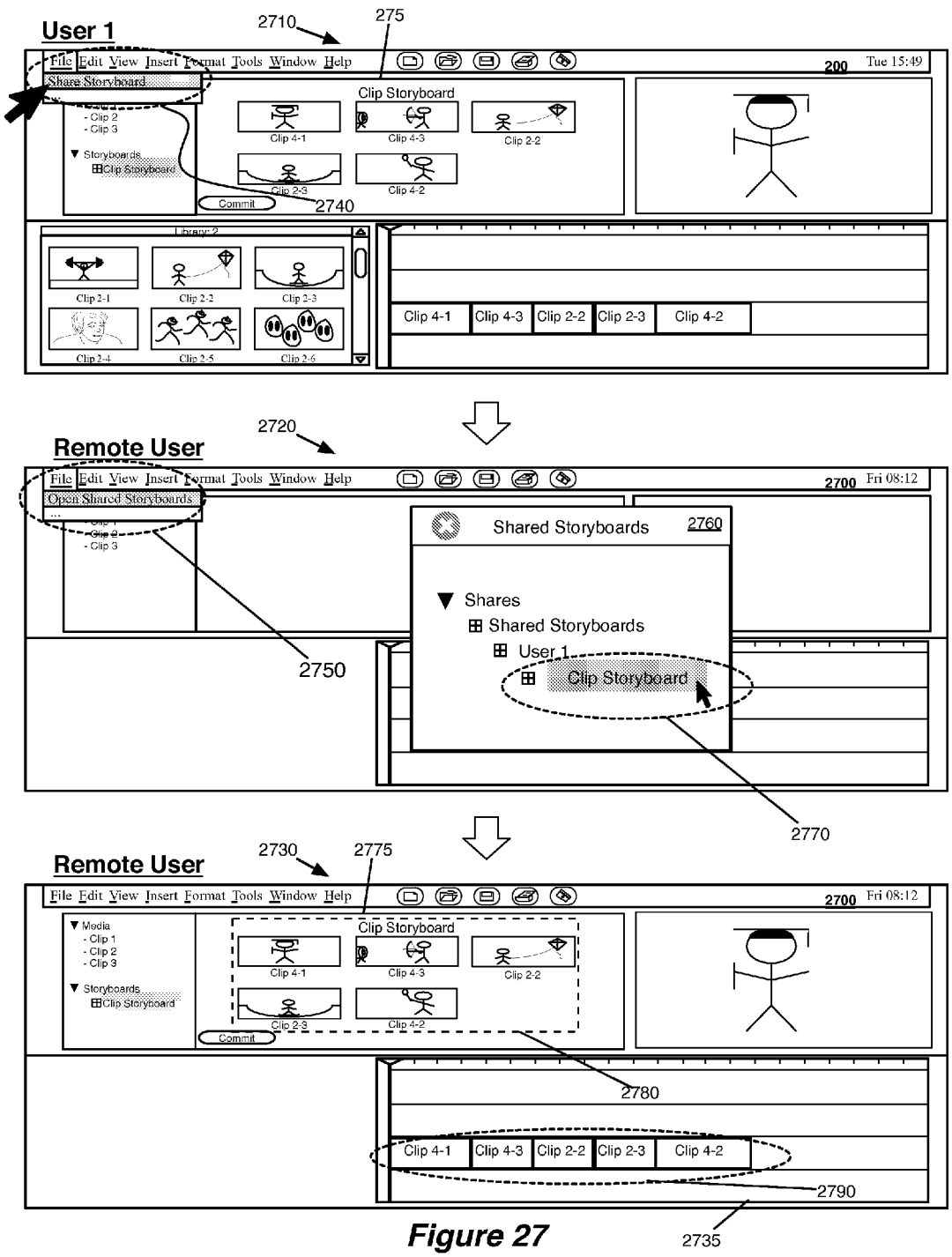
FIG. 27 illustrates a way for sharing a storyboard representation over a network.

In some embodiments, the media editing application outputs the storyboard representation for a sequence and/or clip storyboard in a number of different ways. Several examples of outputting a storyboard representation will now be described by reference to FIGS. 26 and 27. Specifically, FIG. 26 illustrates an example of outputting a storyboard representation as a document. Also, FIG. 27 illustrates an example of sending a storyboard reorientation over a network (e.g., the Internet, local area network). These figures illustrate the same GUI 200 as described above by reference to FIG. 5.

FIG. 26 illustrates an example of outputting a storyboard representation as a document. Specifically, this figure illustrates an example of outputting the storyboard representation of a sequence storyboard as a document in a predetermined format. The GUI 200 in this figure illustrates a sequence of media clips 2640 in the composite display area 230. As illustrated, FIG. 26 shows two stages 2610 and 2620 for outputting a sequence storyboard as a document.

The first stage 2610 of this example shows the selection of an output storyboard selection GUI item 2630 in the GUI 200. When the output storyboard selection GUI item is selected, the storyboard tool of some embodiments performs a set of operations for outputting the storyboard representation shown in the storyboard display area 275 as a document. In some embodiments, the storyboard tool can store the document on local or remote storage for subsequent access. In this example, the output storyboard selection GUI item 2630 is presented as a menu item in the menu bar. However, one of ordinary skill in the art will recognize that other operations can be used to output a sequence storyboard. For instance, a user can perform a combination of keystrokes, use a hotkey to output the sequence storyboard, etc.

The second stage 2620 illustrates an example of a document 2650. The document 2650 reflects the sequence of media clips 2640 and the storyboard representation in the storyboard display area 275 from the first stage 2610. In this example, the document 2650 is represented as formatted in Portable Document Format (i.e., PDF). However, one of ordinary skill in the art will understand that other document formats can be used and still be within the scope of the invention. For instance, some embodiments can output the storyboard representation as an Extensible Markup Language (XML) document. Although the above description relates to outputting the sequence storyboard, some embodiments can also perform the above described operations for outputting a clip storyboard in the same manner.

FIG. 27 illustrates example of sharing a storyboard representation over a network. Specifically, this figure illustrates an example of sharing the storyboard representation of a clip storyboard over a network in the GUI 200 and subsequently accessing the shared storyboard by a remote user. As illustrated, FIG. 27 shows three stages 2710-2730 for sharing and accessing a clip storyboard over the network (e.g., the Internet, local area network).

The first stage 2710 of this example illustrates the selection of a GUI item 2740. When the GUI item 2740 is selected, the storyboard tool of some embodiments performs a set of operations for sharing the storyboard representation shown in the storyboard display area 275 over the network. In some embodiments, the network can be a local network, remote network, or network of networks (e.g., Internet). In this example, the share storyboard selection GUI item 2740 is presented as a menu item in the menu bar. However, one of ordinary skill in the art will understand that other operations can be used to share a clip storyboard. For instance, a user can perform a combination of keystrokes, use a hotkey to share the clip storyboard, etc.

The second stage 2720 illustrates a GUI 2700 of a media editing application with a storyboard tool that is similar to the GUI 200 described before except that the GUI 2700 is for a different remote user than the GUI 200 shown in the first stage 2710. This example shows that a remote user has selected an open shared storyboard selection GUI item 2750 of the menu bar of GUI 2700. In some embodiments, when the remote user has selected this selection GUI item 2750, the storyboard tool displays a GUI window 2760 that includes a shared clip storyboard GUI item 2770. This shared clip storyboard GUI item corresponds to the shared storyboard from the first stage 2710 that is accessible from the network. After the GUI window 2760 is displayed, this figure shows that the remote user has selected the shared clip storyboard GUI item 2770 with the cursor as indicated by the highlighted GUI item. Upon selection, the storyboard tool of some embodiments accesses the corresponding shared storyboard over the network.

The third stage 2730 shows the GUI 2700 displaying a set of thumbnail images in the storyboard display area 2775 of the GUI 2700. The set of thumbnail images form a clip storyboard that is identical to the clip storyboard shown in the first stage 2710. In other words, the clip storyboard shown in this stage includes the same set of thumbnail images in the same sequential order as the clip storyboard in the first stage.

Some embodiments present an associated set of media clips 2790 as a sequence in the timeline display area of the composite display area 2735 that corresponds to the thumbnail images from the clip storyboard shown in the storyboard display area 2775. In this manner, the storyboard tool allows the remote user to access the shared storyboard to collaborate and edit the clip storyboard using any of the previously described operations. Therefore, this sharing feature of the storyboard tool promotes collaborative efforts between different users. Although the above description relates to sharing the clip storyboard, some embodiments can also perform the above described operations for sharing a sequence storyboard in the same manner.

V. Software Architecture

Figure 28:
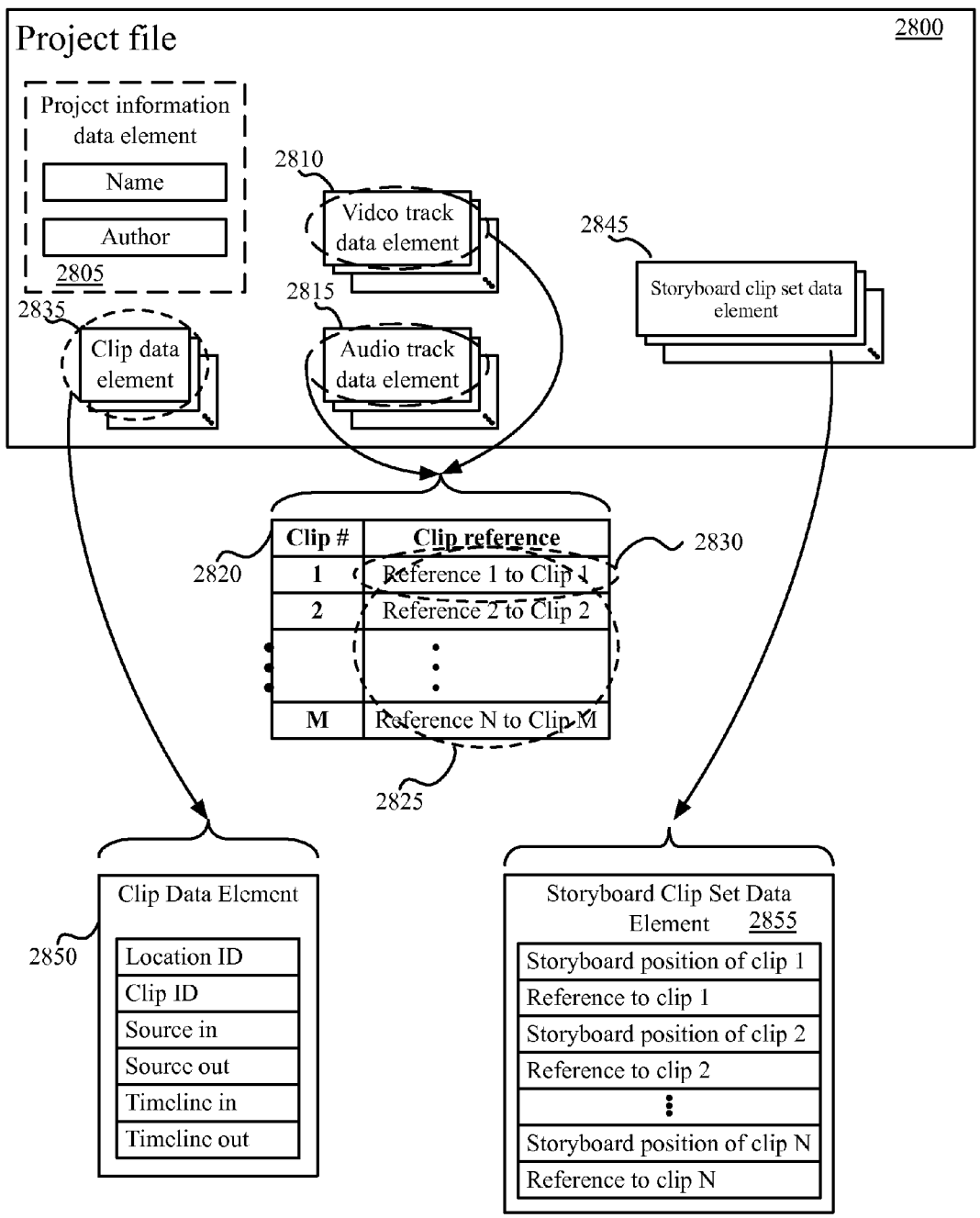
FIG. 28 conceptually illustrates various attributes and data structures that are included in some embodiments of the media editing application's composite project file.

FIG. 28 conceptually illustrates a media editing application's composite project file 2800 of some embodiments. A composite project file stores all of the data about a project that a user creates with the media editing application. As shown, the project file 2800 includes a project information data element 2805. The project information data element 2805 includes attributes indicating the name of the project and the author (e.g., writer, director, etc.). Various different embodiments may include other information in the project information data element (e.g., date created, etc.). Although these attributes are represented as a single data structure 2805 within the project file 2800, some embodiments store each of the attributes in a separate data element.

In addition, the project file 2800 includes video track data elements 2810 and audio track data elements 2815 for storing information corresponding to various clips that have been placed in the different tracks. A single project may include multiple audio tracks and multiple video tracks in some embodiments. In addition to audio and video track data elements, the project file of some embodiments includes additional types of track elements (e.g., effects track data elements, overlay track data elements, etc.). The audio and video track data elements 2810 and 2815 are shown in more detail in breakout section 2820.

As shown, in some embodiments each individual track data element 2820 includes a list of references 2825 to each clip that has been placed in a track (i.e., each clip shown in the composite display area). Each clip reference 2830 in each track data element 2820 refers to an individual clip data element 2835 that is part of the project file 2800. In some embodiments, the clips are ordered in the track data element 2820 according to their time order in the track. These clip data elements 2835 are shown in more detail in breakout section 2850.

As shown in FIG. 28, each clip data element 2850 includes a location identifier, a clip identifier, source in and out points, and timeline in and out points. The clip identifier identifies the particular media clip (i.e., the track data element includes a list of clip IDs in some embodiments). The location identifier identifies a location of a source media file for the clip (that is, the source audio, video, etc. file). The source in and out points identify times within the source media file at which the clip starts. The clip need not include the entire media file—for instance, a video clip could be three seconds of a five minute video file. The timeline in and out points identify times in the project timeline at which the clip starts and stops. One of ordinary skill will recognize that the clip data elements can include other data than is shown, or may not include all of the data shown in the conceptual diagram 2850. For instance, rather than timeline in and out points, some embodiments include only a timeline in point, and derive the timeline out point from the source in and out points.

In addition to referring to clip data elements 2835, the project file 2800 of some embodiments a set of storyboard clip set data elements 2845. Each storyboard clip set data elements represents a storyboard, as described in the above sections. An example storyboard clip set data element of some embodiments is shown in more detail in breakout section 2855. As shown, each storyboard clip set data element 2855 includes references to clips (e.g., references to storyboard clip data elements) and storyboard positions for each clip. A storyboard clip data element, in some embodiments, includes the same information as the clip data element 2850, without timeline in and timeline out points. When a storyboard is generated from a timeline sequence, as described above, a new set of storyboard clip data elements is created in some embodiments from the clip data elements in the timeline sequence. Although the storyboard clip set data element 2855 is illustrated as a single data structure, different embodiments implement the storyboard clip set data element differently. For instance, in some embodiments, the storyboard clip set data element 2855 can simply include a list of references to individual clip data elements 2835, similar to the track data element 2820.

Figure 29:
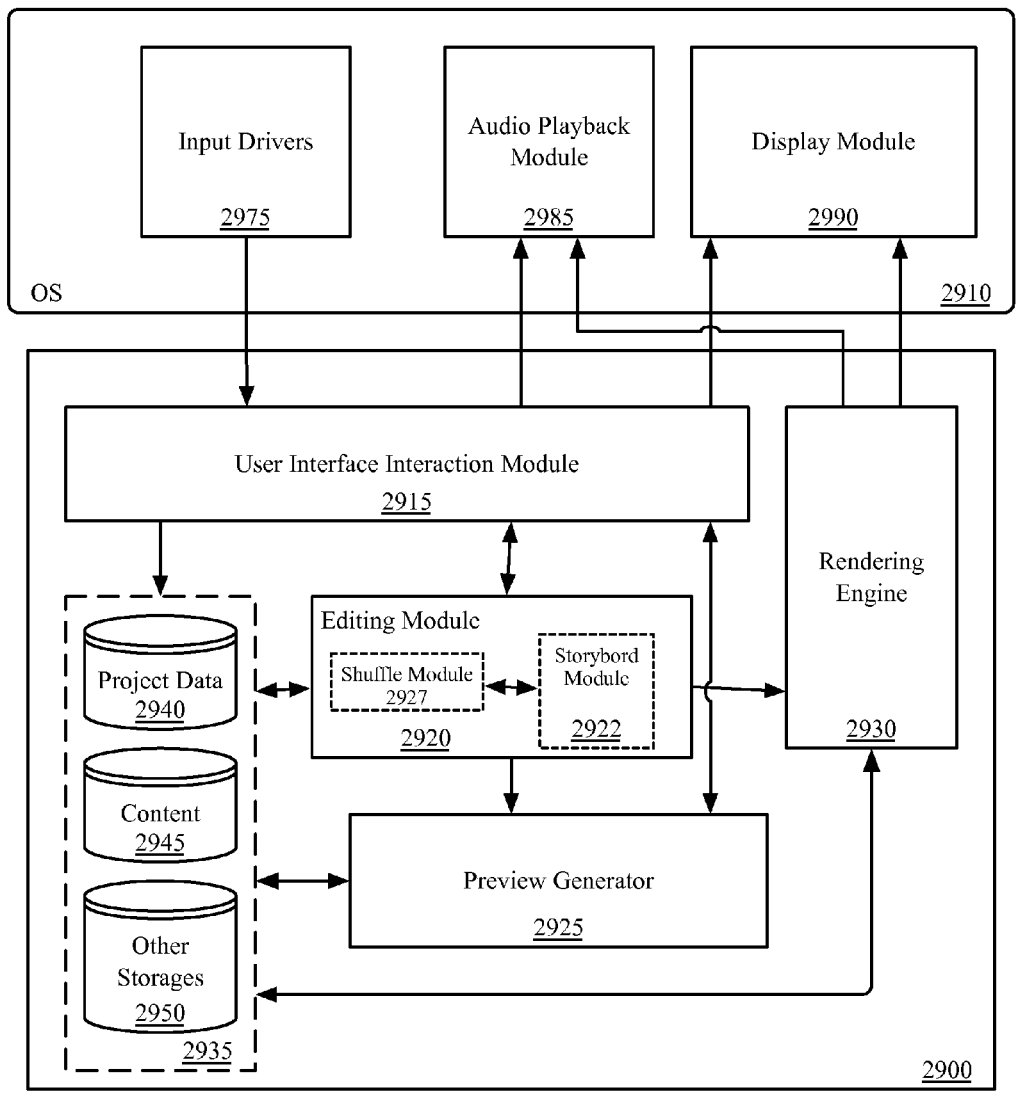
FIG. 29 conceptually illustrates the software architecture of an application of some embodiments for presenting a storyboard representation of a composite presentation.

In some embodiments, the processes described above are implemented as software running on a particular machine, such as a computer or a handheld device, or stored in a computer readable medium. FIG. 29 conceptually illustrates the software architecture of an application 2900 of some embodiments for presenting a storyboard representation of a composite presentation such as those described in the preceding sections. In some embodiments, the application is a standalone application or is integrated into another application (for instance, application 2900 might be a portion of a video-editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

Media editing application 2900 includes a user interface interaction module 2915 for sending data to and receiving data from a user, an editing module 2920 for receiving and processing edits to a composite project, a preview generator 2925 for generating a preview of a composite presentation for display, a rendering engine 2930 for creating a composite presentation, and a set of storages 2935 for storing data used by the application 2900. The set of storages 2935 includes storages for project data 2940, content data 2945, as well as other data 2950 (e.g., data about media objects in a video scene).

The operating system 2910 of some embodiments includes one or more input drivers that allows the application 2900 to receive data from user interactions with one or more input devices (e.g., a keyboard, cursor controller, touchscreen, etc.), an audio playback module 2985 for processing audio data that will be supplied to an audio device (e.g., a soundcard and speakers), and a display module 2990 for processing video data that will be supplied to a display device (e.g., a monitor).

A user interacts with items in the user interface of the media editing application 2900 via input devices (not shown) such as a cursor controller (e.g., a mouse, touchpad, trackpad, etc.), keyboard, touchscreen, etc. The input from these devices is processed by the input drivers 2975 and passed to the user interface interaction module 2915.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The user interface interaction module 2915 translates the data from the drivers 2975 into the user's desired effect on the media editing application 2900. For example, when the user edits content in a display area of the media editing application, the user interface interaction module 2915 can translate these edits into instructions that are processed by the editing module 2920 in some embodiments. In other embodiments, the edits can be applied directly to project data 2940, or other data stored by the application 2900 in the set of storages 2935. An example of the user editing content is if the user trims a media clip in a display area of the media editing application 2900. The user interface interaction module 2915 also receives input data that is translated as instructions to preview visual content in a preview display area (for example, if a user clicks a play control while editing a media project). This information is passed to preview generator 2925 through the editing module 2920 in some embodiments.

Editing module 2920 of some embodiments processes edit instructions received from the user interface interaction module 2915 and data retrieved from the set of data storages 2935. Editing module 2920 can also create and/or update data stored within the set of data storages 2935 based on received instructions that affect the project data 2940, content 2945, or other stored data 2950. Furthermore, the editing module 2920 can also send data and/or instructions to the rendering engine 2930 of some embodiments. The editing module 2920 includes a storyboard module 2922 and a shuffle module 2927 in some embodiments.

The storyboard module 2922 is a module that presents a storyboard representation in the storyboard display area according to various scenarios such as those described above by reference to FIGS. 1-27. In some embodiments, the selection of a UI item can invoke a session in which the storyboard module creates and/or modifies a set of thumbnail images of the storyboard representation. A storyboard UI item (such as a button, menu UI item, series of keystrokes, etc.), the storyboard display area mentioned above, the storyboard module (e.g., storyboard module 2922) and the shuffle module 2927 collectively form a storyboard tool that provides the storyboard feature of some embodiments. In this storyboard tool, the UI item is the item that invokes or ends a session for creating or modifying a storyboard representation. Other than this UI item (or series of keystrokes, hotkey selection, etc.), some embodiments provide other schemes for starting a session, for example through a cursor selection of a sequence or clip storyboard UI item (e.g., as shown in the browser window of the media editing application). In addition to performing storyboard functions using the storyboard module 2922, the editing module 2920 can send instructions and/or data to the preview generator 2925 of some embodiments.

The shuffle module 2927 is a module that performs a shuffle operation on a storyboard representation in the storyboard display area according to various scenarios such as those described above by reference to FIGS. 15 and 16. The shuffle module 2927 is activated in some embodiments through a selection of a shuffle UI item (or series of keystrokes, hotkey selection, etc.). In some embodiments, the shuffle module 2927 can transfer data to the storyboard module 2922 to shuffle the order of thumbnail images in the storyboard representation.

Preview generator 2925 of some embodiments generates a preview based on instructions received from the editing module 2920 and/or the user interface interaction module 2915 and project data stored in storage 2940, content stored in storage 2945, and/or other data stored in storage 2950. In some embodiments, preview generator 2925 also generates a preview window (through the user interface interaction module 2915) after generating the preview, and manages the movement of the preview window. In some of these embodiments, the preview generator 2925 can also provide content to the user interface interaction module 2915 for display.

Rendering engine 2930 enables the storage or output of audio and video from the media editing application 2900. Rendering engine 2930 receives project data from the editing module 2920 and/or storages 2935 and creates a composite media presentation from the source content stored in storage 2945. The composite media presentation can then be stored in the storages 2935, sent to an external storage, displayed and/or played back via the display module 2990 and audio playback 2985, etc.

While many of the features have been described as being performed by one module (e.g., the UI interaction module 2915 or preview generator 2925), one of ordinary skill would recognize that a particular operation might be split up into multiple modules, and the performance of one feature might even require multiple modules in some embodiments. For instance, in some embodiments, the storyboard module 2922 can be a separate module (or modules) from the editing module 2920.

Furthermore, although the application 2900 and its features have been described using several specific embodiments, other embodiments might implement the application or its features using different resources or by placing the various modules in different specific locations. For instance, in some embodiments the application is a standalone application that includes all the functionality and data access needed to run the application on a particular user device.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 30:
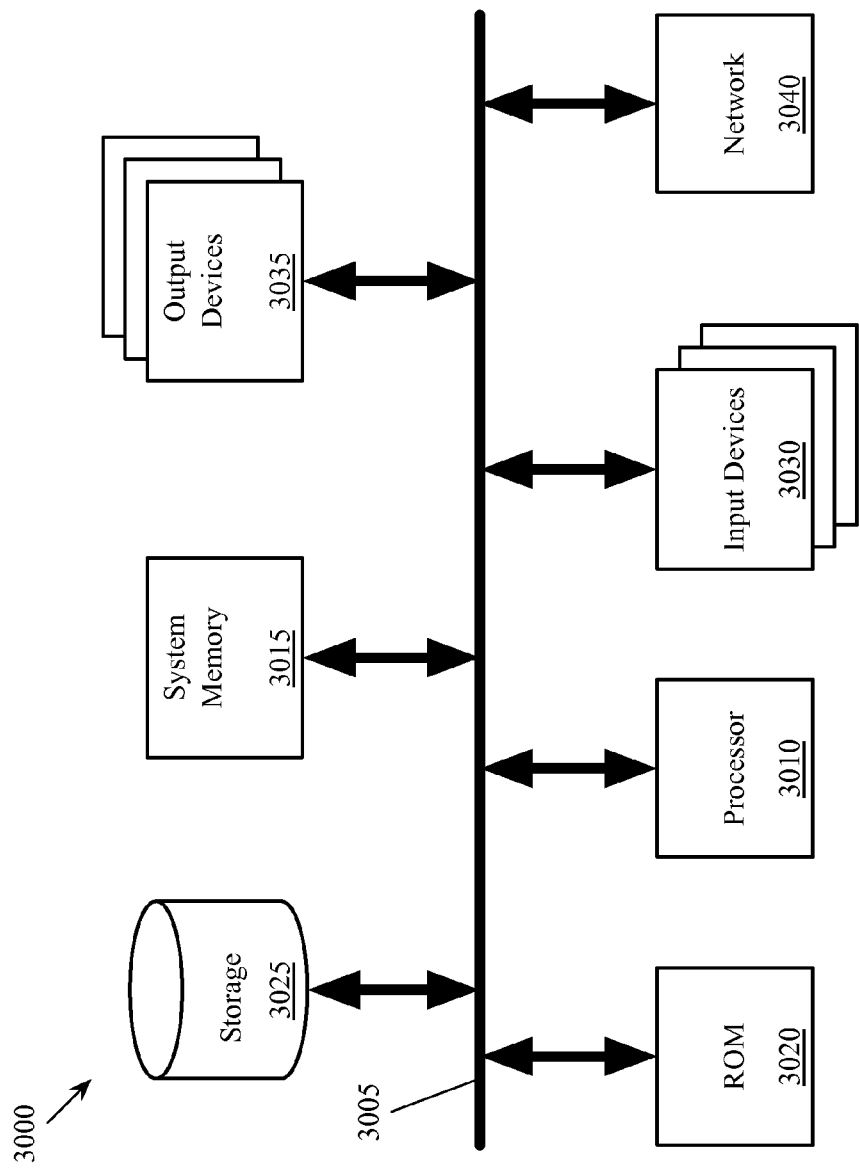
FIG. 30 conceptually illustrates an electronic system with which some embodiments are implemented.

FIG. 30 conceptually illustrates an electronic system 3000 with which some embodiments of the invention are implemented. The electronic system 3000 can be a computer, phone, PDA, or any other sort of electronic device. Such an electronic system includes various types of computer readable media and interfaces for various other types of computer readable media. Electronic system 3000 includes a bus 3005, processing unit(s) 3010, a system memory 3015, a read-only memory 3020, a permanent storage device 3025, input devices 3030, output devices 3035, and a network 3040.

The bus 3005 collectively represents all system, peripheral, and chipset buses that communicatively connect the numerous internal devices of the electronic system 3000. For instance, the bus 3005 communicatively connects the processing unit(s) 3010 with the read-only 3020, the system memory 3015, and the permanent storage device 3025.

From these various memory units, the processing unit(s) 3010 retrieves instructions to execute and data to process in order to execute the processes of the invention. The processing unit(s) can be a single processor or a multi-core processor in different embodiments.

The read-only-memory (ROM) 3020 stores static data and instructions that are needed by the processing unit(s) 3010 and other modules of the electronic system. The permanent storage device 3025, on the other hand, is a read-and-write memory device. This device is a non-volatile memory unit that stores instructions and data even when the electronic system 3000 is off. Some embodiments of the invention use a mass-storage device (such as a magnetic or optical disk and its corresponding disk drive) as the permanent storage device 3025.

Other embodiments use a removable storage device (such as a floppy disk, flash drive, or ZIP® disk, and its corresponding disk drive) as the permanent storage device 3025. Like the permanent storage device 3025, the system memory 3015 is a read-and-write memory device. However, unlike storage device 3025, the system memory 3015 is a volatile read-and-write memory, such a random access memory. The system memory 3015 stores some of the instructions and data that the processor needs at runtime. In some embodiments, the invention's processes are stored in the system memory 3015, the permanent storage device 3025, and/or the read-only 3020. For example, the various memory units include instructions for processing multimedia items in accordance with some embodiments. From these various memory units, the processing unit(s) 3010 retrieves instructions to execute and data to process in order to execute the processes of some embodiments.

The bus 3005 also connects to the input and output devices 3030 and 3035. The input devices enable the user to communicate information and select commands to the electronic system. The input devices 3030 include alphanumeric keyboards and pointing devices (also called "cursor control devices"). The output devices 3035 display images generated by the electronic system 3000. The output devices 3035 include printers and display devices, such as cathode ray tubes (CRT) or liquid crystal displays (LCD). Some embodiments include devices such as a touchscreen that functions as both input and output devices.

Finally, as shown in FIG. 30, bus 3005 also couples electronic system 3000 to a network 3040 through a network adapter (not shown). In this manner, the computer can be a part of a network of computers (such as a local area network ("LAN"), a wide area network ("WAN"), or an Intranet, or a network of networks, such as the Internet. Any or all components of electronic system 3000 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments described above open in the storyboard display area only one sequence of clips that appears or is to appear on one track in the composite display area. Other embodiments, however, simultaneously open in the storyboard display area clips from multiple clip sequences that are from multiple tracks, or that are for multiple tracks, in the composite display area. Thus, one of ordinary skill in the art would understand that the invention is not to be limited by the foregoing illustrative details, but rather is to be defined by the appended claims.

What is claimed is:

1. A non-transitory machine readable medium storing a program which when executed by at least one processing unit creates a composite media presentation from a set of media clips, the program comprising sets of instructions for:
   displaying, in a graphical user interface (GUI), a plurality of media clip representations arranged in a first order in a composite display area in order to form a composite media presentation;
   displaying, upon activation of a storyboard tool, a set of thumbnail images arranged in the first order in a storyboard display area, each particular thumbnail image corresponding to a particular clip represented in the composite display area, the storyboard display area displayed separately from the composite display area in the GUI;
   receiving user input to modify the order of the thumbnail images in the storyboard display area such that the thumbnail images are arranged in a second order different than the first order without affecting the order of the media clip representations in the composite display area that define the composite media presentation; and
   automatically modifying, upon receiving a selection of a graphical user interface item for synchronizing the composite display area with the storyboard display area, the order of the media clip representations in the composite display area to match the second order of the thumbnail images in the storyboard display area.

2. The non-transitory machine readable medium of claim 1, wherein the user input to modify the order of the thumbnail images comprises input to remove a particular thumbnail image, wherein after receiving the selection of the graphical user interface item for synchronizing, the media clip representation corresponding to the particular thumbnail image is removed from the composite display area.

3. The non-transitory machine readable medium of claim 1, wherein the user input to modify the order of the thumbnail images comprises input to move a particular thumbnail image from a first position to a second position in the storyboard display area.

4. The non-transitory machine readable medium of claim 1, wherein the user input to modify the order of the thumbnail images comprises user input to add a new clip at a first position in the storyboard display area, wherein after receiving the selection of the graphical user interface item for synchronizing the composite display area with the storyboard display area, the media clip representations in the composite display area include a representation of the new clip.

5. The non-transitory machine readable medium of claim 1, wherein the program further comprises sets of instructions for:
   receiving a selection of a particular thumbnail image in the storyboard display area; and
   moving, in response to the selection of the thumbnail image, a playhead in the composite display area to a position of a media clip representation corresponding to the particular thumbnail image.

6. The non-transitory machine readable medium of claim 1, wherein the set of thumbnail images comprises a storyboard representation of the composite media presentation.

7. The non-transitory machine readable medium of claim 1, wherein the program further comprises sets of instructions for:
   creating a new storyboard representation of a new composite media presentation without any media clips in the storyboard display area;
   receiving a first set of media clips to include in the new storyboard representation;
   receiving a second set of media clips to include in the new storyboard representation; and
   displaying thumbnail images of the first and second sets of media clips in the storyboard display area.

8. The non-transitory machine readable medium of claim 7, wherein the program further comprises sets of instructions for:
- receiving user input to edit the order of the thumbnail images in the second storyboard representation; and
- modifying the second storyboard representation according to the received input.

9. The non-transitory machine readable medium of claim 8, wherein the program further comprises sets of instructions for:
- receiving a selection of the graphical user interface item for synchronizing the composite display area with the storyboard display area; and
- displaying, in the composite display area, media clip representations corresponding to the thumbnail images in the second storyboard representation, the media clip representations arranged in the modified order of the second storyboard representation.

10. The non-transitory machine readable storage medium of claim 1, wherein the program further comprises a set of instructions for outputting the storyboard representation as a document.

11. The non-transitory machine readable storage medium of claim 1, wherein the program further comprises a set of instructions for sharing the storyboard representation over a network.

12. A method for creating a composite media presentation from a set of media clips, the method performed by an electronic device, the method comprising:
- displaying, in a graphical user interface (GUI), a plurality of media clip representations arranged in a first order in a composite display area in order to form a composite media presentation;
- displaying, upon activation of a storyboard tool, a set of thumbnail images arranged in the first order in a storyboard display area, each particular thumbnail image corresponding to a particular clip represented in the composite display area, the storyboard display area displayed separately from the composite display area in the GUI;
- receiving user input to modify the order of the thumbnail images in the storyboard display area such that the thumbnail images are arranged in a second order different than the first order without affecting the order of the media clip representations in the composite display area that define the composite media presentation; and
- upon receiving a selection of a graphical user interface item for synchronizing the composite display area with the storyboard display area, automatically modifying the order of the media clip representations in the composite display area to match the second order of the thumbnail images in the storyboard display area.

13. The method of claim 12, wherein the user input to modify the order of the thumbnail images comprises input to remove a particular thumbnail image, wherein after receiving the selection of the graphical user interface item for synchronizing, the media clip representation corresponding to the particular thumbnail image is removed from the composite display area.

14. The method of claim 12, wherein the user input to modify the order of the thumbnail images comprises input to move a particular thumbnail image from a first position to a second position in the storyboard display area.

15. The method of claim 12, wherein the user input to modify the order of the thumbnail images comprises user input to add a new clip at a first position in the storyboard display area, wherein after receiving the selection of the graphical user interface item for synchronizing the composite display area with the storyboard display area, the media clip representations in the composite display area include a representation of the new clip.

16. A system comprising:
- a set of processing units for executing sets of instructions;
- a machine readable medium for storing a program which when executed by at least one of the processing units creates a composite media presentation from a set of media clips, the program comprising sets of instructions for:
  - displaying, in a graphical user interface (GUI), a plurality of media clip representations arranged in a first order in a composite display area in order to form a composite media presentation;
  - displaying, upon activation of a storyboard tool, a set of thumbnail images arranged in the first order in a storyboard display area, each particular thumbnail image corresponding to a particular clip represented in the composite display area, the storyboard display area displayed separately from the composite display area in the GUI;
  - receiving user input to modify the order of the thumbnail images in the storyboard display area such that the thumbnail images are arranged in a second order different than the first order without affecting the order of the media clip representations in the composite display area that define the composite media presentation; and
  - automatically modifying, upon receiving a selection of a graphical user interface item for synchronizing the composite display area with the storyboard display area, the order of the media clip representations in the composite display area to match the second order of the thumbnail images in the storyboard display area.

17. The system of claim 16, wherein the program further comprises a set of instructions for outputting the storyboard representation as a document.

18. The system of claim 16, wherein the program further comprises a set of instructions for sharing the storyboard representation over a network.

19. The system of claim 16, wherein the program further comprises sets of instructions for:
- creating a new storyboard representation of a new composite media presentation without any media clips in the storyboard display area;
- receiving a first set of media clips to include in the new storyboard representation;
- receiving a second set of media clips to include in the new storyboard representation; and
- displaying thumbnail images of the first and second sets of media clips in the storyboard display area.

20. The system of claim 19, wherein the program further comprises sets of instructions for:
- receiving user input to edit the order of the thumbnail images in the second storyboard representation; and
- modifying the second storyboard representation according to the received input.

21. The system of claim 20, wherein the program further comprises sets of instructions for:
- receiving a selection of the graphical user interface item for synchronizing the composite display area with the storyboard display area; and
- displaying, in the composite display area, media clip representations corresponding to the thumbnail images in the second storyboard representation, the media clip representations arranged in the modified order of the second storyboard representation.

* * * * *